(12) United States Patent
Okayama

(10) Patent No.: US 6,657,771 B2
(45) Date of Patent: Dec. 2, 2003

(54) OPTICAL SWITCH HAVING OPTICAL DEFLECTOR

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/987,387

(22) Filed: Nov. 14, 2001

(65) Prior Publication Data

US 2002/0093723 A1 Jul. 18, 2002

(30) Foreign Application Priority Data

Nov. 15, 2000 (JP) .................................... 2000-348577
May 11, 2001 (JP) .................................... 2001-142370

(51) Int. Cl.$^7$ ............................................. G02B 26/00
(52) U.S. Cl. ........................................ 359/290; 359/291
(58) Field of Search .............................. 359/290, 291, 359/627; 385/16, 17, 18

(56) References Cited

U.S. PATENT DOCUMENTS 6,005,993 A * 12/1999 MacDonald ................ 385/16
6,253,001 B1 * 6/2001 Hoen ......................... 385/17
6,330,102 B1 * 12/2001 Daneman et al. .......... 359/290
6,466,711 B1 * 10/2002 Laor et al. .................. 385/18
6,480,319 B2 * 11/2002 Daneman et al. .......... 359/290
6,483,961 B1 * 11/2002 Helkey et al. .............. 385/18
6,504,967 B1 * 1/2003 Zhou et al. ................. 385/18

* cited by examiner

Primary Examiner—Ricky Mack
(74) Attorney, Agent, or Firm—Kanesaka & Takeuchi

(57) ABSTRACT

An optical switch (26) comprises an input switching element (12) having a plurality of light input ports (10) and an output switching element (16) having a plurality of light output ports (14). The input switching element (12) comprises a plurality of input optical deflector sets (20), each set consisting of a plurality of optical deflectors (18a, 18b), at each light input port (10). The input optical deflectors in each set are arranged in the incident direction of an optical signal that is input to one of the light input ports. The output switching element (16) comprises a plurality of output optical deflector sets (24), each set consisting of a plurality of optical deflectors (22a, 22b), at each light output port (14). The output optical deflectors in each set are arranged in the emergent direction of an optical signal that is output from one of the light output ports.

29 Claims, 43 Drawing Sheets

OPTICAL SWITCH HAVING OPTICAL DEFLECTOR

BACKGROUND OF THE INVENTION

1. Field of the Invention

The present invention relates to an optical switch for outputting to one of a plurality of output ports an optical signal that is input to one of a plurality of input ports.

2. Description of the Related Art

Some conventional optical switches are disclosed in the following references:

(1) Proceedings of 3rd International Conference on Micro-Opto-Electro-Mechanical Systems (MOEMS) '99, Paper 26, Aug. 29, 1999, (2) U.S. Pat. No. 5,923,480 issued Jul. 13, 1999, (3) Japanese Patent Application Kokai No. 2000-10029, and (4) Optical Fiber Communication (OFC) 2000, Treaties, Lecture PD20, March 2000.

The optical switch described in JP 2000-10029 is shown in FIGS. 44(A) and (B) as an example of the conventional optical switches.

In FIG. 44(A), the optical switch 4400 comprises a plurality of optical deflectors 4402a and 4402b and a mirror 4404. The mirror 4404 is fixed in place in the optical switch 4400. The optical deflectors 4402 are arranged on a substrate 4406. An optical input/output port is provided for each of the optical deflectors 4402. An end of each of optical fibers 4408a and 448b is inserted into the optical I/O port and fixed in the optical deflector 4402.

In operation, the optical switch 4400 makes simultaneous input and output of light beams at each of the light I/O ports. A light beam leaving from the optical fiber 4408b is input to the optical deflector 4402b and deflected therein. Then, the deflected beam is reflected by the mirror 4404 into the optical deflector 4402a, wherein it is guided into the optical fiber 4408a and output from the optical I/O port.

In FIG. 44(B), the optical deflector 4402 comprises the optical fiber 4408 inserted through the I/O port, a collimating lens 4410, a fixed mirror 4412, and a movable mirror 4414.

A light beam from the I/O port leaves from the end of the optical fiber 4408 that is housed in the optical deflector 4402. This light beam is focused or condensed by the collimating lens 4410 and reflected or deflected by the fixed mirror 4412 into the movable mirror 4414 at which it is reflected at a given deflection angle. The movable mirror 4414 has two rotation axes that are perpendicular to the incident direction of a light beam so as to be movable on two axes. The rotation of the movable mirror 4414 may be adjusted by an ordinary technique. Thus, the movable mirror 4414 is able to reflect the light beam to the mirror 4404 at a given deflection angle. The mirror 4404 then reflects the light beam toward the optical deflector 4402a.

The light beam put into the light deflector 4402a travels in the direction opposite to that of FIG. 44(B) and is deflected by the movable mirror 4414. Then, it is reflected by the fixed mirror 4412, condensed by the collimating lens 4410, and output from the I/O port via the optical fiber 4408a. The deflection angle is adjusted at the movable mirror 4414 to input the light beam into the optical fiber 4408a.

As has been described above, this optical switch is composed of one stage of optical deflectors using a movable mirror or lens to control the direction of a light beam into the predetermined I/O port. This optical switch employs 3-D wiring or interconnection so that it is easy to increase the number of ports.

However, the conventional optical switch requires very high precisions with which the light beam is deflected by a single deflector. Consequently, it has the following disadvantage.

The diameter of optical fibers for usual optical communication systems is approximately eight microns. If a light beam is input with a positional error of about one micron, a loss of one dB or more is generated, presenting a practical problem. The distance between the output ports required for mounting is a few 100 microns or more so that even a piece of two-channel equipment requires a precision of about 0.1% in deflection angle. If the equipment has tens of channels or more, the required precision is in the order of 10–4. The 100-channel equipment using movable mirrors requires a precision of about 1% in deflection angle. The equipment of 1000 channels or more requires a precision of 0.3%.

In order to solve the problem, it has been proposed to superimpose a position detecting signal on the light beam to detect the deflection angle and feedback the detected angle to the deflection angle control unit. This unit, however, is unable to make high speed switching because of the limited speed of electrical process. Also, it is well known that an angle detection mechanism is incorporated in the deflection mirror for feedback control, but this method is unable to provide high precision.

SUMMARY OF THE INVENTION

Accordingly, it is an object of the invention to provide an optical switch that requires lower precision for each optical deflector than ever before.

It is another object of the invention to provide an optical switch that is able to increase the number of channels and provide high switching speed.

According to the first embodiment of the invention there is provided an optical switch which includes an input switching element having a plurality of light input ports and an output switching element having a plurality of light output ports so as to output from one of the light output ports an optical signal that is input to one of the light input ports. The input switching element has a plurality of input optical deflector sets. Each set consists of a plurality of optical deflectors arranged in an incident direction of optical signals at each of the light input ports. The output switching element having a plurality of output optical deflector sets. Each set consists of a plurality of optical deflectors arranged in an emergent direction of optical signals at each of the light output ports.

With the optical switch according to the first embodiment, a light beam leaving from the optical fiber is input to the optical deflector and deflected by the at least two optical deflectors toward the predetermined light output port so that the precision for the deflection angle is distributed to the respective optical deflectors in the input optical deflector set. Thus, the precision required for each optical deflector is lowered.

According to the second embodiment of the invention there is provided an optical switch, which includes a plurality of light input ports and a plurality of light output ports so as to output from one of the output ports an optical signal that is input to one of the light input ports, comprises a plurality of input optical deflectors provided one for each of the light input ports; a plurality of output optical deflectors provided one for each of the light output ports; a plurality of input optical fibers connected one to each of the light input ports; a plurality of output optical fibers connected one to each of the light output ports; a plurality of optical systems provided one for each of the light input or output ports to increase an incident or emergent angle of each of the input or output optical fibers.

With the optical switch according to the second embodiment, the increased deflection angle makes it possible to reduce the distance between the lens and the lens focal plane while maintaining the required beam width so that the number of channels is increased while the required precision is maintained.

According to the third embodiment of the invention there is provided an optical switch, which includes a plurality of light input ports and a plurality of light output ports so as to output from one of the output ports an optical signal that is input to one of the light input ports, comprises a plurality of input optical deflectors provided one for each of the light input ports; a plurality of output optical deflectors provided one for each of the light output ports; a plurality of input optical fibers connected one to each of the light input ports; a plurality of output optical fibers connected one to each of the light output ports; and a plurality of optical systems provided one for each of the light input or output ports to increase a diameter of a light beam. Each of the optical systems comprises a coupler connected to an end of each of the input or output optical fibers and a plurality of collimator lenses provided in a plane parallel to an end face of the coupler so as to be opposed to the end face.

With the optical switch according to the third embodiment, the number of channels can be increased at the required precision for the same beam diameter and focal length without increasing the deflection angles at the collimator lenses.

According to the fourth embodiment of the invention there is provided an optical switch, which includes a plurality of light input ports and a plurality of light output ports so as to output from one of the light output ports an optical signal that is input to one of the light input ports, comprises at least one input movable mirror having a rotary axis perpendicular to an incident direction of optical signals at each of the light input ports; at least one output movable mirror having a rotary axis perpendicular to an emergent direction of optical signals at each of the light output ports; at least one optical element provided between the at least one input movable mirror and the at least one output moveable mirror for condensing onto the at least one output movable mirror at least one light beam reflected by the at least one input movable mirror. The optical element is provided for each light path between the input and output movable mirrors.

A collimator lens is provided at each of the light input ports between the optical fiber provided at the light input port and the movable mirror. Similarly, a collimator lens is provided at each of the light output ports between the optical fiber provided at the light output port and the movable mirror.

With this structure, all light beams from the optical fibers provided at all of the light input ports are condensed onto the movable mirrors by the collimator lenses so that the control precision of the movable mirror angles is lowered, making it possible to switch the mirror angles at high speeds.

According to the fifth or sixth embodiment of the invention there is provided an optical switch, which includes an input switching element having a plurality of light input ports and an output switching element having a plurality of light output ports so as to output from one of the light output ports an optical signal that is input to one of the light input ports, comprises an optical element provided between the input and output switching elements so as to receive a plurality of incident beams from the input ports and output a plurality of emergent beams corresponding to the incident beams such that central paths of the emergent beams become parallel to each other.

The optical element is a single convex lens that has a focal plane in which the input switching element is provided and is flanked symmetrically by the input and output switching elements. Alternatively, the optical element is a hologram that has a focal plane in which the input switching element is provided and is flanked symmetrically by the input and output switching elements.

Alternatively, the optical element is a concave mirror having a focal plane in which the input switching element is provided, and the input and output switching elements are realized by a single switching element.

Also, the optical switch further comprises a plurality of input lens systems, each corresponding to each of the input ports; a plurality of output lens systems, each corresponding to each of the output ports; a plurality of input concave lenses provided in a plane in which light leaves from one of the input lens systems to the output switching element; and a plurality of output concave lenses provided in a plane in which the light from the input switching element strikes one of the output lens systems.

According to the sixth embodiment of the invention each of the input and output lens systems comprises a fixed lens or movable lens movable in a plane perpendicular to the incident or emergent direction and a movable mirror having a rotary axis perpendicular to the incident or emergent direction. Each of the input and output lens systems further comprises a concave lens provided between the fixed or movable lens and the movable mirror. The convex lens comprises a plurality of first convex lenses provided one for each of light paths between the input and output switching elements and a pair of second convex lenses provided on opposite sides of the first convex lenses.

The optical switch further comprises a plurality of input lens systems, each corresponding to each of the input ports; a plurality of output lens systems, each corresponding to each of the output ports; each of the input and output lens systems comprising a fixed lens or a movable lens movable in a plane perpendicular to the incident or emergent direction and a movable mirror having a rotary axis perpendicular the incident or emergent direction.

The optical switch further comprises a plurality of input lens systems, each corresponding to each of the input ports; a plurality of output lens systems, each corresponding to each of the output ports; each of the input and output lens systems comprising a fixed lens or a movable lens in a plane perpendicular to the incident or emergent direction and a movable mirror having a rotary axis perpendicular to the incident or emergent direction.

In this structure, the position of the movable mirror provided in the input lens system and the relative position of the first convex lens determine which movable mirror provided in the output lens system is taken so that the selection of the first convex lens determines the output port from which the optical signal is output.

According to the seventh embodiment of the invention, an optical switch comprises an input switching element having a matrix of input ports and an output switching element having a matrix of output ports; a plurality of input lens systems, each corresponding to each of the input ports; a plurality of output lens systems, each corresponding to each of the output ports; a portion of the input and output lens systems located on at least a periphery of the matrix being fixed or movable lens systems capable of directing light beams from the portion of the input lens systems in the periphery to a portion of the output lens systems located at a center of the matrix.

According to the fifth, sixth or seventh embodiment described above, the range of deflection angles of the optical deflector at each of the input ports is the same so that the number of channels can be increased.

According to the sixth or seventh embodiment, the slants angle of the movable mirrors provided in the input lens systems correspond one-to-one to the output ports so that the driving is made simple.

According to the eighth embodiment of the invention there is provided an optical switch including an input switching element having at least one light input port and an output switching element having at least one light output port so as to output from one of the light output ports an optical signal that is input to one of the light input ports, wherein the input switching element comprises first and second optical units; the output switching element comprises third and fourth optical units. The first optical unit has, at the at least one light input port, at least one set of an input light conduit and an input lens system for condensing a light beam from the input light conduit. The second optical unit has at least one first movable mirror corresponding to the at least one input lens system so as to reflect a light beam from the at least one input lens system. The third optical unit has at least one second movable mirror for reflecting a light beam from the first movable mirror. The fourth optical unit has, at the at least one light output port, a set of an output lens system for condensing a light beam from the second movable mirror and an output light conduit into which a light beam is put from the output lens system.

The first, second, third, and fourth light units are provided on a common substrate. The input light conduit and the input lens system of the first optical unit are fixed to first and second substrates, respectively, and the output lens system and the output light conduit of the fourth optical unit are fixed to third and fourth substrates, respectively. It is preferred that the first, second, third, and fourth substrates have a same thermal expansion coefficient. The first, second, third, and fourth substrates have a thermal expansion coefficient that is equal to that of the common substrate. The first, second, third, and fourth substrates have a small thermal expansion coefficient. The first, second, third, and fourth substrates and the common substrate have a small thermal expansion coefficient.

If the common substrate expands under heat, the first and fourth optical units expand similarly to the common substrate. If the thermal expansion coefficient of the first and second substrates is equal to that of the third and fourth substrates, the incident position of light to the first movable mirror provided in the second optical unit is displaced but the incident angle is not changed. The thermal change in the angle of the first movable mirror is so small that the propagation angle of the light beam is not changed.

In the second movable mirror provided in the third optical unit, only the incident position is changed but no incident angle is changed. The angular change of the second movable mirror by temperature change is so small that although the incident position to the output lens system is changed, no incident angle is changed.

Thus, according to the eighth embodiment, even if there are temperature changes, the focal deviation is minimized and only the incident angle to the optical fiber is displaced, reducing influence on the optical output and minimizing the output power variations caused by the temperature changes.

A light switching device comprises an optical switch having a movable member for switching operation; a monitor unit for monitoring an emergent beam from the optical switch; an operation control unit responsive to a monitor signal from the monitor unit to control the movable member thereby adjusting control of switching by the optical switch. The movable member has a light conduit means for inputting a light beam to the optical switch; the monitor unit includes beam output means having a beam distributor and a monitor such that the beam distributor distributes light beams from the optical switch to the monitor and outside of the optical switch for output. The light conduit means includes a monitor signal source and a signal synthesizer for synthesizing a monitor signal from the monitor signal source and the light beam into a composite signal and inputting it into the optical switch; The operation control unit controls operation of the monitor signal source.

The optical switch unit has first and second optical switches; the movable member has first and second light conduit means of an identical structure for inputting light beams to the first and second optical switches, respectively, the monitor unit has first and second beam output means of an identical structure; each of the first and second beam output means has a monitor and a beam distributor for distributing the light beams from the optical switches to the monitor and outside of the light switching device. The each of the first and second light conducting means has a monitor signal source and a signal synthesizer for synthesizing a monitor signal from the monitor signal source and the light beam input to the light switching device into a composite signal and inputting it to the first and second optical switches; each of the first and second beam output means has a filter for selecting only the optical signal from the composite signal and outputting to outside of the light switching device. The operation control unit controls operation of the monitor signal source.

The second optical switch is used as an auxiliary one and for broadcast distributing the optical signals from the movable members to the first and second optical signal output means. With this structure it is possible to monitor the state of the optical switch and broadcast distribution to two directions including the auxiliary arrangement with a small number of parts.

DESCRIPTION OF THE PREFERRED EMBODIMENT

First Embodiment

Figure 1:
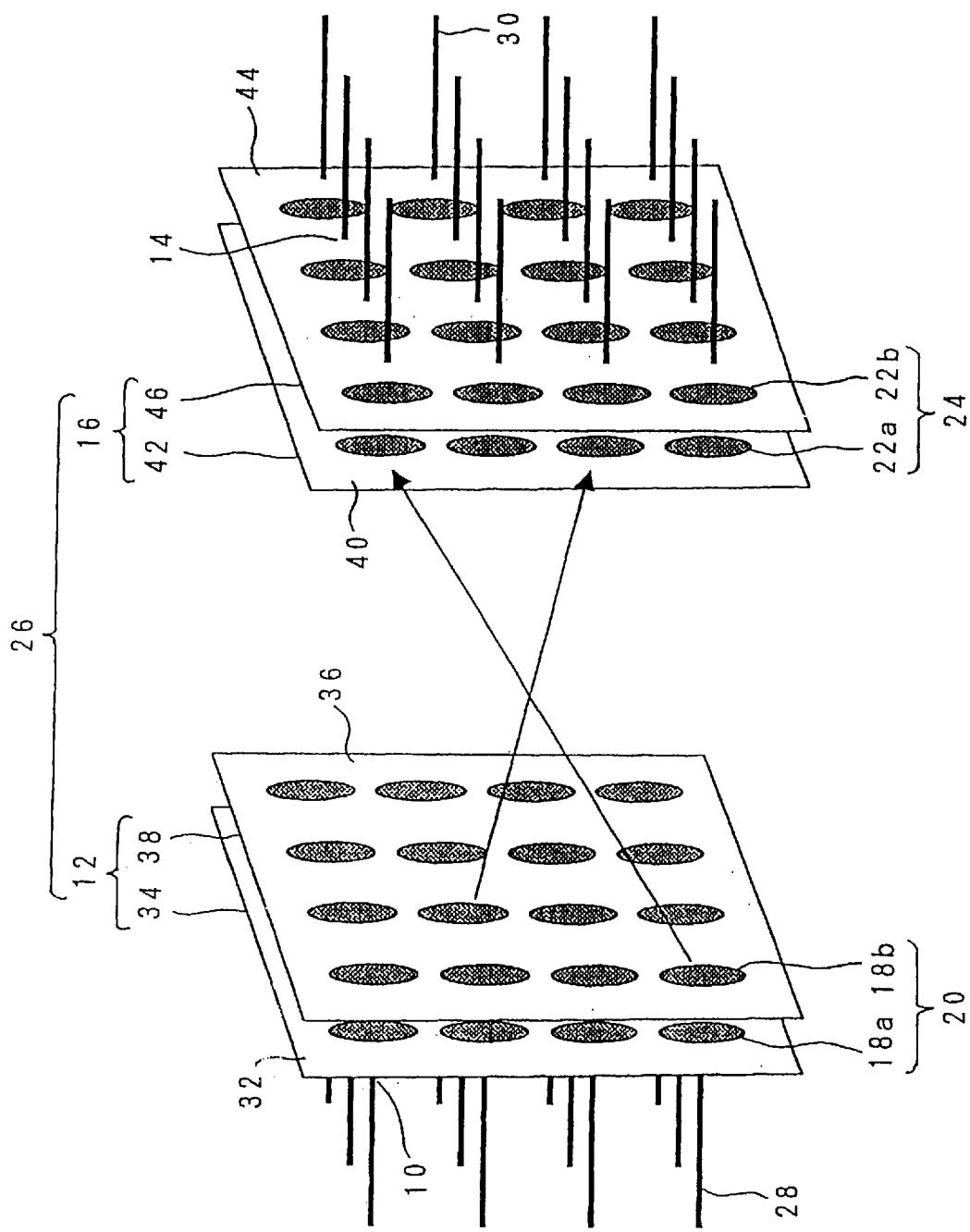
FIG. 1 is a perspective view of an optical switch according to the first embodiment of the invention.

In FIG. 1, an optical switch 26 comprises an input switching element 12 having a plurality of optical or light input ports 10 and an output switching element 16 having a plurality of optical or light output ports 14. Light beams are shown by arrows. An optical signal input to one of the optical input ports 10 is output from one of the optical output ports 14.

The input switching element 12 has at each optical input port 10 an input optical deflector set 20 that is composed of a pair of optical deflectors 18a and 18b. The optical deflectors 18a and 18b are arranged in the input direction of optical signals that are input to the light input ports 10.

The output switching element 16 has at each optical output port 14 an output optical deflector set 24 that is composed of a pair of optical deflectors 22a and 22b, which are arranged in the output direction of the optical signals that are output from the optical output port 14. The input and output switching elements 12 and 14 are the same in structure.

In this embodiment, each optical input member for the input switching element 12 is an optical fiber 28. The output end face of the optical fiber 28 is connected to the optical input port 10. Each optical output member for the output switching element 16 is an optical fiber 30, the input end face of which is connected to the optical output port 14. Thus, 3-D optical wiring is established between the input and output optical fiber sets. The optical deflector sets to realize such 3-D optical wiring are of the two stage structure each composed of a pair of optical deflectors in contrast to the conventional single stage structure.

The optical deflectors 18a of the input optical deflector sets 20 are disposed on a substrate 32 to form a first deflector array 34. Similarly, the optical deflectors 18b are disposed on another substrate 36 to provide a second deflector array 38. The first and second deflector arrays 34 and 38 constitute the input switching element 12. The optical deflectors 22a of the output optical deflector sets 24 are disposed on a substrate 40 to provide a third deflector array 42. Similarly, the optical deflectors 22b are disposed on another substrate 44 to provide the fourth deflector array 46. The third and fourth deflector arrays 42 and 46 constitute the output switching element 16. The substrates 32, 36, 40, and 44 are arranged in parallel such that the first, second, third, and fourth deflector arrays 34, 38, 42, and 46 are disposed in this order.

Alternatively, the optical deflectors may be disposed separately on a number of substrates.

The optical fibers 28 and 30 are held in place by a retention member (not shown) such as a substrate on which guides are provided by appropriate technique to position the optical fibers with high precision.

In this embodiment, the optical deflectors 18a, 18b, 22a, and 22b are movable lenses that are movable in a plane perpendicular to the input or output direction of optical signals. The two movable lens of each optical deflector set 20 or 24 have different focal lengths.

Figure 2:
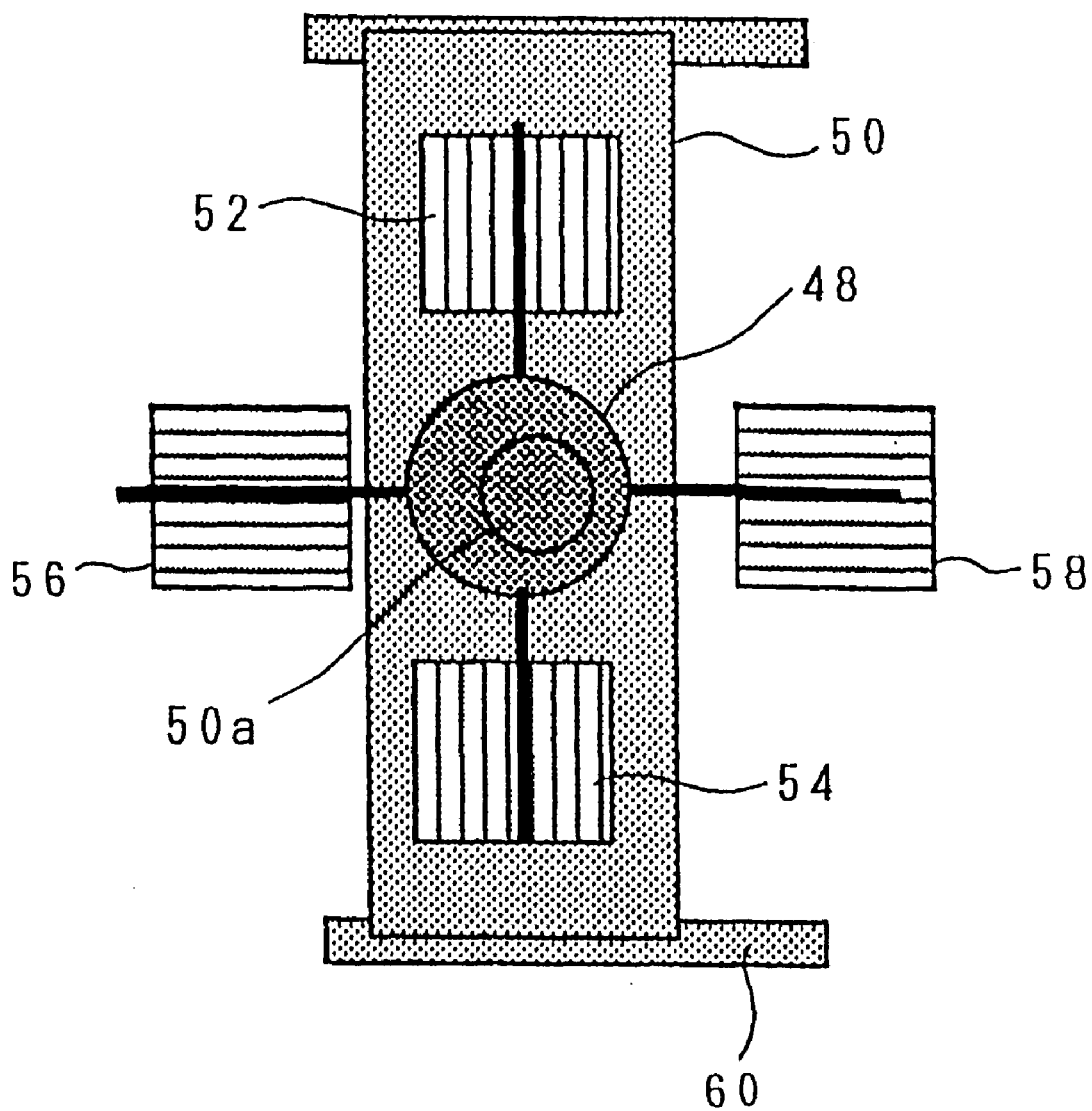
FIG. 2 is a to plan view of a movable lens for the optical switch.

In FIG. 2, a lens 48 is supported by four actuators 52, 54, 56, and 58 that are provided on a fine tuning or adjustment base 50. By driving the actuators 52 and 54, the lens 48 are moved or displaced in the up-and-down direction. By driving the actuators 56 and 58, it is possible to move the lens 48 in the left-and-right direction. A transparent hole 50a is provided in the fine tuning base 50, and the lens 48 is moved relative to this hole 50a. The fine tuning base 50 is supported by a slider 60 so as to be movable in the left-and-right direction.

Figure 3:
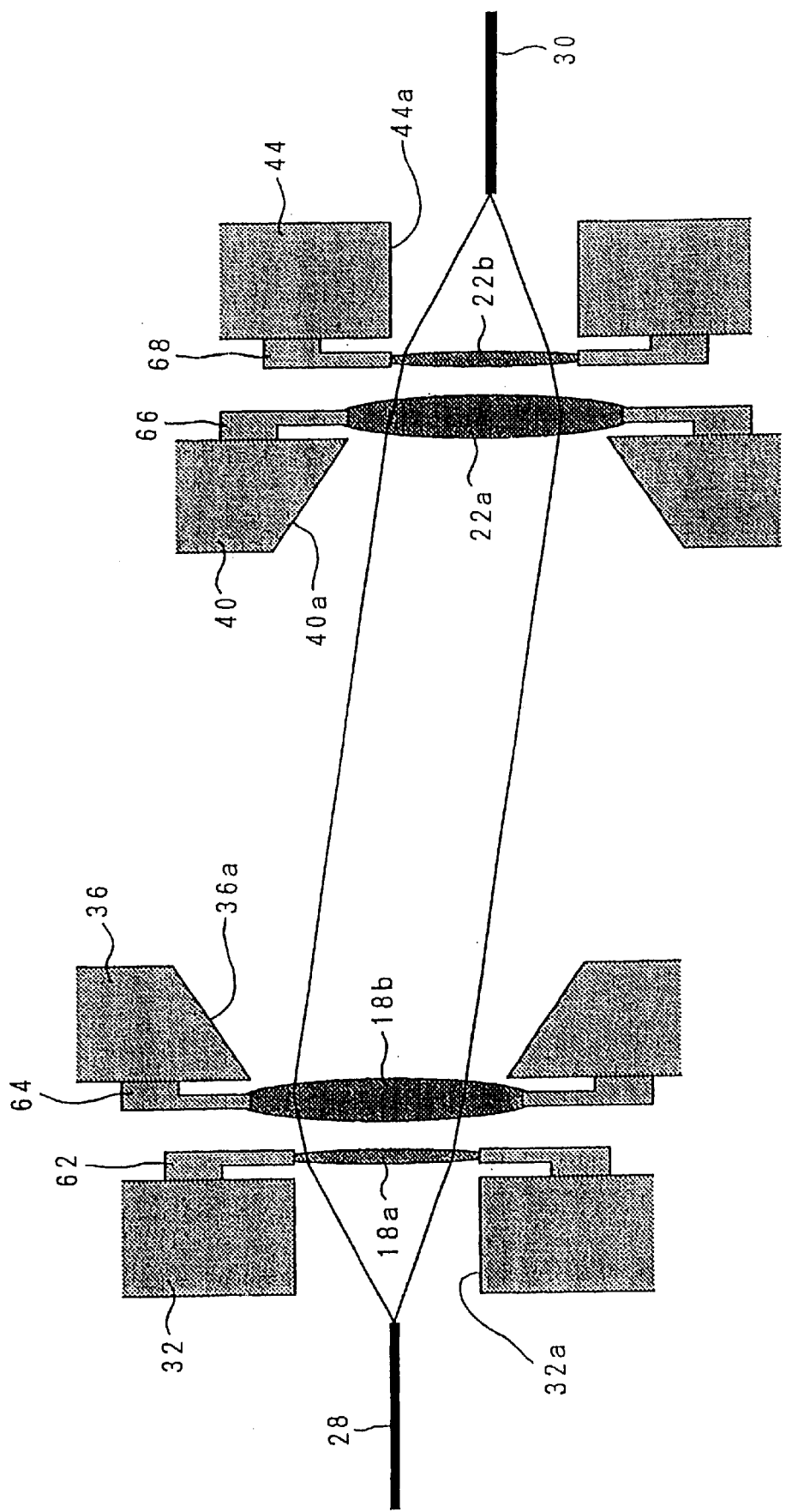
FIG. 3 is a sectional view of the optical switch.

In FIG. 3, the optical deflectors 18a, 18b, 22a, and 22b are movable lenses. The movable lenses 18a, 18b, 22a, and 22b are supported on the substrates 32, 36, 40, and 44 via the actuators 62, 64, 66, and 68, respectively, so as to be movable along the respective substrates. Openings 32a, 36a, 40a, and 44a are provided in the substrates 32, 26, 40, and 44, respectively, through which light beams pass. The deflection angles at the substrates 36 and 40 are so large that if the substrates 36 and 40 are thick, the openings 36a and 40a are tapered so as to avoid blocking light beams. Where the substrates 32, 36, 40, and 44 are transparent for the wavelengths of light, the openings may be omitted. The substrates 32 and 36 are bonded via a spacer to space the lenses 18a and 18b. Similarly, the substrates 40 and 44 are bonded via a spacer to space the lenses 22a and 22b. The light rays output from the input optical fiber 28 are made into parallel rays by the lens pair 18a and 18b of the input switching element and focused or condensed into the output optical fiber 30 by the lens set 22a and 22b of the output switching element.

Figure 4:
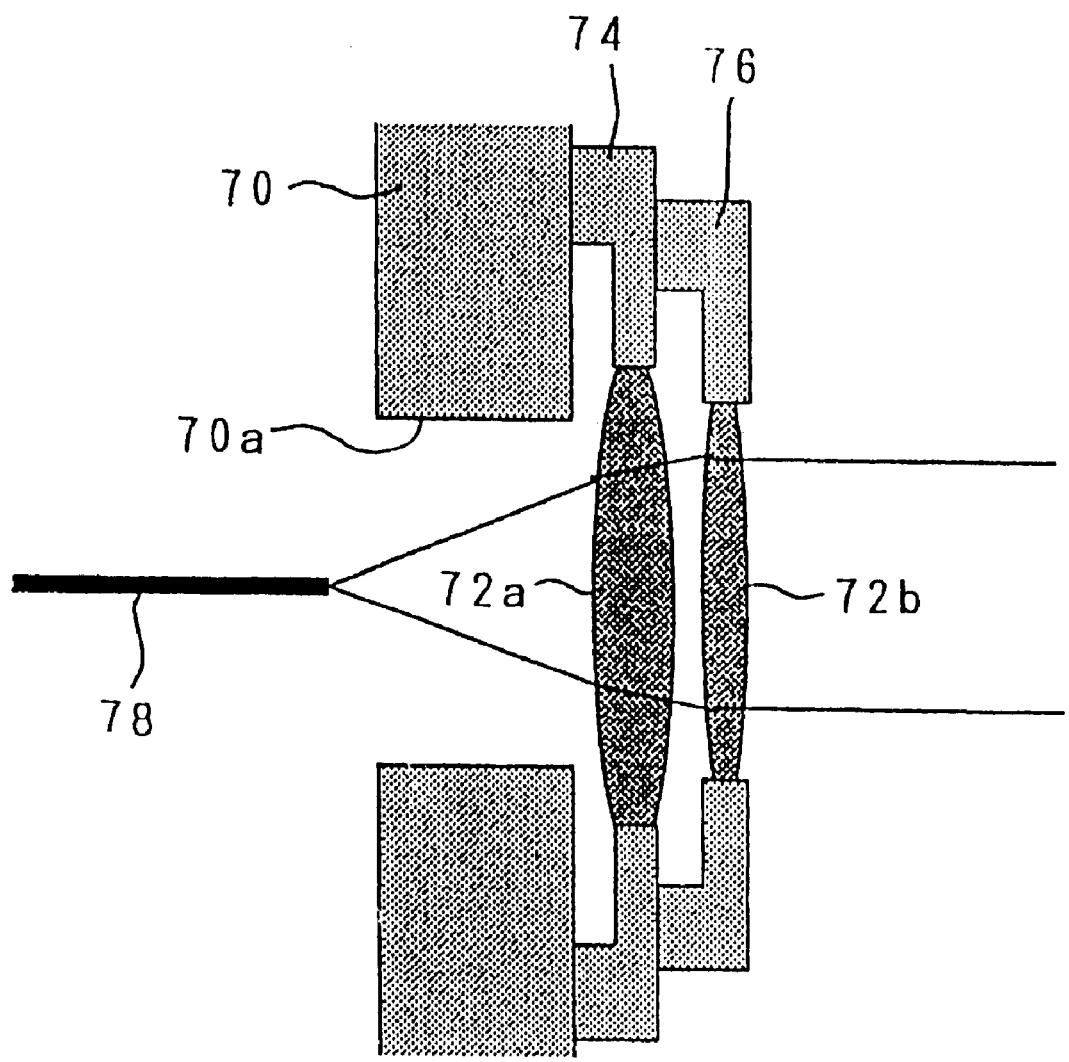
FIG. 4 is a sectional view of an input switching element according to a variation to the first embodiment.

In FIG. 4, an opening 70a is provided in a substrate 70 to transmit a light beam output from the optical fiber 78. An optical deflector set is provided at the opening 70a. In this embodiment, a pair of optical deflectors are provided on the substrate 70; i.e., the first stage optical deflector or movable lens 72a is supported by an actuator 74 that is provided on the substrate 70, and the second stage optical deflector or movable lens 72b is supported by actuator 76 that is provided on the actuator 74. Thus, the multiple-stage actuator structure is provided, wherein the lenses 72a and 72b are driven independently by the actuators 74 and 76, respectively, for movement along the faces of the substrate 70.

Where coarse and fine adjustments of deflection angles are made by the lenses 72a and 72b, respectively, this structure is more desirable than that of FIG. 3. However, it is difficult to make the multiple-stage actuator structure on a substrate by micromachine techniques so that currently it is easier to make the structure of FIG. 3. However, it is possible to make the structure of FIG. 4 by making the lens 72a and 72b with a microlens and ultrasonic driving motors that are used for a camera or the like.

The operation of the optical switch will be described with reference to FIGS. 5–10.

Figure 5:
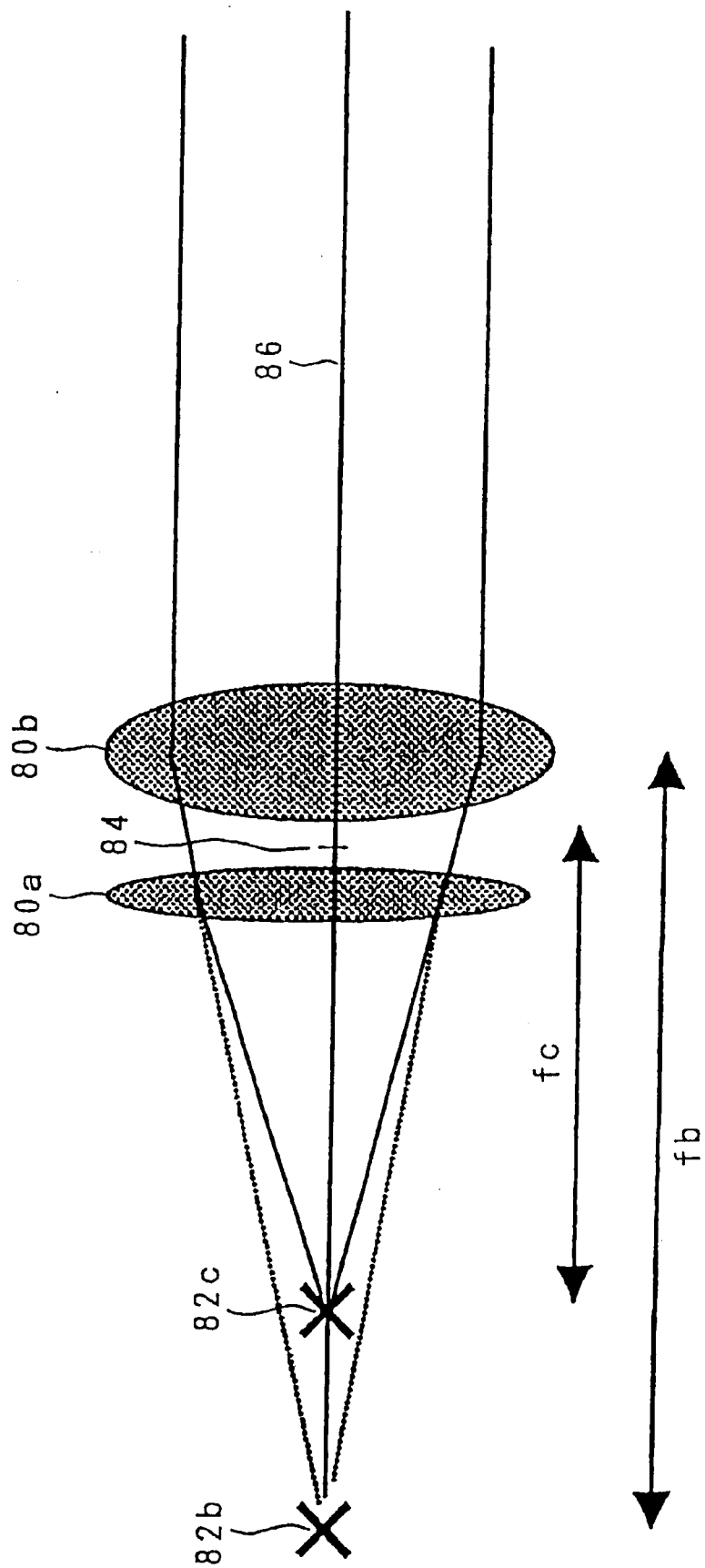
FIGS. 5–10 are schematic diagrams for use in describing the operational principle of the optical switch.

In FIG. 5, lenses 80a and 80b correspond to the optical deflectors 18a and 18b. If the focal length of the lens 80b is fb, the parallel light rays input to the lens 80b are focused at a focal point 82b that is apart from the lens 80b by the focal length fb. If the lens 80a is combined with the lens 80b, the focal point is moved. The resulting focal point 82c is apart by a focal length fc from the optical center 84 of a compound lens that consists of the lens 80a and 80b. As shown in FIG. 3, a light source or the end face of an optical fiber is placed at the focal point 82c. The center line or optical axis 86 includes the focal point 82c and the optical center 84. If the focal length of the lens 80a is fa, then the following equation (1) is established $$1/fc = 1/fa + 1/fb \qquad (1)$$

Figure 6:
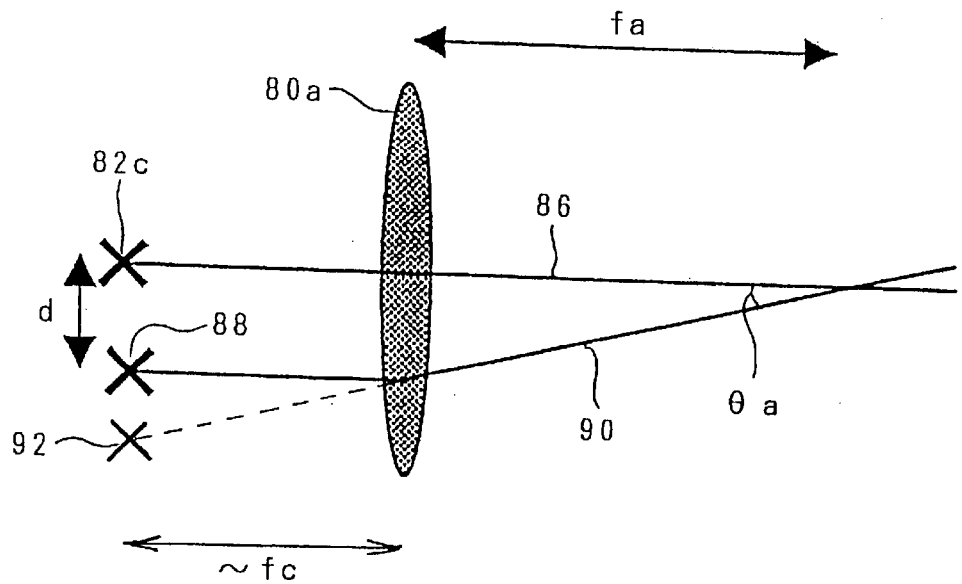

In FIG. 6, as stated above, a light source is placed at the focal point 82c of the equivalent or compound lens. Let consider the case where the light source is moved from the focal point 82c by a distance d in the direction perpendicular to the center line 86. Where the lens 80a is close to the optical center 84 of the equivalent lens, the distance between the moved position 88 and the lens 80a is substantially equal to fc. This distance will be expressed by ~fc.

Where the light source is located at the focal point 82c, the center of the light beam lies in the center line 86. If the light source is moved to the position 88, the center of the light beam is deflected to a line 90 that intersects the center line 86 at the position apart from the lens 80a by the focal length fa. An imaginary or virtual light source appears on an extension of the line 90 at the position apart from the lens 80a by the distance ~fc. The focusing effects by the lens 80a are equivalent to those of the light source located at the focal point 82c. That is, even if the light source is placed at the position 92, the effects are substantially equal to the effects produced by the lens 80a that is provided at right angles with the line 90. The deflection angle θ between the lines 86 and 90 is given by the following equation (2)

$$\theta a = \tan^{-1}(d/fa) \qquad (2)$$

Figure 7:
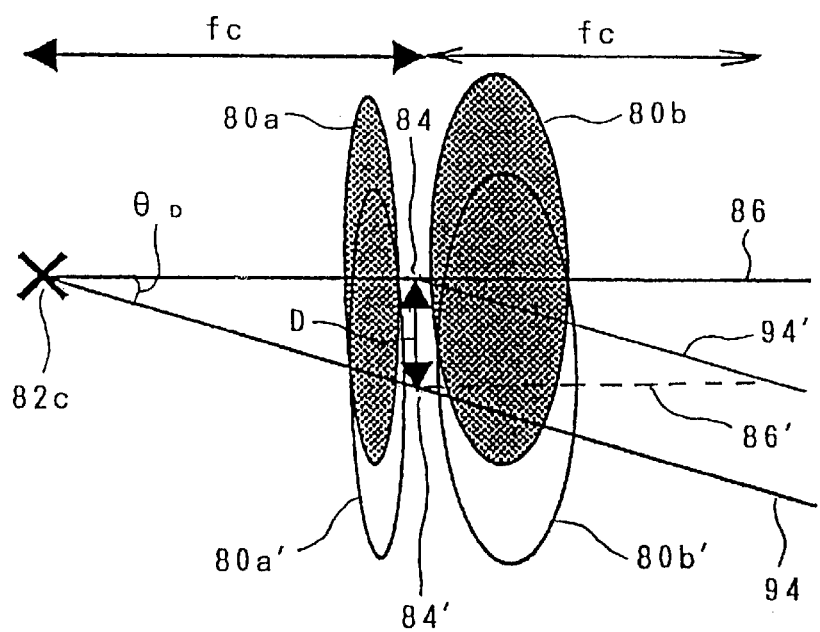

In FIG. 7, a compound lens is moved from the center line 86 by a distance D in the direction perpendicular to the center line 86. That is, the lenses 80a and 80b are moved to the lenses 80a' and 80b'. The optical center 84 of the compound lens and the center line 86 are moved to the center 84' and center line 86', respectively. Where the light source is located at the focal point 82c, the light travels along the line 94 that includes the focal point 82c and the center 84'. The deflection angle $\theta_D$ between the center line 86 and the line 94 is given by the following equation $$\theta_D = \tan^{-1}(D/fc) \qquad (3)$$

Figure 8:
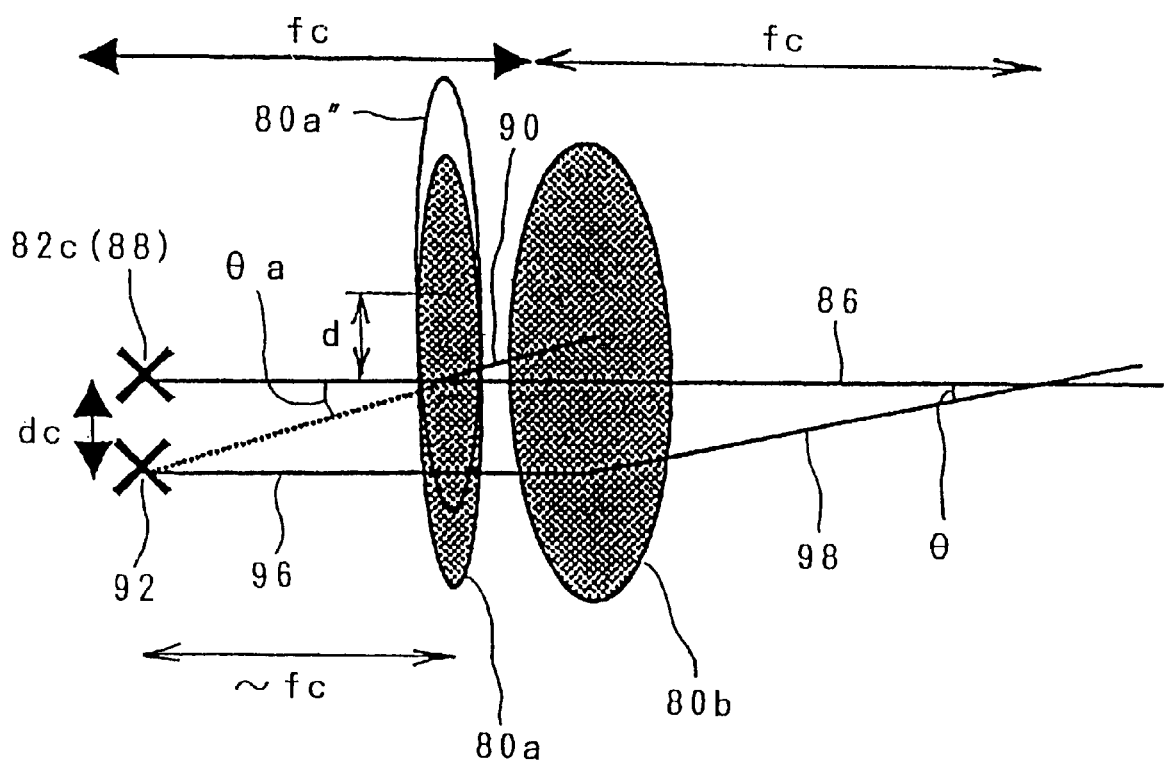

In FIG. 8, only the lens 80a is moved relative to the lens 80b. The lens 80a is moved to the lens 80a" from the center line 86 by a distance d in the direction perpendicular to the center line 86. Similarly to the case of FIG. 6, the light beam from the light source provided at the focal point 82c (corresponding to the position 88 of FIG. 6) is deflected into the line 90 by the lens 80a". Consequently, the light source is viewed by the lens 80b the position 92 as viewed by a lens that is disposed at right angles with the line 90. The distance dc between the original position 88 and the imaginary position 92 is given by the following equation $$dc = \sim fc \cdot \tan \theta a = \sim fc \cdot d/fa \qquad (4)$$

The light beam 96 from the light source disposed at the position 92 is deflected into the line 98 by the lens 80b. Considering the focal length of a compound lens consisting of the tilted lens and the lens 80b, the deflection angle between the lines 86 and 98 is given by the following equation $$\theta = \tan^{-1}(dc/fc) = \tan^{-1}[(d/fa)(-fc/fc)] \quad (5)$$

Figure 9:
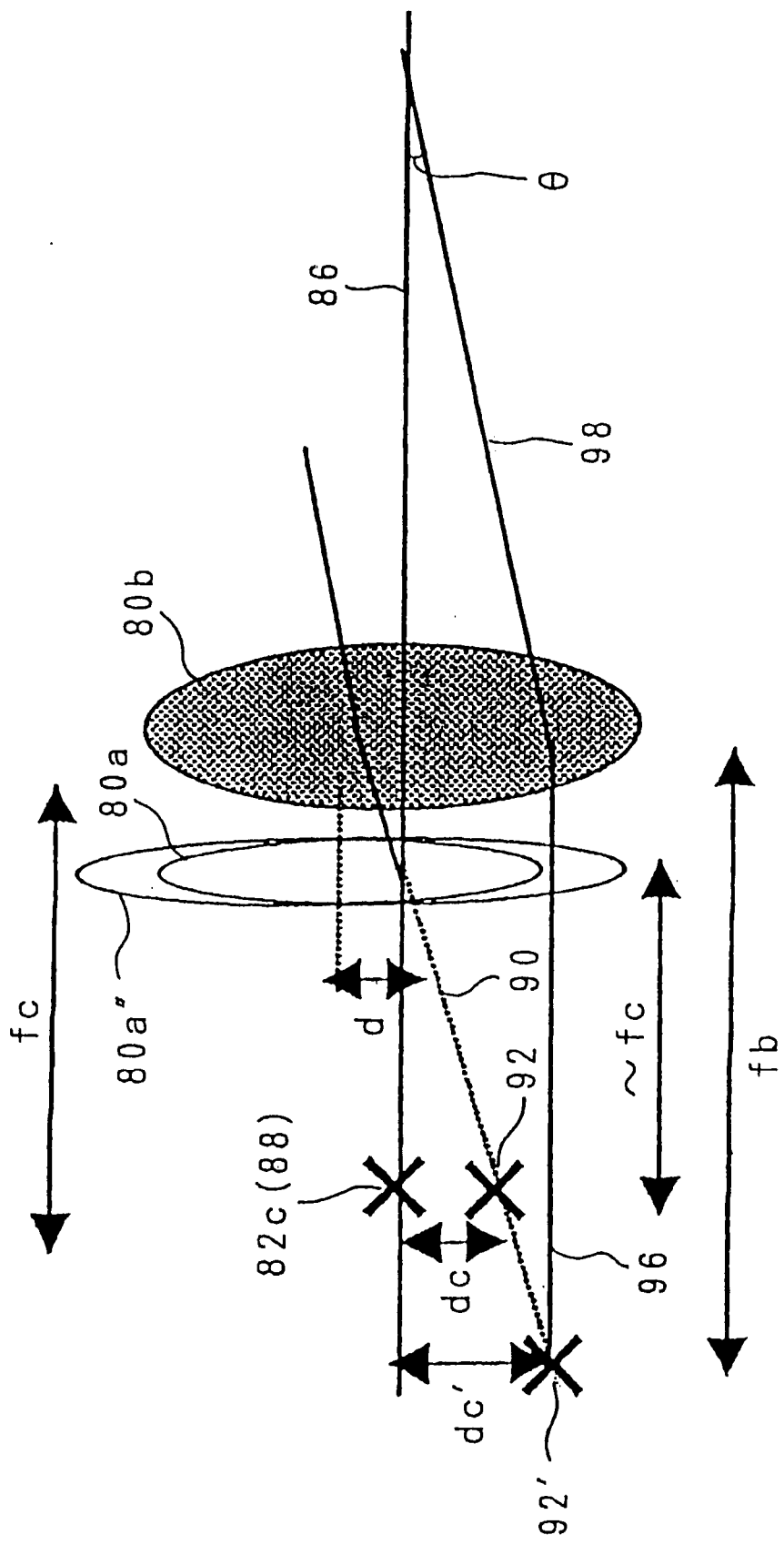

The equation (5) can be derived from another point of view. In FIG. 9, the lens 80a is eliminated (however, the position of the eliminated lens 80a is indicated by the same reference character 80a). The structure of FIG. 9 corresponds to a modification of FIG. 8 in which the light source is moved to an imaginary position 82b in FIG. 5. The line 90 indicates a light beam when the light source is displaced or moved to this position, with no lens 80a provided. The focal point, with no lens 80a, is provided at the position 92' that is apart from the lens 80b by the distance fb as shown in FIG. 5. If an imaginary light source is placed at the position 92' which is apart from the center line 86 by the distance dc', the distance dc' is given by the following equation $$dc' = dcfb/fc = (-fc/fc)(fb/fa)d \quad (6)$$

The light beam 96 from the light source at the position 92' is deflected into the line 98 by the lens 80b. The deflection angle $\theta$ between the lines 86 and 98 is given by the following equation $$\theta = \tan^{-1}(dc'/fb) = \tan^{-1}[(d/fa)(-fc/fc)] \quad (7)$$

This equation is the same as the equation (5).

As has been described above, the deflection angle $\theta_D$ is determined by the ratio D/fc wherein D is the displacement distance of the compound lens 80a and 80b and fc is the focal length of the complex lens.

If (~fc/fc) is approximately 1, the deflection angle $\theta$ is determined by the ratio d/fa wherein d is the relative distance of the lenses 80a and 80b and fa is the focal length of the lens 80a. The displacement distance D and d are substantially equal because the equivalent actuators are used.

If the focal length fb of the lens 80b is reduced (the focusing power is increased) while the focal length fa of the lens 80a is increased (the focusing power is reduced), fb/fa=r<<1. Then, $\theta_D/\theta$ is substantially equal to fa/fc. Since fa/fc=(r+1)/r, fa/fc>>1. Thus, $\theta_D/\theta$>>1.

Accordingly, the deflection angles $\theta_D$ and $\theta$ make both the coarse and fine adjustments possible.

If the position precision is $\sigma$, then the angular precision is $\sigma/fc=\theta_D\sigma/D$ for $\theta_D$ and $\sigma/fa=\theta\sigma/D$ for $\theta$. The ratio for the maximum deflection angle is the same value as $\sigma/D$. The relative precision of $\theta_D$ and $\theta$ in absolute value is 1:r.

Figure 10:
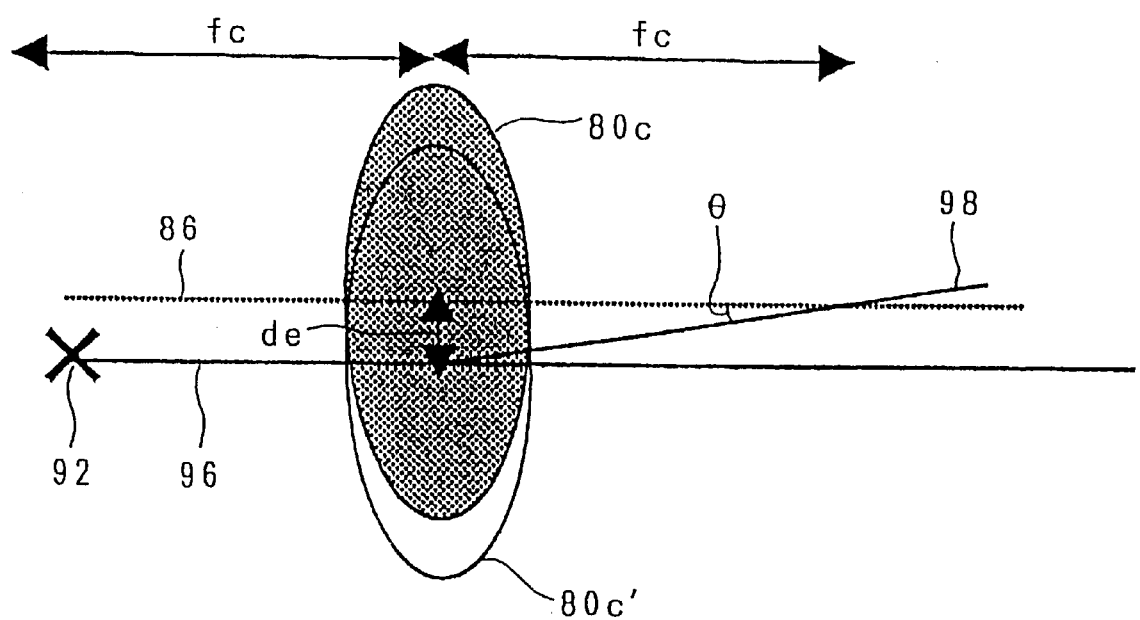

There is still another alternative operation principle. In FIG. 10, a compound lens 80a and 80b is replaced by a single lens 80c, which has a focal length fc. The cases of FIGS. 8 and 9 are equivalent to the case wherein the lens 80c is moved from the center line 86 by a distance de. The light beam 96 from the light source at the position 92 is deflected into the line 98 by the lens 80c. The deflection angle $\theta$ between the lines 86 and 98 is given by the following equation $$\theta = \tan^{-1}(de/fc) \quad (8)$$

From the equations (4) and (5), the following equation (9) is established $$de = (-fc/fa)d = dc \quad (9)$$

That is, the displacement distance of the lens 80c is equal to the displacement distance d of the lens 80a minus r=~fc/fa.

Thus, the coarse adjustment of the deflection angle is made by simultaneously moving the compound lens 80a and 80b while the fine adjustment is made by moving only the lens 80a.

As has been described above, the optical deflector set consists of the lens 80a having a lower focusing power and the lens 80b having a higher focusing power so that it is possible to distribute the precision of the deflection angle to the respective lenses. For tens of channels, the precision required for the lens 80a is only a few percent. The precision required for the lens 80b is a fraction of one percent in order to provide a precision of one micron in hundreds microns between adjacent channels. In this way, the required precision or $10^{-4}$ ($10^{-4} \times 100 = 10^{-2}\%$) is distributed to the two elements. If the precision of the lens 80b is approximately $10^{-2}$(200 microns), the required precision of the lens 80b is approximately $10^{-2}$. Accordingly, the required precision is obtained by a simple method of detecting the lens position.

The above discussion also holds for a lens system that consists of three lenses or more. For example, consider a compound lens wherein another lens is added to the lens 80c, which has replaced the lens 80a and 80b. In this case, the adjustment precision of deflection angle is distributed to the three lenses. If $\alpha$ is the number of lenses, the positional precision required for the lens 80c and the new lens is reduced to approximately $10^{-1}/\alpha$ ($\alpha$=2). In this way, the use of a movable lens system of three or more lenses produces the improved effects.

Alternatively, the lens of a higher focusing power may be placed in front of the lens of a lower focusing power in the optical deflector set as viewed from the input side.

Second Embodiment

Figure 11:
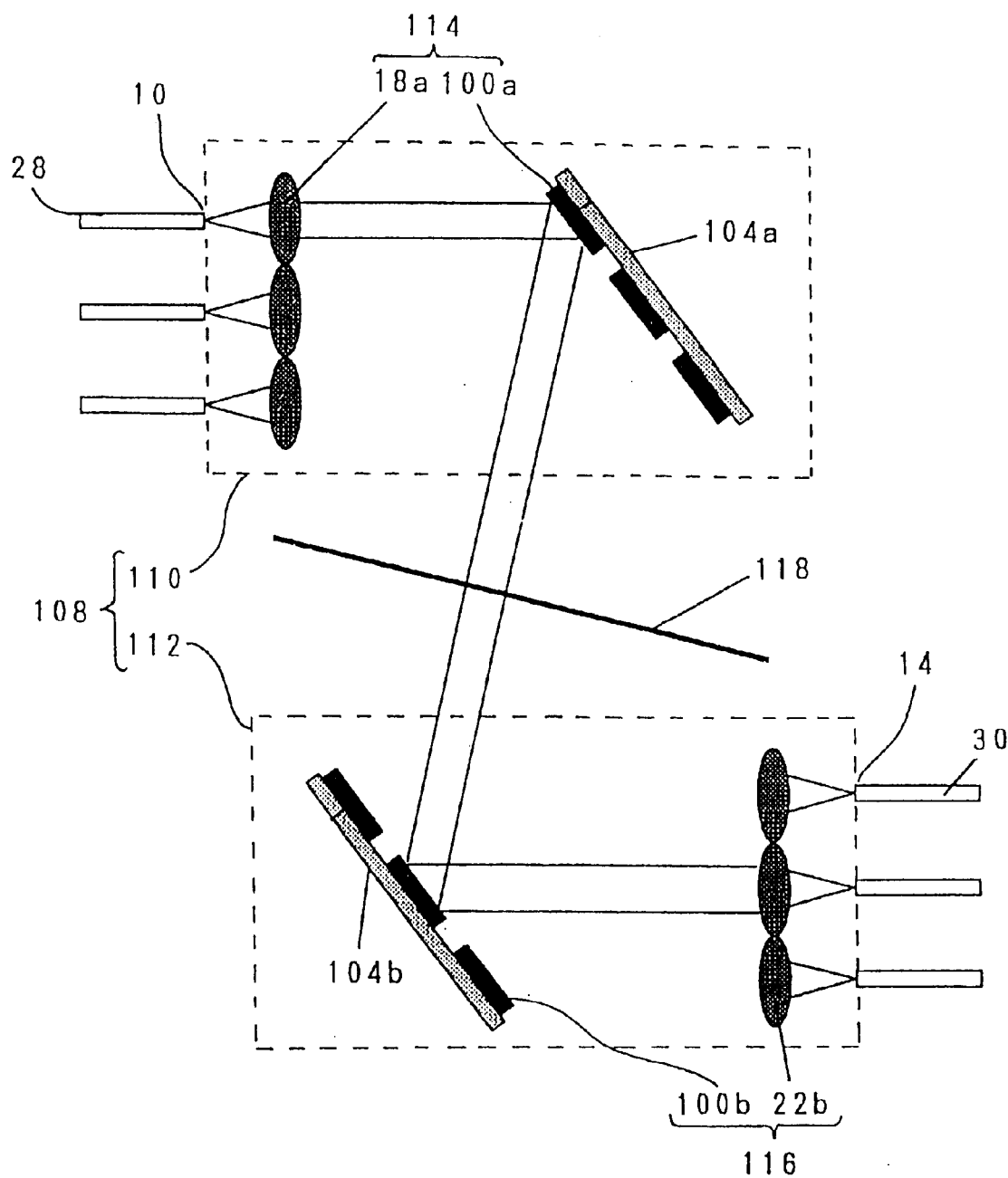
FIG. 11 is a sectional view of an optical switch according to the second embodiment of the invention.

In FIG. 11, an optical switch according to the second embodiment of the invention comprises an input switching element 110 having a plurality of input ports 10 and an output switching element 112 having a plurality of output ports 14. An input optical deflector set 114 consisting of a pair of optical deflectors 18a and 100a is provided at each of the optical input ports 10. The optical deflectors 18a and 100a are arranged along the input direction of an optical signal that is input to the optical input port 10. An output optical deflector set 116 consisting of a pair of optical deflectors 100b and 22b is provided at each of the optical output ports 14. The optical deflectors 100b and 22b are arranged along the output direction of an optical signal that is output from the optical output port 14. The input and output switching elements 110 and 112 are identical in terms of structure.

In this embodiment, the optical input members for the input switching element 110 are optical fibers 28. The output end face of each optical fiber 28 is connected to the optical input port 10. The optical output members for the output switching element 112 are optical fibers 30 with the input end faces connected to the optical output ports 14.

Figure 12:
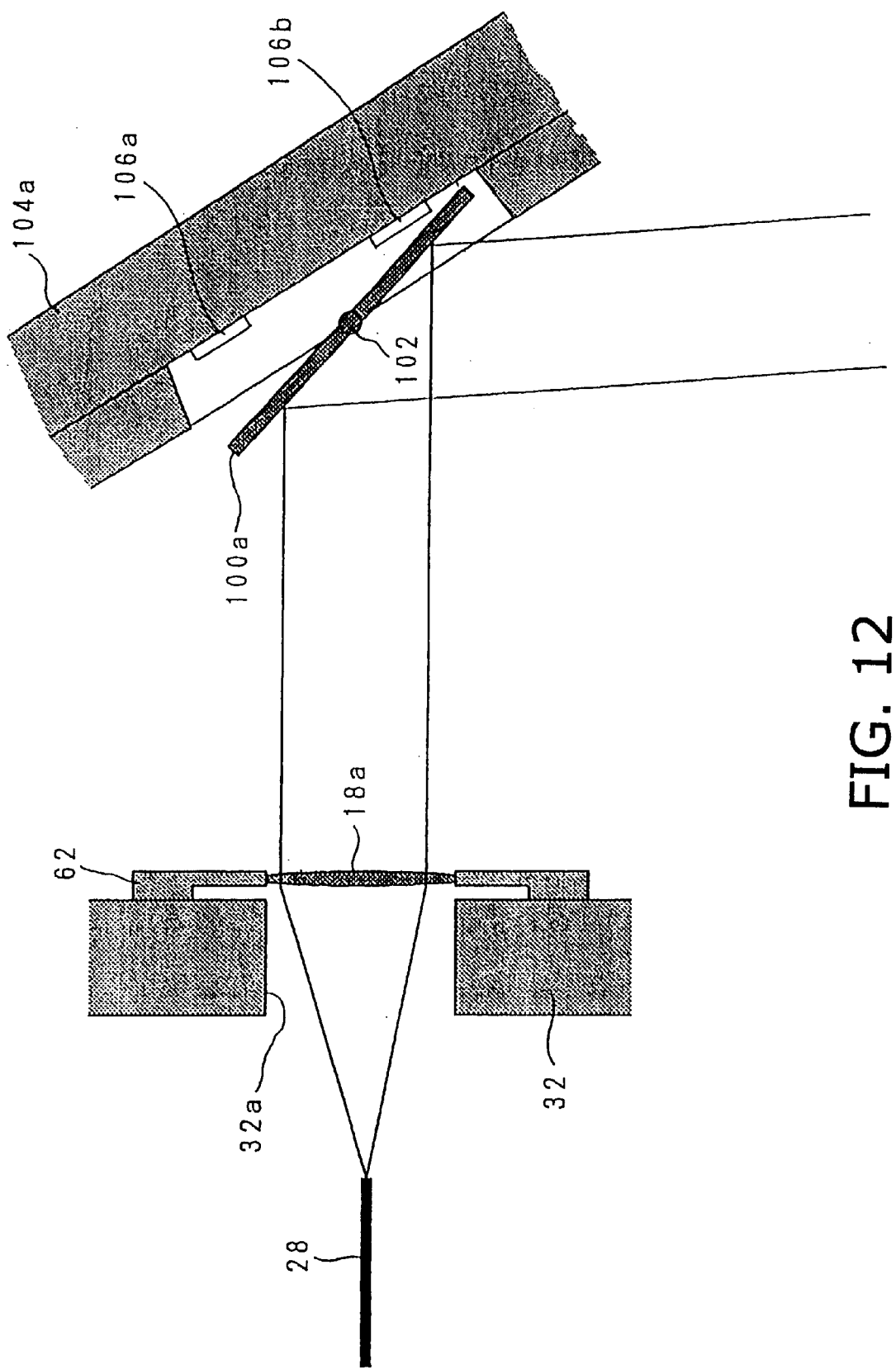
FIG. 12 is a sectional view of the essential part of the optical switch of FIG. 11.

In FIG. 12, the output switching element 112 is identical with the input switching element 110 as shown. An optical deflector 18a of the input optical deflector set 114 is provided on a substrate 32. The other optical deflector 100a of the same input optical deflector set 114 is provided on a substrate 104a. The optical deflectors 22b and 100b of the output optical deflector set 116 are provided on a substrate (not shown) and the substrate 104a, respectively. The optical deflectors 18a and 22b employ movable lenses that are movable in a plane perpendicular to the input or output direction of an optical signal. The optical deflectors 100a and 100b employ movable mirrors.

Thus, the optical switch according to the second embodiment is different from that of the first embodiment in that the movable mirror replaces one of the movable lenses. The light beam passes through the optical switch from the movable lens 18a to the movable lens 22b via the movable mirrors 100a and 100b.

The movable mirror 100a has a rotation axis (hinge) 102 that is perpendicular to the input direction of an optical signal from the optical fiber 28. It is fixed to the substrate 104a via the hinge 102. A pair of electrodes 106a and 106b are provided on the substrate 104a at positions that are opposed to the movable mirror 100a. When either of the electrodes 106a and 106b is charged, the electrostatic attraction pulls the side of the movable mirror 100a. Consequently, this movable mirror 100a is operationally equivalent to the movable lens 18b of FIGS. 1–3. Thus, it is possible to make both coarse and fine adjustment of the deflection angle. The precision of the deflection angle is distributed to the respective optical deflectors.

Alternatively, in FIG. 11, a mirror 118 is provided between the optical deflectors 100a and 100b so that the switching element 110 not only deflects the input light beam but also outputs the deflected light beam, thus eliminating the output switching element 112.

Third Embodiment

The third embodiment has a structure to increase the number of channels in the optical switch. The optical switch equipped with no such a structure has the following disadvantage.

Figure 13:
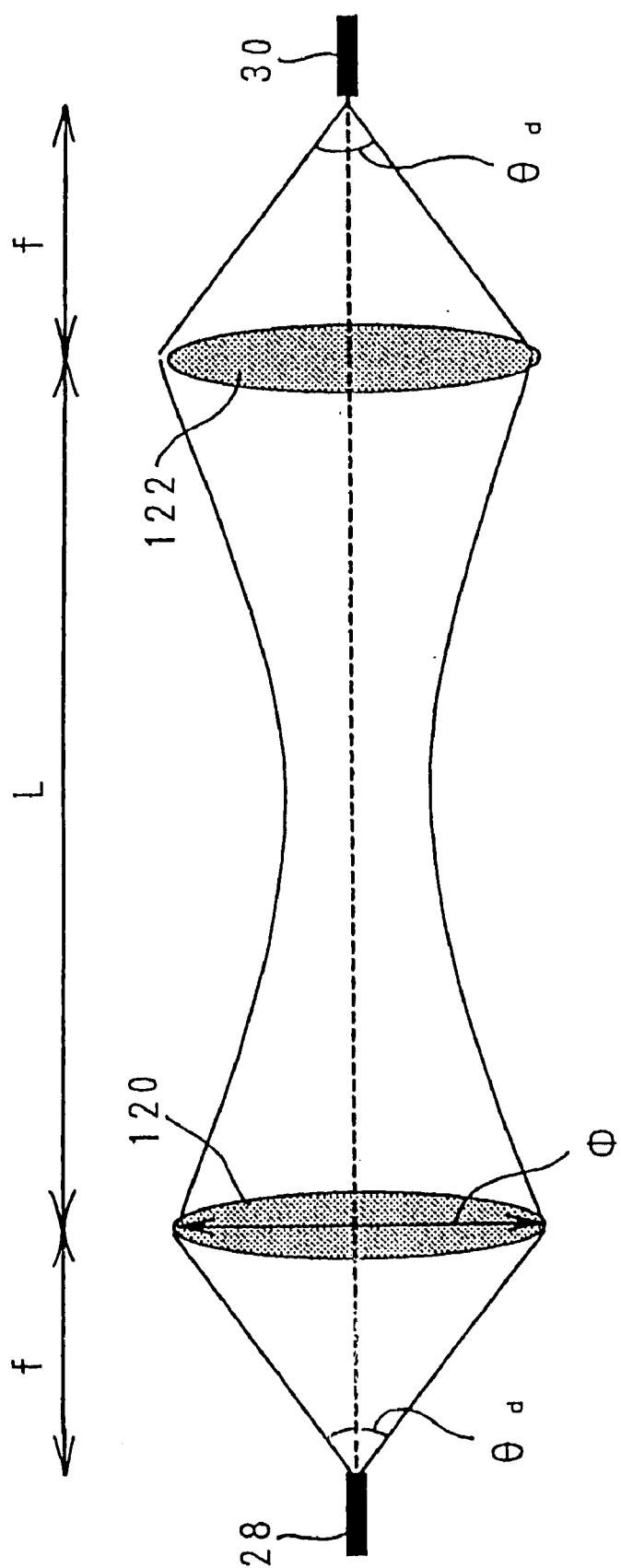
FIG. 13 is a sectional view of the essential part of a typical optical switch.

In FIG. 13, the typical optical switch comprises a collimator system consisting of a pair of collimator lenses 120 and 122 between optical fibers 28 and 30. In the equipment having a movable lens type optical deflector, the collimator lenses 120 and 122 are moved to deflect a light beam. In the system with a movable mirror type optical deflector, the deflection of a light beam is made by the movable mirror that is provided in the optical path. If the distance between the collimator lenses 120 and 122 is L, the focal length of the lenses 120 and 122 is f, and the maximum diameter of a light beam is $\Phi$, then, considering the effects of refraction, the following formula must be met $$L < \pi \Phi^2 / \lambda \tag{10}$$

wherein $\lambda$ is the wavelength of light. If the input/output angle of the optical fiber 28 or the refraction angle is $\theta_d$, then the following relation exists.

$$\Phi = f\theta_d \tag{11}$$

Figure 14:
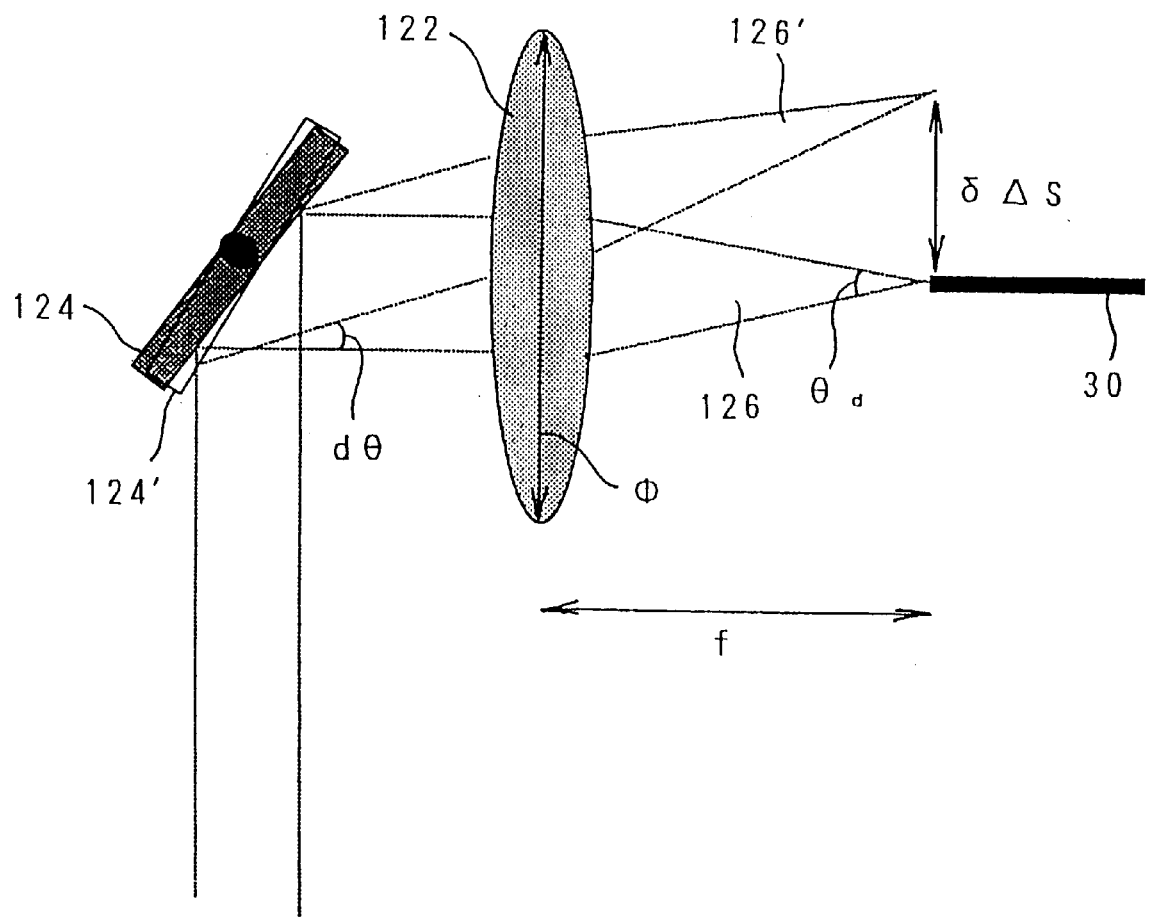
FIG. 14 is a sectional view of the essential part of a movable mirror type optical switch.

The precision calculation will be made for the movable mirror type optical switch with reference to FIG. 14, wherein the output switch elements are shown. That is, the light beam deflected by the input optical deflector (not shown) is deflected by the output movable mirror 124, condensed by the lens 122, and input to the optical fiber 30. Where the movable mirror 124 is at the right angle, the light beam 126 is input to the optical fiber 30 at the right position. If the mirror 124 is displaced to the mirror 124', the light beam 126' is focused at a position far from the optical fiber 30. If the angular displacement caused by the mirror displacement is d$\theta$, then the shift of the focal point $\theta\Delta S$ is given by $$\delta\Delta S = fd\theta \tag{12}$$

This angular displacement d$\theta$ is caused by the angular displacement of not only the output movable mirror 124 but also the input movable mirror as used for the input optical deflector.

As has been described above with reference to FIGS. 1 or 11, the 3-D optical wiring is made between the input and output ports. Each port has input and output optical deflectors. For an optical switch of N channels, $N^{1/2}$ optical deflectors are arranged in each of N1/2 rows in a plane parallel to the port arranging plane. The respective optical deflectors are arranged with a pitch of 4$\Phi$ or more so as to prevent crosstalk. Consequently, the length of a section of the port arranging plane is $4\Phi 10^{-2}$. Accordingly, the required maximum tilt mirror angle $\theta$m is given by $$\theta m = 2\Phi N^{1/2}/L \tag{13}$$

From the equations (10) and (13), the following formula is derived $$\Phi > 2\lambda N^{1/2}/(\pi\theta m) \tag{14}$$

In order to express the mirror angle precision with %, if $\epsilon = \sigma\theta/\theta m$, then from the equations (11), (12), and (14), the following formula is derived $$N < \{\pi\theta_d \delta\Delta S/(2\epsilon\lambda)\}^2 \tag{15}$$

If $\theta\Delta$Sm is the minimum value of the focal point displacement within the loss, then $$N = \{\pi\theta_d \delta\Delta Sm/(2\epsilon\lambda)\}^2 \tag{16}$$

The equation (16) indicates that the number of channels N can be increased by not only improving (reducing) the error precision $\epsilon$ but also increasing the refraction angle $\theta_d$ of the optical fiber. Also, it can be increased by increasing the value of $\sigma\Delta$Sm. In the case of a single mode optical fiber, however, the mode diameter of the optical fiber must be increased to increase $\sigma\Delta$Sm, which decreases $\theta_d$d, producing no effects.

An example of the calculation of channel number N will be given. If the values of $\sigma\Delta$Sm and $\theta_d$ for a typical single mode optical fiber are one micron and 0.2 radian, respectively, and the error $\epsilon$ and the wavelength $\lambda$ are 1% and 1.55 microns, respectively, then N=100.

The similar analysis will be made for the movable lens optical deflector with reference to FIGS. 15 and 16, wherein the essential part of the movable lens optical switch is shown.

Figure 15:
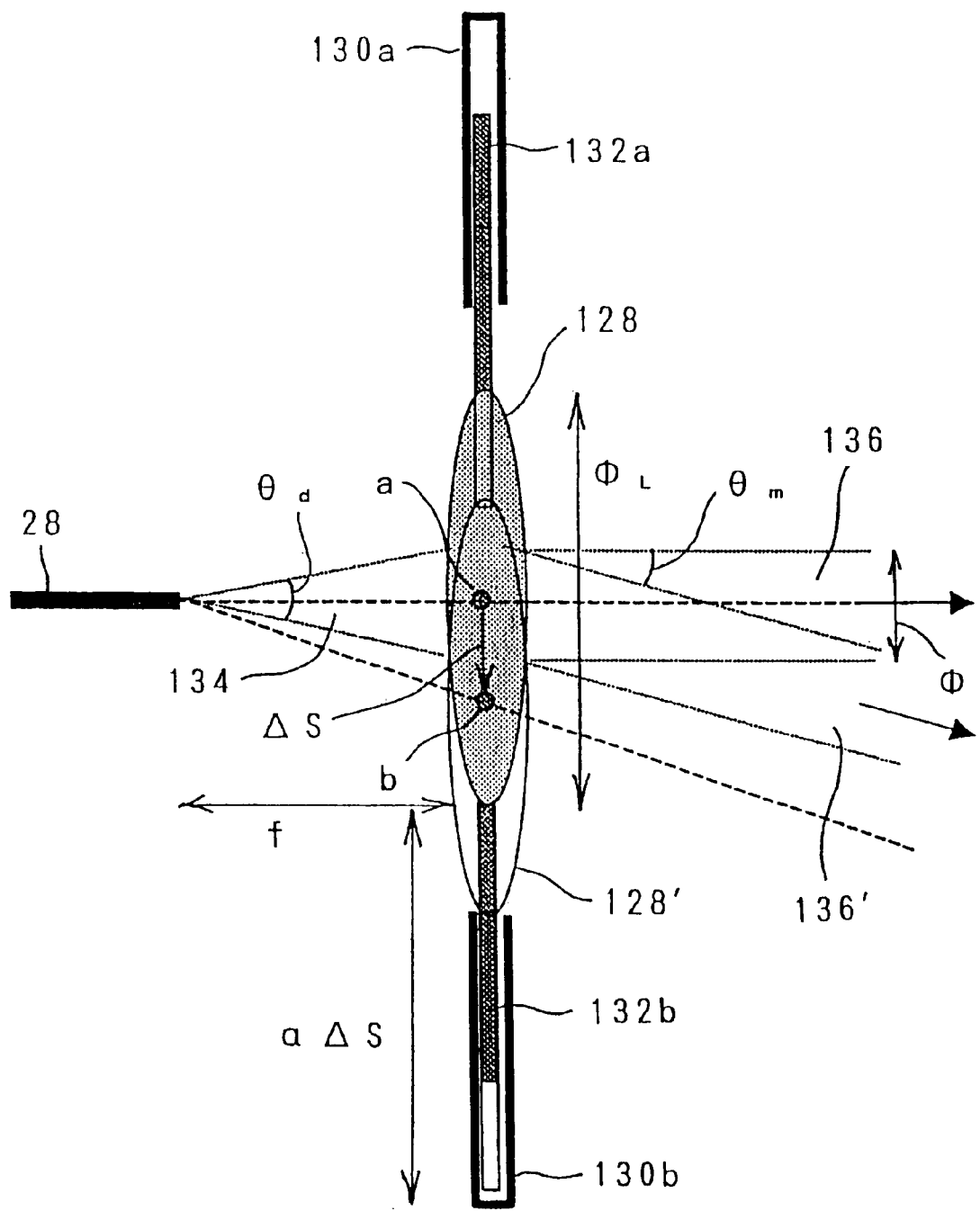
FIGS. 15–16 are sectional views of the essential part of a movable lens type optical switch.

In FIG. 15, the light beam output from the input optical fiber 28 is deflected by the input movable lens 128. The actuators 130a and 130b include motors to move the movable lens 128. Beam members 132a and 132b transmit forces from the actuator to the lens 128. The reference characters a and b indicate the centers of the respective movable lenses 128 and 128'.

Figure 16:
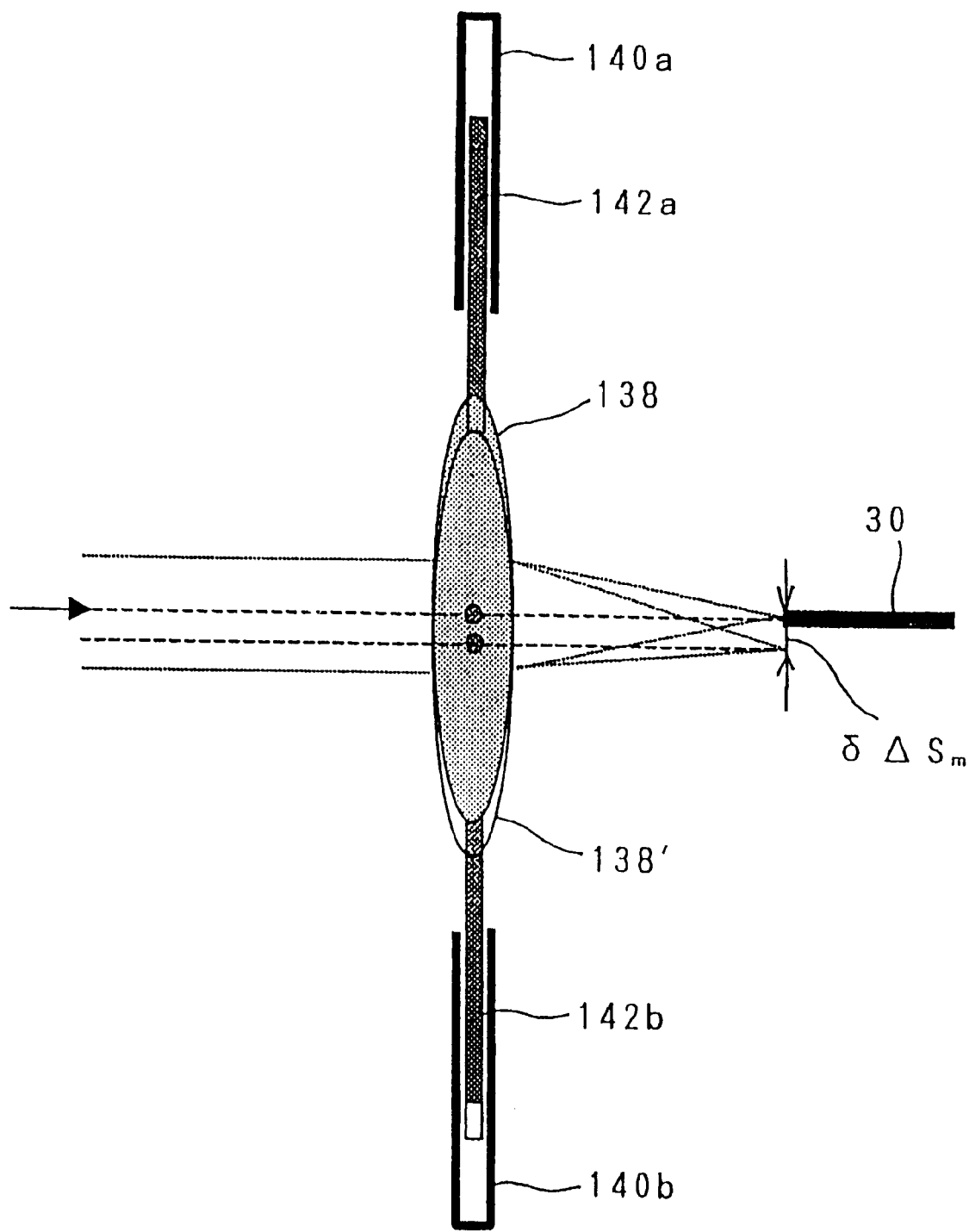

In FIG. 16, the light beam deflected by the input movable lens 128 is condensed by the output movable lens 138 into the optical fiber 30. The actuators 140a and 140b includes motors to move the movable lens 138. Beam members 142a and 142b transmit forces from the actuator to the lens 138. Also shown is the moved lens 138'.

As shown in FIG. 15, the light beam 134 from the optical fiber 28 is collimated by the movable lens 128. When the movable lens 128 is moved to the position 128', the collimated beam 135 is deflected to be the light beam 136'. As shown in FIG. 16, the process is reversed on the output side. The light beam deflected on the input side is input to the optical fiber 30 via the lens 138 (138').

If the displacement of the lens is $\Delta S$, the deflection angle $\theta$ is expressed by $$\theta = \Delta S/f \tag{17}$$

Since the diameter $\Phi_L$ of the lens 128 must cover the diameter $\Phi$ of a light beam at the maximum value of the displacement of the lens $\Delta S$, the following equation (18) must be established.

$$\Phi_L = \gamma(2\Delta S + \Phi) \qquad (18)$$

Wherein $\gamma$ is a parameter that meets $\gamma>1$. The accommodation space for both the actuators is expressed by $2\alpha\Delta S$, wherein the parameter $\alpha$ meets $\alpha>1$. Accordingly, the size of the optical deflector is $\Phi L + 2\alpha\Delta S$. Therefore, the length of a section of the port arranging plane is $(\Phi_L + 2\alpha\Delta S)N^{1/2}$. Thus, the required maximum deflection angle $\theta m$ is given by $$\theta m = (\Phi_L + 2\alpha\Delta S)N^{1/2}/L \qquad (19)$$

From the equations (10), (11), (18), and (19), the following equation is derived.

$$\theta m = N^{1/2}\{\gamma(2\Delta S + f\theta_d) + 2\alpha\Delta S\}/\{\pi(f\theta_d)^2/\lambda\} \qquad (20)$$

If the maximum displacement is $\Delta S_{MAX}$, then the equation (17) gives $\Delta S_{MAX}/f = \theta m$. Thus, the value of f is given by the following equation (21).

$$f = \Delta S_{MAX} N^{1/2}(2\gamma + 2\alpha)/\{\pi\theta_d \Delta S_{MAX}/\lambda - \gamma N^{1/2}\} \qquad (21)$$

From the equations (21) and (10), the value of L is determined.

If the output error is expressed by % and $\sigma\Delta Sm/\Delta S_{MAX} = \epsilon$, the following equation (22) is obtained.

$$L = (\pi/\lambda)(\delta\Delta Sm/\epsilon)N^{1/2}(2\gamma + 2\alpha)/\{\pi\theta_d(\delta\Delta Sm/\epsilon)/\lambda - \gamma N^{1/2}\} \qquad (22)$$

The larger the number N of channels, the larger the length L. Similarly to the movable mirror, the larger the $\theta_d$, the smaller the length L, making the feasibility higher.

An example of calculation is as follows. If $\alpha=1$, $\gamma=1$, and the other parameters are the same as those of the movable mirror, then N=529 and L=28 (cm).

As has been described above, in order to increase the number of channels, N, it is necessary for L to be large (long). In order to make L long, the beam diameter $\Phi$ must be large. However, if the refraction angle $\theta_d$ an optical fiber is small, the focal length becomes large, increasing the focal point displacement caused by the angular error.

Third Embodiment

In order to increase the number of channels, an optics or optical system for enlarging the refraction angle $\Phi_d$ of an optical fiber is employed. The basic structure of an optical switch according to the third embodiment is substantially the same as the structure of FIG. 13. That is, it comprises an input optical fiber connected to the input port, an output optical fiber connected to the output port, and a collimator system provided between these optical fibers. An optical deflector consisting of a movable lens or mirror is provided on each of the input and output sides.

Figure 17:
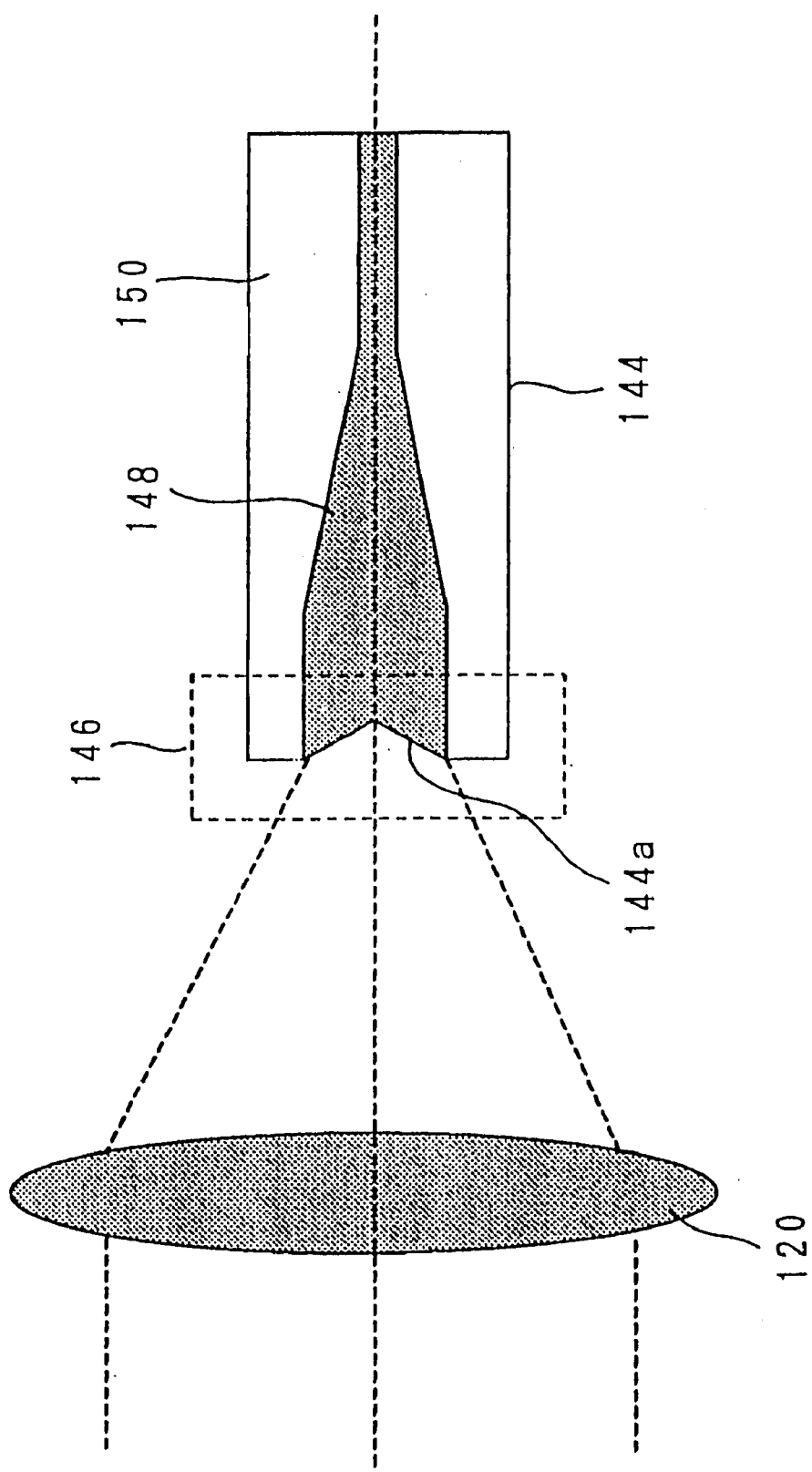
FIG. 17 is a sectional view of the essential part of an optical switch according to the third embodiment of the invention.

FIG. 17 shows an input collimator lens 120 and an input optical fiber 144. No optical deflector is shown, but the collimator lens 120 can be used as a movable lens. The end face of the optical fiber 144 is used as an input port. The output structure is identical with the structure of FIG. 17.

An optics or optical system 146 is provided at the input port of the input optical fiber 144 to increase the input angle of the input optical fiber. Similarly, an optics or optical system is provided at the output port of the output optical fiber. The optics 146 is provided at the end portion of the optical fiber 144. The end portion of the optical fiber 144 includes a core 148 with a tapered end face 144a and a clad 150 for covering the core 148. The end face (emergent face) 144a has a concave or conic form.

The light takes a plane wave form in the end portion of the optical fiber 144. This plane wave is reflected or refracted at a desired angle. If the emergent face 144a makes a conic reflector, the light travels as a concentric beam and, past the collimator lens 120, propagates as a Bessel beam. If the emergent face 144a makes a conic refractor, the results are the same. The diffraction angle $\theta_d$, however, is no greater than 48 degrees due to the limited total reflection angle. It still is four times better than the ordinary system.

The emergent face 144a can take another form such as a concave lens. The tapered configuration of the core 148 is not essential but increases the tolerance for the focal error. Also, an multi-mode interference (MMI) coupler structure may be employed.

The operation of this optical switch will be described. If the collimator lens 120 is movable, it is moved based on the information about which output collimator lens receives the input light. This results in switching between channels. A fine angle adjustment is made to the output collimator lens to input the maximum amount of light to the output optical fiber. The required switching angle is determined by the output lens pitch, the number of lenses, and the distance L between input and output deflector elements. For the movable mirror type, this angle may be set regardless of the diffraction angle $\theta_d$. For the movable lens type, the shorter the focal length f, the larger the deflection angle, reducing the distance L. By increasing the diffraction angle $\theta_d$, it is possible to reduce the distance f between the lens 120 and the focal plane while maintaining the required beam width. Thus, the focal displacement $fd\theta$ relative to the angular displacement $d\theta$ is reduced.

In the above optical switch, by multiplying the diffraction angle by n, it is possible to increase the number of feasible channels N to $n^2$ with the same precision. That is, if the number of channels is N, then the required precision is reduced by a multiple n.

Where the emergent face 144a is a concave lens, it is necessary to solve the problem that the angular displacement in front of the lens is magnified. That is, the loss reduction by the displacement decrease is offset by the loss increase effected by the increase of the input angle displacement. The use of the above form for the emergent face 144a avoids this problem.

Figure 18:
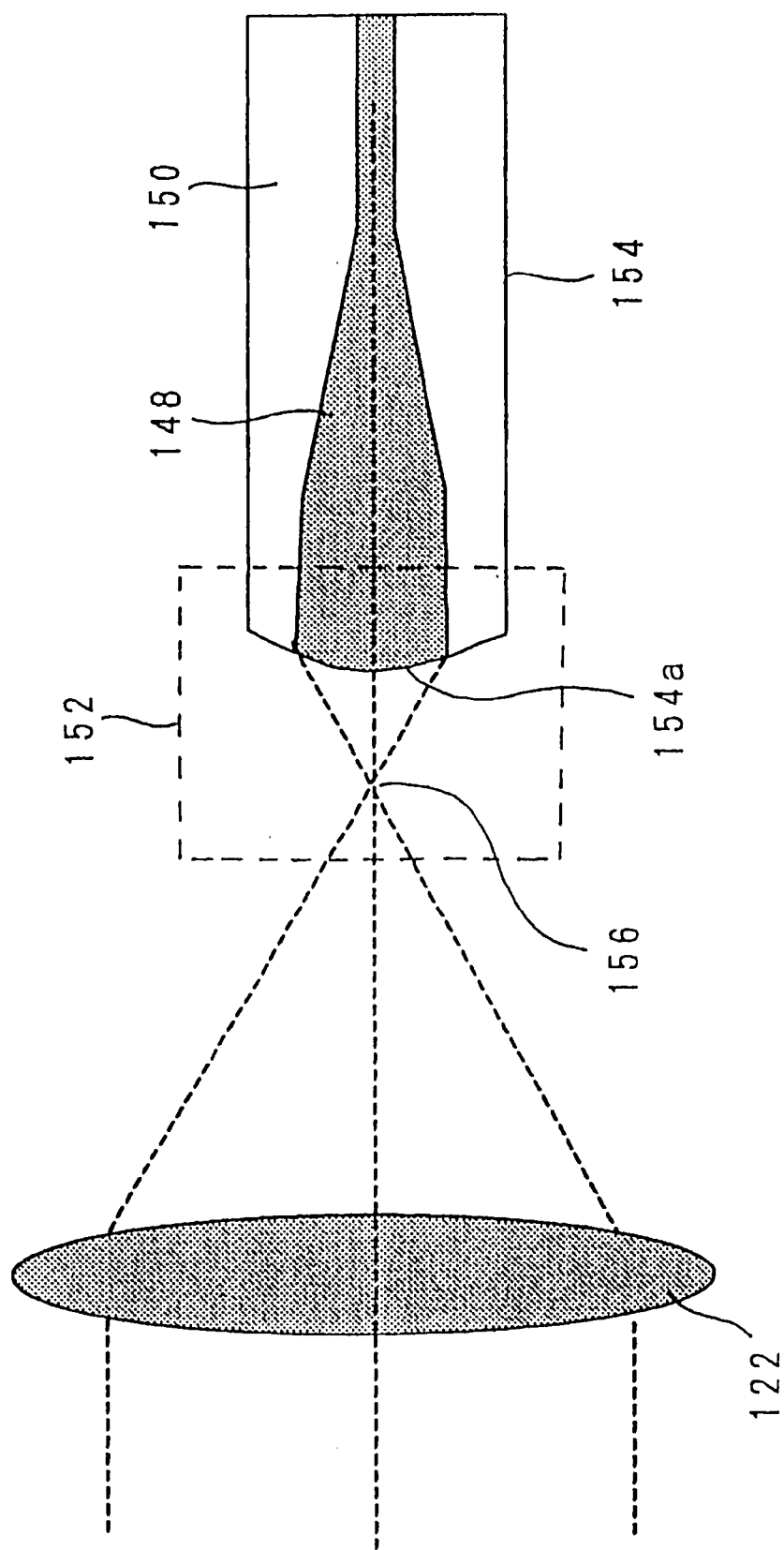
FIG. 18 is a sectional view of a variation to the essential part of the third embodiment.

FIG. 18 shows a variation to the optical switch according to the third embodiment, which comprises an output collimator lens 122 and an output optical fiber 154. The end face of the optical fiber 154 is used as an optical output port. The input configuration is identical with the output configuration.

An optical system 152 has an input face 154a that is made at the end of an optical fiber 154 in the form of a convex lens. The input face 154a has a focal point 156 that is also the focal point of the collimator lens 122. If the focal length of this convex lens is small, the diffraction angle is large. Consequently, the light beam input to the collimator lens 122 is output to the optical fiber 154 with the magnified angular displacement. If the ratio of focal points of the convex lens and the collimator is r, the magnification is r. The value of r is equal to the ratio of the required beam diameter $\Phi$ and the mode diameter of the optical fiber. The allowable input angle to the optical fiber 154 is approximately 1.5 times at 0.5 dB. The core 148 of the optical fiber 154 is tapered so as to limit the ratio r, while keeping the allowable angle.

Fourth Embodiment

The optical system to increase the diffraction angle $\theta_d$ according to the third embodiment may be replaced by an optical system to increase the beam diameter $\Phi$. The basic structure of an optical switch according to the fourth embodiment is identical with that of FIG. 13. That is, it comprises an input optical fiber connected to the light input port, an output optical fiber connected to the light output port, and a collimator provided between these optical fibers. At each of the input and output there is provided an optical deflector composed of a movable lens or mirror.

Figure 19:
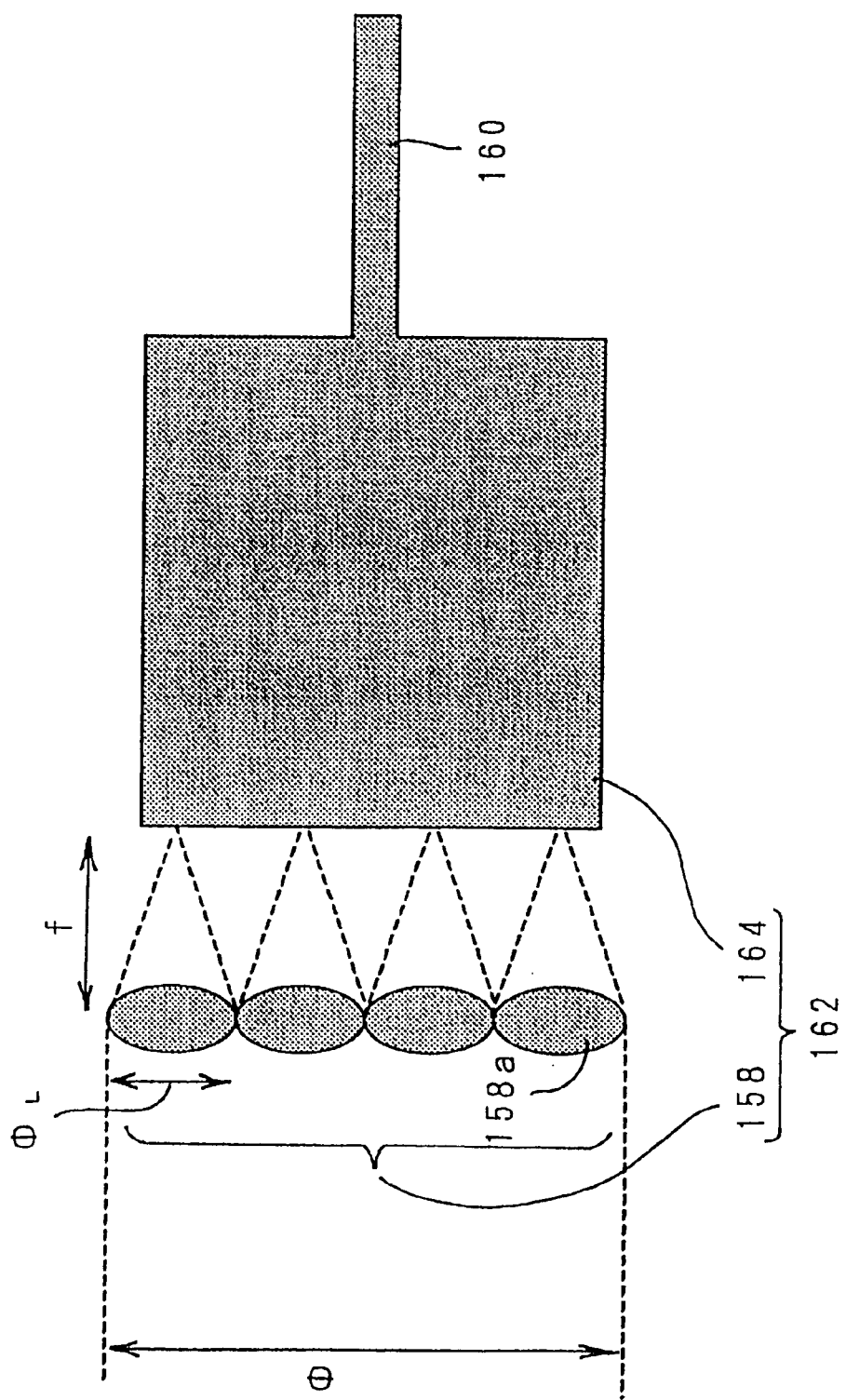
FIG. 19 is a sectional view of the essential part of an optical switch according to the fourth embodiment of the invention.

In FIG. 19, this optical switch comprises an output collimator lens 158 and an output optical fiber 160. The end face of the optical fiber 160 is used as the above light output port. The input structure is identical with that of FIG. 19. The optical deflector and the clad of the optical fiber 160 are not shown in the figure.

This optical switch further comprises an optical system at each of the light input and output ports to increase the beam diameter. An optical system 162 provided at the light output port of the optical fiber 160 is shown in this figure. The optical system 162 is composed of a $m^2 \times 1$ coupler 164 (m is an integer) and a collimator lens 158. The $m^2 \times 1$ coupler 164 is a widened waveguide portion joined with the end of the optical fiber 160. The collimator lens 158, which is faced to the end face of the coupler 164, is composed of a plurality of smaller lenses 158a.

The respective beams condensed by the smaller lenses 158a is combined by the coupler 164 and input into the optical fiber 160. Thus, the required diffraction angle is reduced to $1/m$ ($\Phi_L/\Phi$) for the same beam diameter and focal length.

Where the number of smaller lenses 158a is limited, there are secondary beams. Consequently, it is necessary to set the distance and pitch (angle) between the input and output optical deflectors so as to avoid the reception of undesired input light (secondary beams). The smaller lenses 158a as a collimator may be replaced by another element with equivalent functions such as a diffraction grating or spherical mirror.

With the above optical switch, it is possible to increase the number of feasible channels N by $n^2$ times at the same precision by increasing the diffraction angle by n times. That is, if the number of channels is N, the required precision is n times lower than the conventional one.

Fifth Embodiment

Figure 20:
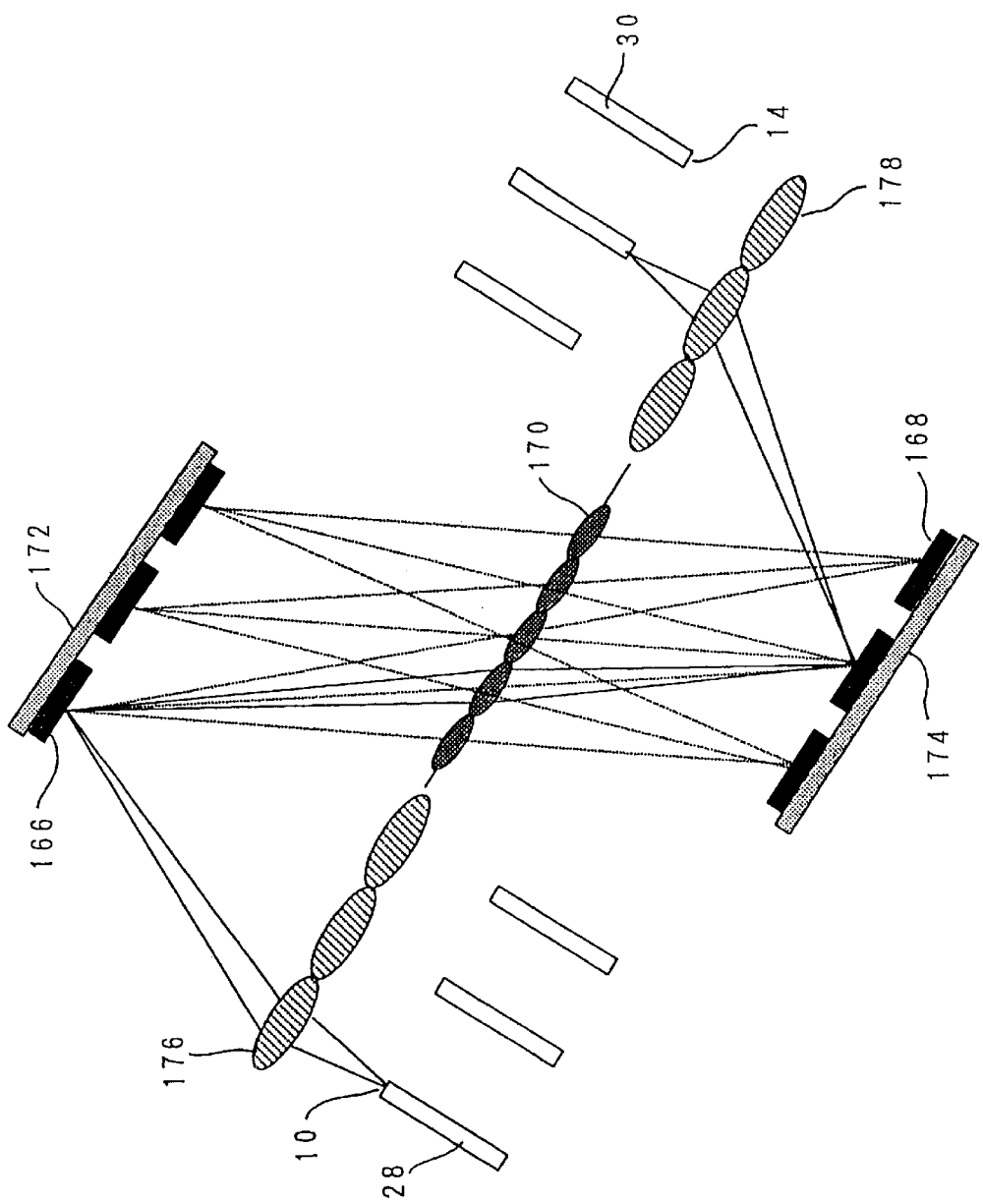
FIG. 20 is a sectional view of an optical switch according to the fifth embodiment of the invention.

In FIG. 20, an optical switch according to the fifth embodiment comprises a plurality of light input ports 10 and a plurality of light output ports 14. At each of the light input ports 10 there is provided an input optical deflector or movable mirror 166 that has a rotation axis perpendicular to the input direction of an optical signal. Similarly, at each of the light output ports 14 there is provided an output optical deflector or movable mirror 168 that has a rotation axis perpendicular to the output direction of an optical signal. An optical element 170 is provided between the input and output optical deflectors 166 and 168 to condense the light beams reflected by the movable mirror 166 onto the output movable mirror 168.

An optical fiber 28 is used as a light input member to each light input port 10. The output end face of the optical fiber 28 is connected to the light input port 10. Similarly, an optical fiber 30 is used as a light output member from each light output port 14. The input end face of the optical fiber 30 is connected to the light output port 14. The number of movable mirrors 166 provided on a substrate 172 corresponds to the number of light input ports 10. Similarly, the number of movable mirrors 168 provided on a substrate 174 corresponds to the number of light output ports 14. The structure of the movable mirrors is substantially identical with that of FIG. 11.

A collimator lens 176 is provided for each of the light input ports 10 between the light input port 10 and the movable mirror 166. Similarly, a collimator lens 178 is provided for each of the light output ports 14 between the light output port 14 and the movable mirror 168. These collimator lenses may be replaced by movable lenses. In this embodiment, the collimator lens is made of a diffraction grating element that is able to condense light at a given direction.

The above optical element 170 is for the collimator that is composed of a plurality of lenses arranged in a plane. Where the movable mirrors 166 and 168 lie in a straight line through the optical element 170, they are arranged such that their pitch becomes twice the pitch of lenses that constitute the optical element 170. The diameter of the lenses depends on the collimator length and is given by the above equation (10).

The dotted lines show how light travels the respective elements. The relay lenses of the optical element 170 are arranged so as to face the respective movable mirrors 166 and 167. Consequently, all of the beams pass through the optical element 170. The diameter of relay lenses of the optical element 170 must be larger than a certain diameter so as to suppress diffraction. This diameter is equal to the diameter of a movable mirror that is provided at a position where the collimated beam has the maximum diameter in the optical switch disclosed in the above-mentioned reference (1). Specifically, it is approximately 200–300 $\mu$m. Similarly to the movable mirrors 166 and 168, the lenses 176, 178, and 170 may be formed on a substrate. By inserting convex lenses between the movable mirror 166 and 168 and the optical element 170, the pitch of lenses of the optical element 170 can be reduced.

By making the distance between the light input port 10 and the collimator lens 176 and the distance between the light output port 14 and the collimator lens 178 much smaller than the distance between the lens 176 and the movable mirror 166 and the distance between the lens 178 and the movable mirror 168, respectively, the control error of the movable mirror 166 can be reduced.

The beam from the optical fiber 28 is condensed by the lens 176 and deflected (at a fixed angle) toward the movable mirror 166, which deflects the beam toward a desired output movable mirror 168. The beam reflected by the input movable mirror 166 is condensed by the optical element 170. Then, the output movable mirror 168 deflects the beam toward a desired collimator lens 178. The beam condensed by the collimator lens 178 is input to the optical fiber 30 connected to the light output port 14 that corresponds to the lens 178.

Thus, the mirror 168, the lens 178, and the optical fiber 30 on the output side from the lens 170 operate in the reverse order of the input side optical elements. For this reason it is preferred that the lenses 176 and 178 are of the hologram type that is able to do both condensation and deflection. This makes it possible to arrange the output and/or input ends of the optical fibers 28 and/or 30 in parallel to the lenses 176, 178, and 170 so that it is possible to condense all beams from the optical fibers 28 or 30 so as to minimize the diameter of collimated beams at the mirror 166 or 168. The central position, on the movable mirror 166 or optical fiber 30, of an optical beam condensed and deflected by the lens 176 or 178 is hardly changed by change of the deflection angle. Although the input angle to the optical fiber varies, it has less influence than change of the condensation position so that the loss variation is small.

Figure 21A:
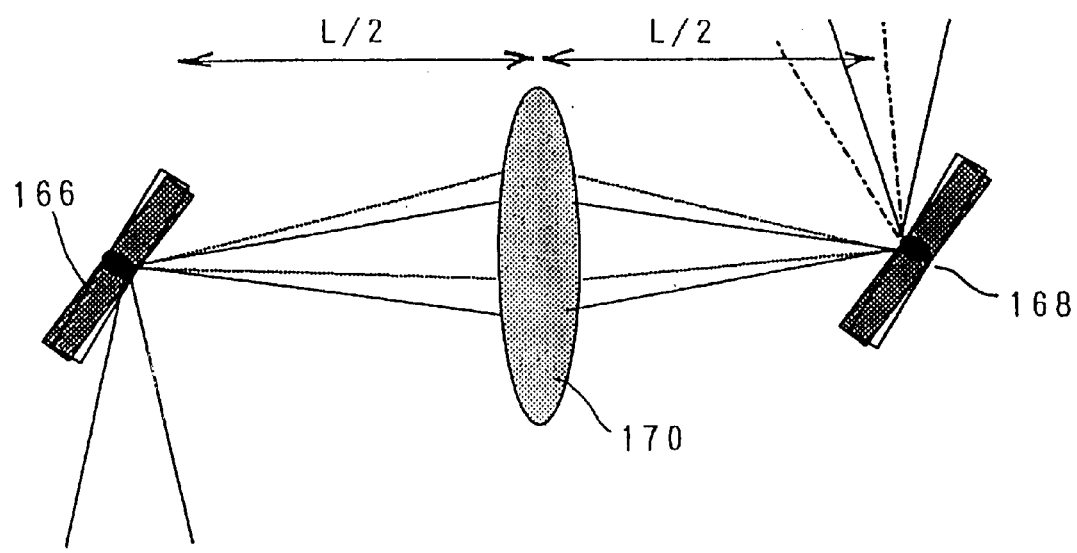
FIGS. 21(A)–(B) and 22 are schematic diagrams for use in describing error analyses by light beam matrices.
Figure 21B:
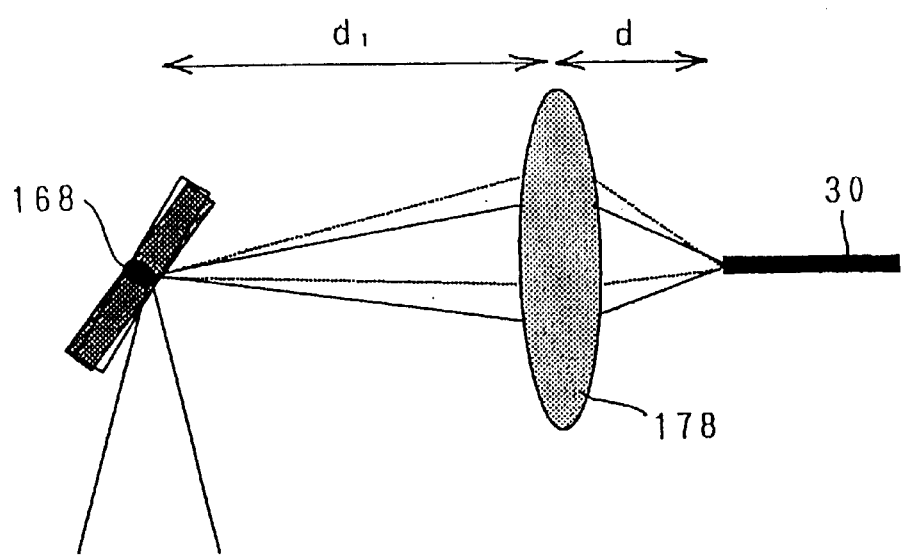
Figure 22:
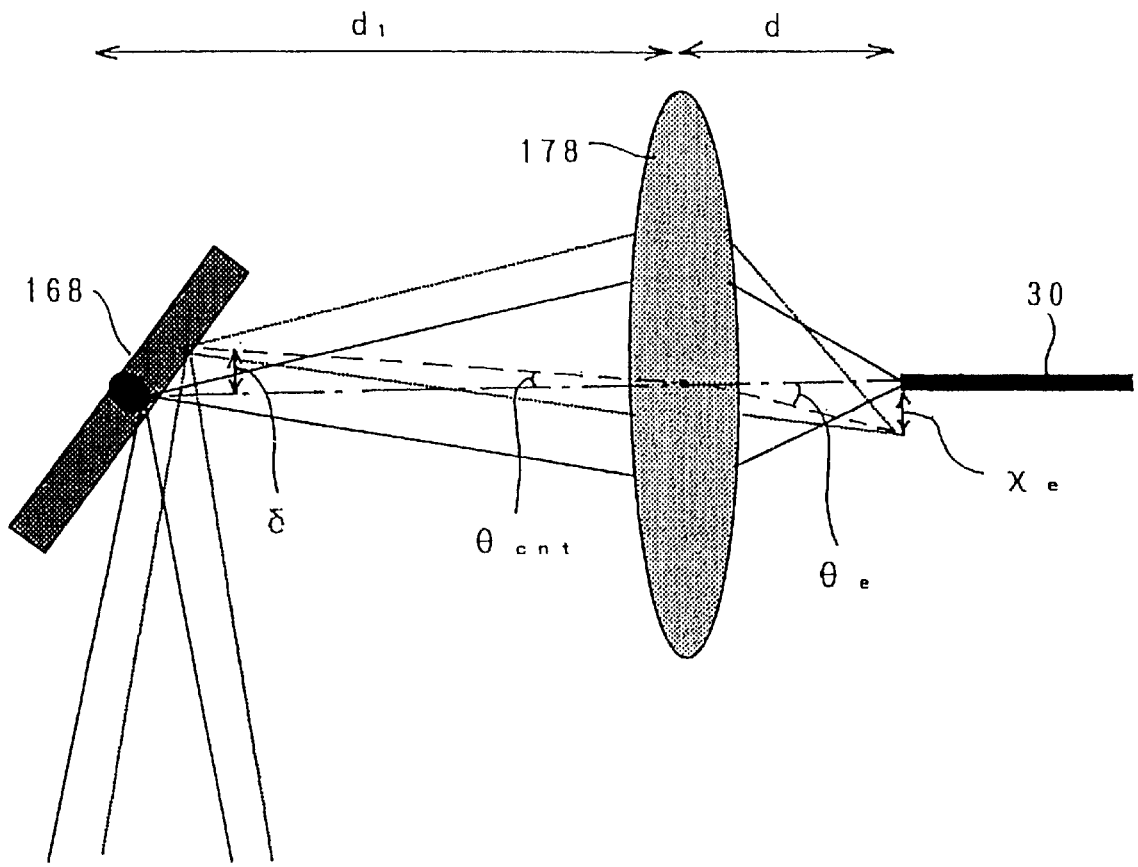

Error analysis by light ray matrix will be made with reference to FIGS. 21(A), 21(B), and 22. FIG. 21(A) shows the movable mirror 166, the optical element 170, and the movable mirror 168 of the optical switch of FIG. 20. FIGS. 21(B) and 22 show the movable mirror 168, the collimator lens 178, and the optical fiber 30 of the optical switch of FIG. 20.

The analysis by the light ray matrix employs a vector consisting of a light ray position and a light ray angle. A 2×2 matrix (M) is used as the light ray matrix to describe how the light ray changes past a certain optical system. The first row, first column element, the first row, second column element, the second row, first column element, and the second row, second column element are represented by m11, m12, m21, and m22.

In the case of FIG. 21(A), the light ray matrix relative to the movable mirror 166 and the lens 170 is expressed by the following equations (23a)–(23d)

$$m11 = 1 - L/(2f) \quad (23a)$$

$$m12 = L - L^2/(4f) \quad (23b)$$

$$m21 = -1/f \quad (23c)$$

$$m22 = 1 - L/(2f) \quad (23d)$$

wherein f is the focal length of the lens 170. The distances between the mirror 166 and the lens 170 and between the lens 170 and the mirror 168 are L/2, respectively. If L/2=2f, the light ray matrix is expressed by the following equations (24a)–(24d)

$$m11 = -1 \quad (24a)$$

$$m12 = 0 \quad (24b)$$

$$m21 = -4/L \quad (24c)$$

$$m22 = -1 \quad (24d)$$

Thus, there is no shift or displacement of the position on the mirror 168 due to the angle of the mirror 166. Also, it is possible to eliminate the angular shift due to the shift of the focal point on the mirror 168 caused by the angle of the mirror 166.

If the light input angle to the optical fiber 30 is θe, the positional displacement of a light beam at the input end face of the optical fiber 30 is σ, and the angle of the mirror 168 is $\theta_{cnt}$, $$\theta e = -4\delta/L - \theta_{cnt} \quad (25)$$

In the case of FIG. 21(B), the light ray matrix for the mirror 168 and the optical fiber 30 is expressed by $$m11 = 1 - d/f \quad (26a)$$

$$m12 = d_1 + d - d_1 d/f \quad (26b)$$

$$m21 = -1/f \quad (26c)$$

$$m22 = 1 - d_1/f \quad (26d)$$

wherein $d_1$ is the distance between the mirror 168 and the lens 178 and d is the distance between the lens 178 and the input end face of the optical fiber 30.

If $1/d + 1/d_1 = 1/f$, then m12=0. Thus, there is no shift or displacement due to the angle of the mirror 168 in the focal point at the optical fiber 30. In this case, the light ray matrix is expressed by $$m11 = -d/d_1 \quad (27a)$$

$$m12 = 0 \quad (27b)$$

$$m21 = -1/f \quad (27c)$$

$$m22 = -d_1/d \quad (27d)$$

By reducing d/d1, it is possible to reduce the displacement of an image, $X^e = d/d_1 \sigma$, due to the displacement of a beam, σ, as shown in FIG. 22. The input angle θe to the optical fiber 30 is expressed as $$\theta e = -\delta/f - \theta_{cnt} d_1/d \quad (28)$$

The angle θe may be made substantially zero degree by adjusting the angle $\theta_{cnt}$.

In general, the allowable input angle to the optical fiber 30 is approximately 1.5 degrees, which is larger than the possible deflecting angle (6–10 degrees) of a micromachined mirror. Thus, the conditions appear to be more tolerable than the allowable error (1 μm) of the focal point, σ. If f and L are sufficiently large relative to σ, θe becomes as small as negligible.

By making the lenses 176 and 178 partially movable, it is possible to bring to the center the spot position of a beam by the mirrors 166 and 168 even if the positions of optical fibers 28 and 30 are displaced. The lenses 176 and 178 are not moved after their positions are matched, and the light path is switched by the mirrors 166 and 168. Alternatively, by making $m12 = d_1 + d - d_1 d/f = de$ small, it is possible to provide a fine adjustment of the focal point with coarse angular control of the mirrors 166 and 168. This makes it possible to adjust the assembling precision.

As has been described above, in this optical switch, the angles of the mirrors 166 and 168 are changed so much that one of the lenses of the optical element 170 is selected to switch the light path. Since the precise position of a beam is not critical as long as it strikes the lens 170, the required precision of angular control of the mirrors 166 and 168 is lowered. This makes high-speed mirror switching possible.

Figure 23:
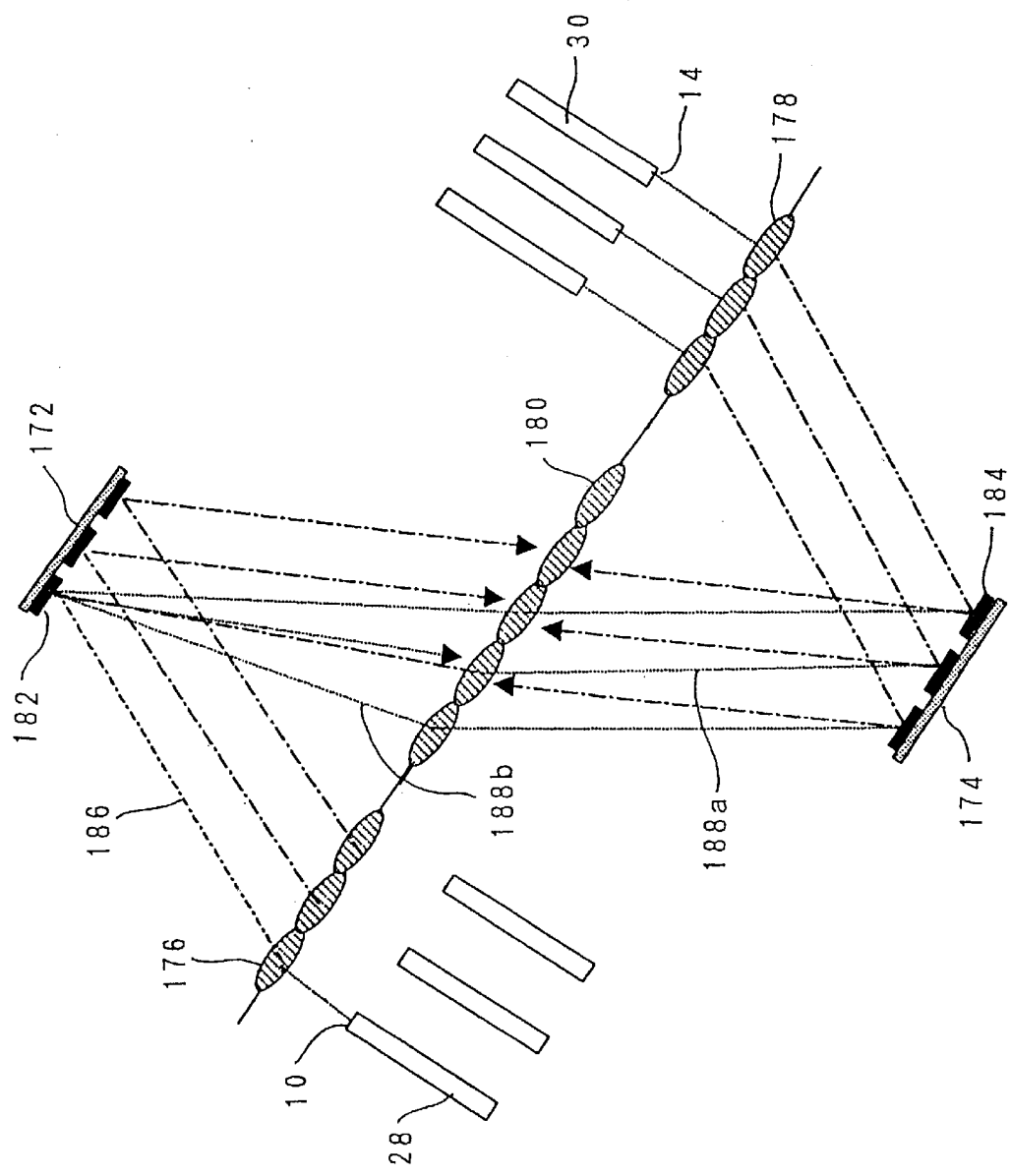
FIG. 23 is a sectional view of the first variation to the optical switch according to the fifth embodiment of the invention.

In FIG. 23, the first variation to the optical switch according to the fifth embodiment is shown. In the optical switch of FIG. 20, the pitch of the lens 170 is ½ the pitch of the mirrors 160 and 168 while, in this variation, these pitches are approximately equal. For this reason, the pitch of the mirrors 182 and 184, which correspond to the mirrors 166 and 168, is smaller than that of FIG. 20. In addition, the optical element 170 is replaced by an optical element or lens 180, such as a hologram, that has both deflecting and condensing functions. The optical element 180 consists of a plurality of lenses provided one for each light path between the input optical deflector or movable mirror 182 and the output optical deflector or movable mirror 184.

Let consider the light path 186. In FIG. 20, the beam traveling in the light path corresponding this light path is reflected by the mirror 166 into the uttermost left-hand lens 170. However, in FIG. 23, the light traveling in the light path 186 is reflected by the mirror 182 into the lens 180 that is the first one to the left from the center. The light reflected by the mirror 182 into the uttermost left-hand lens 180 as in the light path 188b is condensed and deflected to the uttermost left-hand mirror 184 as in FIG. 20. The angle can be changed to the left or right (188a or 188b) by the mirrors 182 and 184 so that the number of channels is doubled. In addition, the substrate 172 for supporting the mirror 182 and the substrate 174 for supporting the mirror 184 can be minimized.

Figure 24:
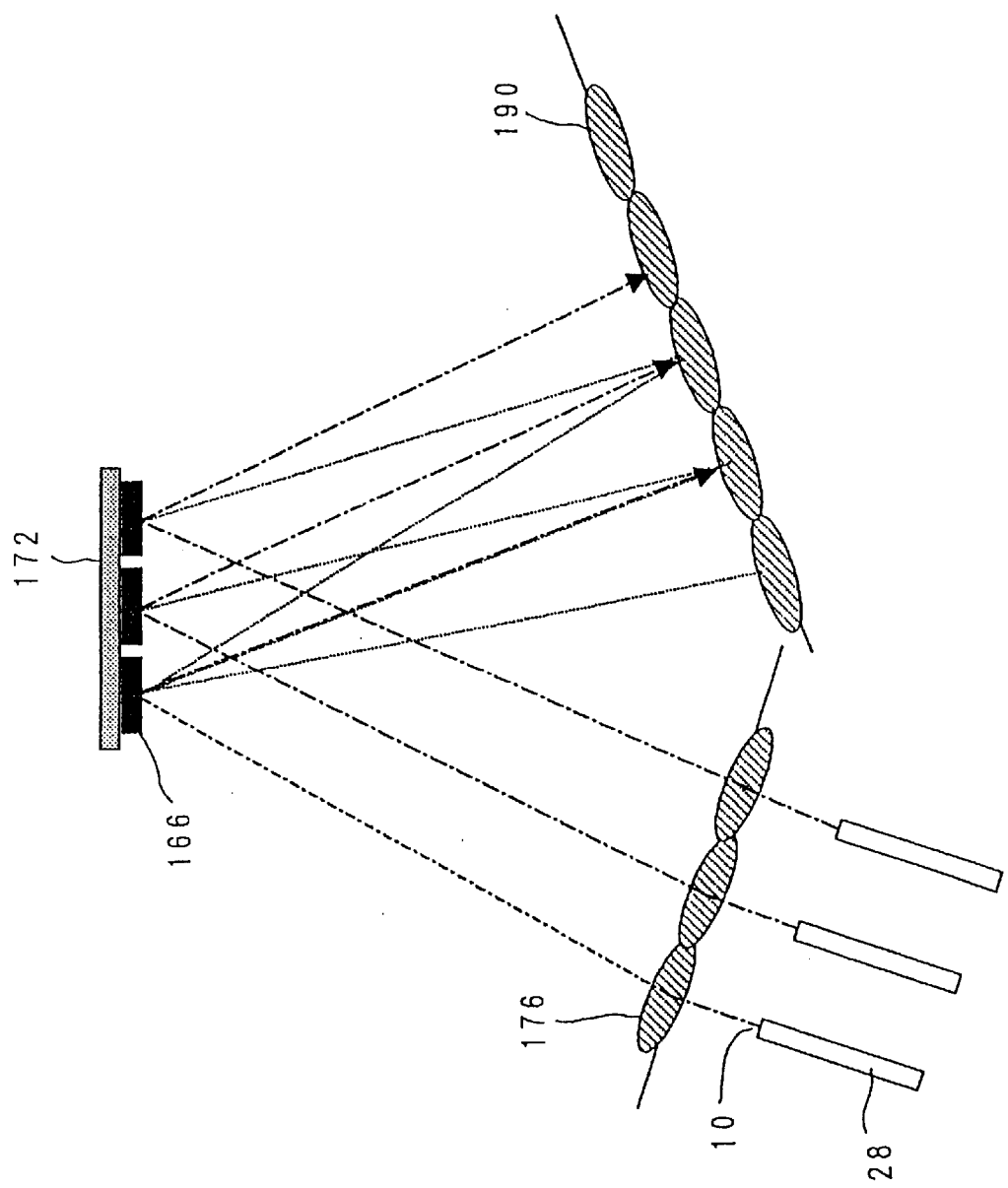
FIG. 24 is a sectional view of the second variation to the optical switch according to the fifth embodiment of the invention.

In FIG. 24, the second variation to the optical switch according to the fifth embodiment is shown. An optical switch 190 having a reflecting surface replaces the optical element 170 of FIG. 20. Consequently, the input and output ports are the same, eliminating the output movable mirror 168, the collimator lens 178, and the optical fiber 30.

In order to explain the objects of the sixth and subsequent embodiments, the disadvantages of the first through fifth embodiments will be described. In order to do this, the optical deflectors arranged on the periphery of a substrate in the above embodiment will be considered.

For example, in the optical switch of FIG. 1, let consider that a optical deflector 18b of the input light switching element 12 that is arranged closely to the upper edge of a substrate selects one of the output ports 14. Explanation will be made with reference to FIG. 26 that is similar to FIG. 1.

In this example, it is necessary to deflect a beam at a downward (Y direction) deflection angle $\theta_X$ relative to the horizontal direction (X direction) but the deflection angle $\theta_{X'}$ upward from the horizontal direction X is unnecessary. However, both the upward and downward (Y direction) deflection angles $\theta_X$ and $\theta_{X'}$ are possible for the optical deflectors that are provided in the central area of a substrate.

Let the vertical length (Y direction) between the optical deflectors 24 arranged in the top row and the optical deflectors 24 arranged in the bottom row be Ls and the horizontal distance (X direction) between the optical deflector 18b and the optical deflector 22a at the same position on the opposed substrate be L.

Then, the deflection angle required for the optical deflectors on the periphery of a substrate is Ls/L. By contrast, the optical deflectors in the central area of a substrate require a deflection angle of Ls/2L due to possible upward and downward deflections, which is a half of the deflection angle for the peripheral optical deflectors.

Thus, the number of channels handled by a single element in the central area of a substrate is twice in the Y direction the number of channels handled by a single element at the peripheral area. That is, the number of channels possible for a single optical deflector at the peripheral area of a substrate is ¼ for a single element in the central area. This holds for the first through fifth embodiments. That is, in these optical switches, the elements of an input light switching element use only a half of the angle between the opposed element and the element at the peripheral area with respect to the normal. For this reason, only a half of the deflecting angle possible for the element is used. Accordingly, there is provided the six embodiment.

Sixth Embodiment

Figure 27:
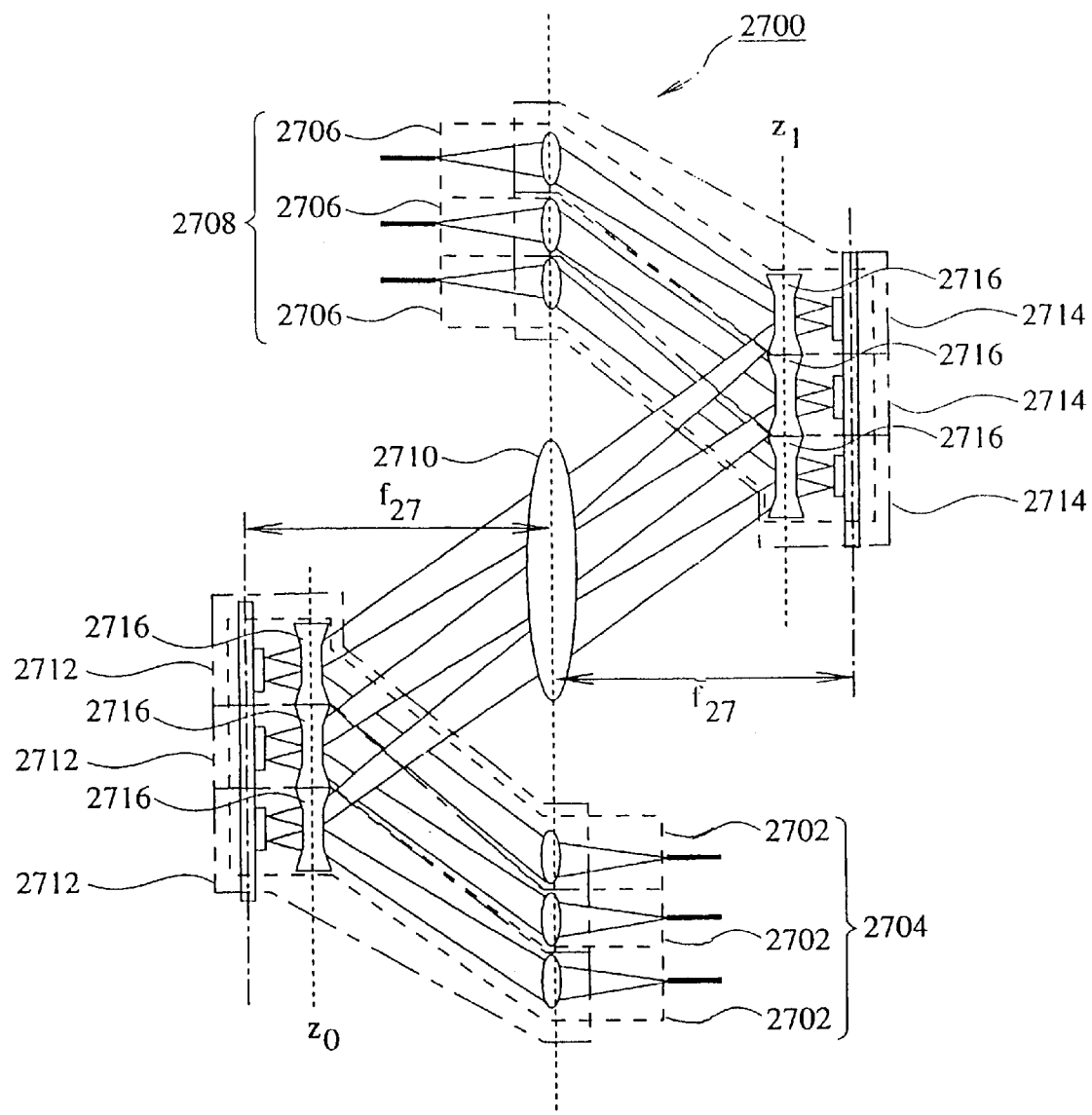
FIG. 27 is a side view of an optical switch using a convex lens as an optical element according to the sixth embodiment of the invention.

In FIG. 27, the sixth embodiment is shown. An optical switch 2700 comprises an input switching element 2704 having a plurality of light input ports 2702 and an output switching element 2708 having a plurality of light output ports 2706. In this optical switch 2700, the light input to one of the light input ports 2702 is output from one of the light output ports 2706. This optical switch 2700 further comprises an optical element 2710 that is provided between the input and output switching elements 2704 and 2708 to receive respective optical signals from the input ports 2702 and output light beams whose central light paths are parallel to each other.

The positions of the input and output ports 2702 and 2706 are changed depending on whether the optical element 2710 is of the transparent or reflective type. A preferred example of the optical element 2710 is a single-element convex lens or hologram. An example with a convex lens will be described.

In this optical switch 2700, the input switching element 2704 is provided in a focal plane of the optical element 2710. The "focal plane" is defined as a plane that includes the focal point of the optical element 2710 and is perpendicular to the central axis. Thus, the distance between the optical element 2710 and the input switching element 2704 is equal to the focal length of the optical element 2710, f27.

If the output and input switching elements 2708 and 2704 are provided at symmetrical positions on opposite sides of the optical element 2710, all of the beams output from the input ports 2702 can be condensed into the output switching element 2708. Thus, the distance between the optical element 2710 and the output switching element 2708 is equal to the focal length of the optical element 2710 f27. The respective input ports 2702 have corresponding input lens systems 2712. Similarly, the respective output ports 270 have corresponding output lens systems 2714. A plurality of concave lenses 2716 are provided in a plane ZO from which light is output from the input lens systems 2712 to the output switching element 2708 and in a plane $Z_I$, for the output switching element 2708 into which light is input from the input lens systems 2712, respectively.

The operation of each element will be described in view of the light beams shown by lines that connect the respective elements.

The beam output from the input switching element 2704 is condensed by the convex lens 2710 into the output switching element 2708. If the beam from the input lens system 2712 is a type of light that diverges from a point in the optical signal output plane $Z_O$, the beam can be a parallel beam past the convex lens 2710. For this reason, the concave lenses 2716 are provided in the plane $Z_O$ from which light is output from the input lens systems 2712.

Assume that parallel rays are input to a concave lens 2716. The parallel rays are diverged by the concave lens 2716 into the convex lens 2710 in which the divergent rays are transformed to parallel rays. The convergent rays from the convex lens 2710 are changed by the concave lens 2716 provided in the plane ZI of the output lens system 2714 into the parallel rays that are identical with the input rays to the concave lens 2716 on the plane $Z_O$.

Figure 29:
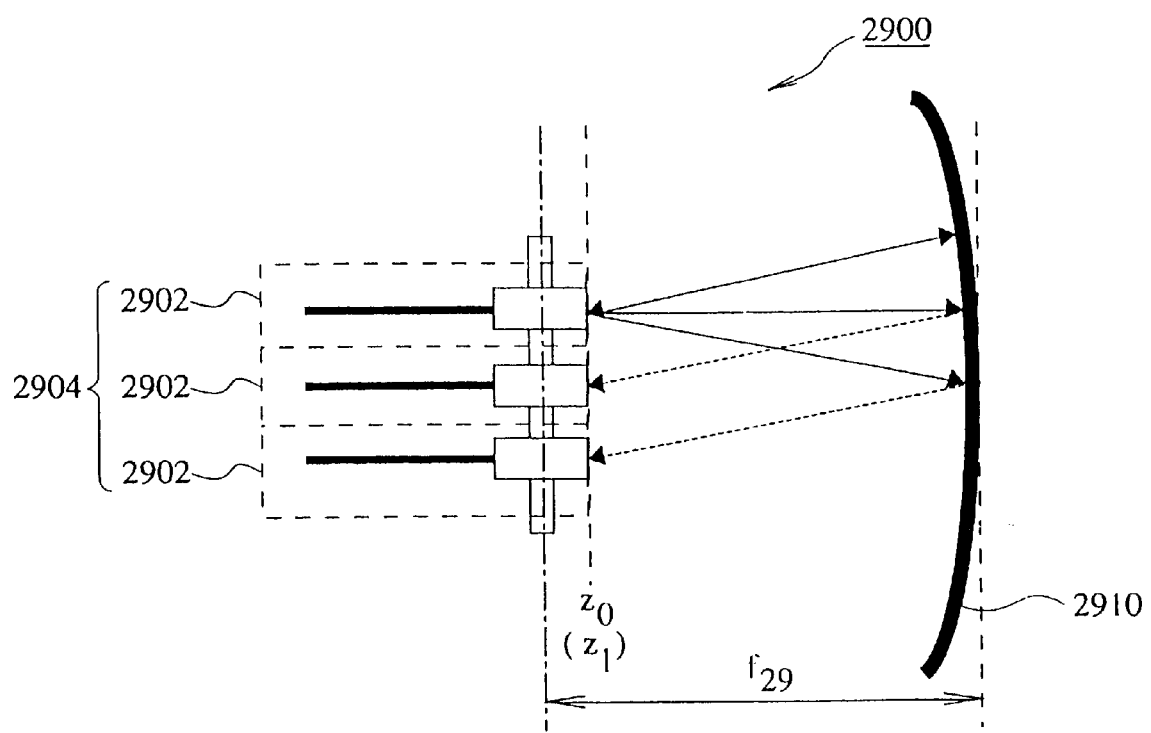
FIG. 29 is a side view of an optical switch that uses a concave mirror as an optical element according to the sixth embodiment of the invention.

In FIG. 29, a concave spherical mirror 2910 replaces the convex lens 2710 of FIG. 27. In this case, a single device is used as both input and output devices. For simplification, the term "I/O switching element 2904" is used to cover these devices.

The I/O switching element 2904 is provided at a position inside the focal plane of the concave mirror 2910. The "focal plane" is defined as a plane that includes the focal point of the concave mirror 2910 and is perpendicular to the center line. The distance between the optical element 2910 and the optical deflector within the I/O switching element 2904 is equal to the focal length f29 of the optical element 2910. The solid arrows, the light beams from the I/O switching element, and dotted arrows indicate the central light paths of beams input to the I/O switching element 2904. The respective beams from the I/O ports 2902 are reflected by the concave mirror 2910 into different I/O ports 2902. The central light paths of respective beams reflected by the concave mirror 2910 are parallel to each other.

In the optical switch of FIGS. 27 and 29, the input and output switching elements share the same structure.

In FIG. 28, an example of the input switching element 2704 is shown. This lens system comprises a plurality of fixed lenses 2800 and a plurality of movable mirrors 2802.

Alternatively, the fixed lenses 2800 may be movable lenses that are movable in a plane perpendicular to the incident direction of optical signals relative to the optical fiber in the input switching element 2704 or to the emerging direction in the output switching element 2708. That is, the movable lenses are arranged and movable in parallel to the surface of a substrate 2806.

In the input switching element 2704, the angles of the movable mirror 2802 is controlled to reflect the incident beam of optical signals such that the central light path is directed to one of the movable mirrors 2802 in the output switching element 2708. In the output switching element 2708, the rotation is controlled to reflect the reflected beam such that the central light path is directed to one of the movable mirrors 2802. The optical fibers 2804 are used as a light input member of the light input ports 2702 of FIG. 27. The output end face of the optical fibers 2804 are connected to the light input ports 2702 of FIG. 27.

Figure 28A:
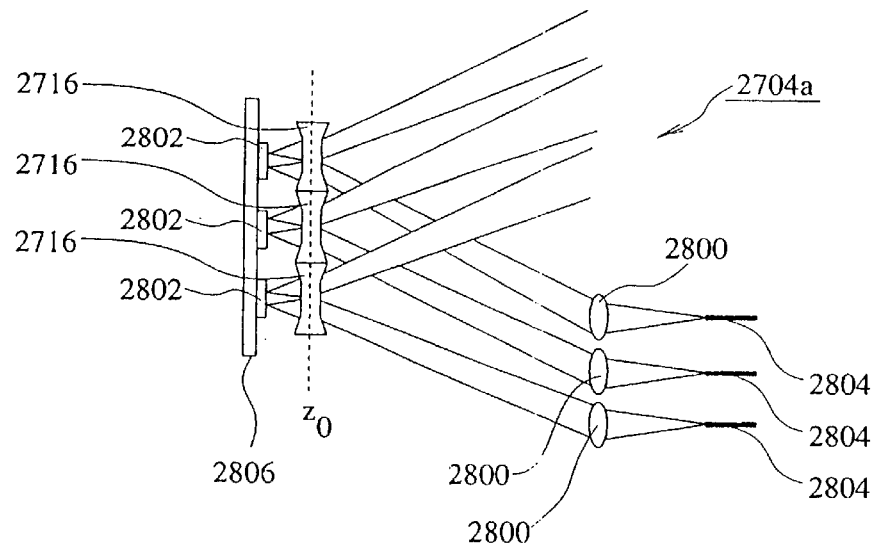
FIGS. 28(A) and (B) are side views of input switching elements according to the first and second variations, respectively.

In FIG. 28(A), the first configuration 2704a of the input switching element 2704 is shown. The lens system provided in the input switching element 2704a comprises a plurality of fixed lenses 2800, a plurality of movable mirrors 2802 provided on a substrate 2806, and a plurality of concave mirrors 2716 one for each of the movable mirrors 2802. This configuration corresponds to the structure in which the concave lenses 2716 are provided in a plane $Z_O$ from which light of the input lens system leaves.

Alternatively, the movable mirrors 2802, which are integrated on the substrate 2806, may be provided separately. In this case, the individual lens systems (FIG. 27) are provided separately. The straight lines connecting respective elements indicate light beams, in view of which the operation of each element will be described.

In the input lens system, the light from the optical fiber 2804 is condensed by the fixed lens 2800 and deflected (at a fixed angle) toward the focal point of the concave lens 2716 on the side of the movable mirror 2802. Thus, it is preferred that the fixed lens 2800 is of the hologram type that is able to do both light condensation and deflection. The light rays past the concave lens 2808 become parallel rays, which are reflected by the movable mirror 2802 at a desired deflection angle. The parallel rays are changed by the concave lens 2716 to the divergent rays, which are input to the subsequent optical element 2710 (FIG. 27).

Figure 28B:
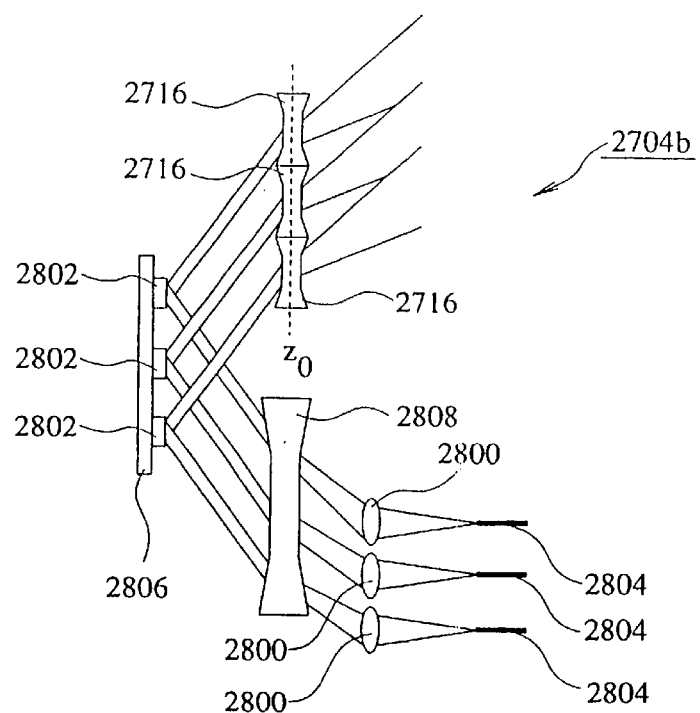

In FIG. 28(B), the second configuration 2704b of the input switching element 2704 is shown. The structure of the lens system provided in the input switching element is substantially identical with that of FIG. 28(A) and, therefore, the redundant description will be omitted.

This lens system comprises a plurality of concave lenses 2716 and a single-element concave lens 2808 provided between the fixed lenses 2800 and the movable mirrors 2802. The second concave lens 2808 makes it possible to reduce the gap between the beams from the optical fibers 2804, thereby permitting high density integration of the movable mirrors 2802. The lens system useful for the sixth embodiment may take a configuration other than those of FIGS. 28(A) and 28(B). As long as concave lenses are provided in the input and output planes $Z_I$ and $Z_O$, it may use the movable lenses of FIG. 3. In this case, it is preferred that the concave lenses are made movable.

Figure 30:
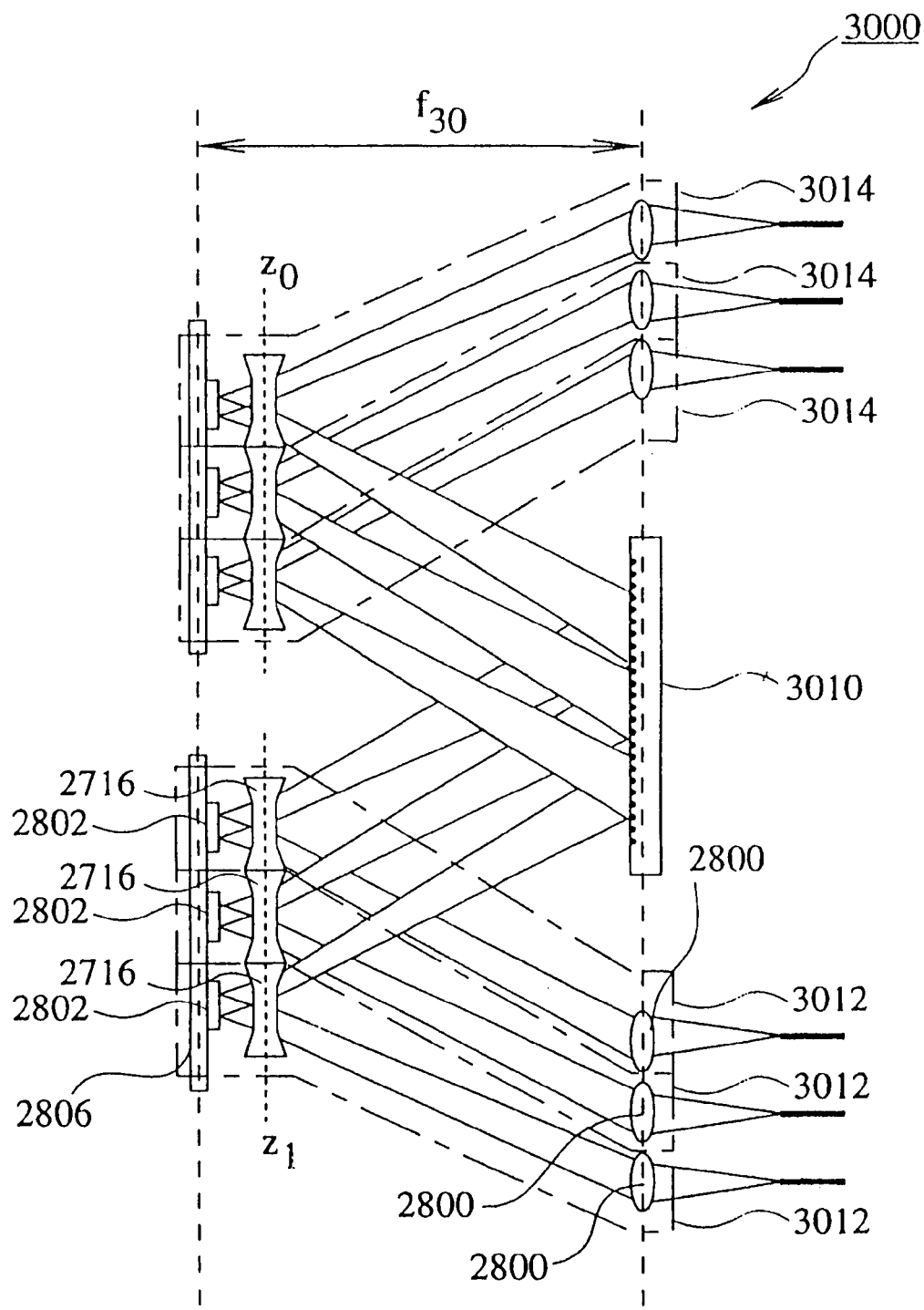
FIG. 30 is a side view of an optical switch that uses a hologram according to the sixth embodiment of the invention.

In FIG. 30, a hologram 3010 is used as the optical element. The basic structure of this optical switch 3000 is identical with that of FIG. 27 and, therefore, the redundant description will be omitted. The structure of input lens systems 3012 is the same as that of output lens systems 3014 and, therefore, some reference numbers are given to the input lens systems only. The central paths of beams input into and output from the movable mirrors 2802 provided in the input and output lens systems 3012 and 3014 lie in the same plane (parallel to this sheet). Consequently, it is possible to integrate the movable mirrors 2802 provided in the lens systems 3012 and 3014 on the input and output sides. The central light paths of input and output beams are arranged in the same plane relative to the fixed lenses 2800 and the optical element 3010 so that it is possible to integrate the fixed lenses 2800 and the optical element or hologram 3010 as a unit on the substrate.

Figure 31A:
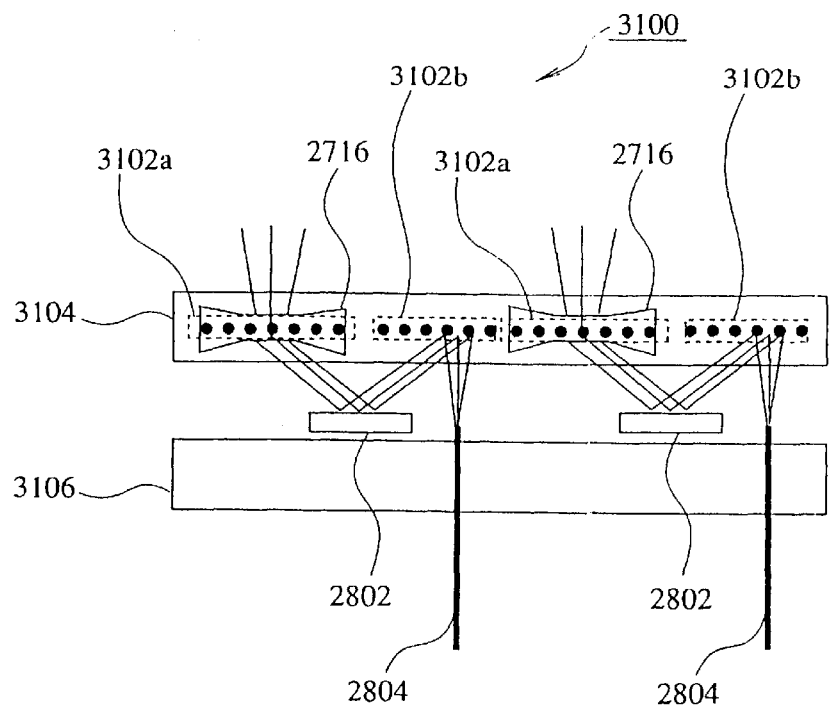
FIGS. 31(A) and (B) are sectional and top plan views of lens systems integrated on a substrate, respectively.
Figure 31B:
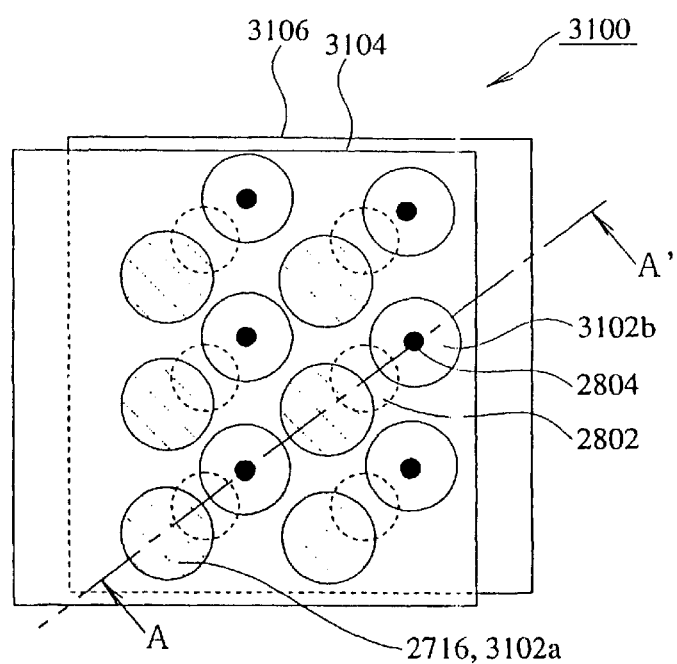

In FIGS. 31(A) and 31(B), the same switching element is used on both input and output sides and, therefore, the lens systems only in the input switching element 3100 will be described.

In FIG. 31(A), concave lenses 2716 and holograms 3102a and 3102b are integrated on a first substrate 3104. A plurality of movable mirrors 2802 are provided on a second substrate 3106. A plurality of optical fibers 2804 extend through the second substrate 3106 to receive optical signals.

The first and second substrates 3104 and 3106 are arranged as shown in FIG. 31(B). The holograms are arranged in the form of a matrix such that the holograms 3102a overlap the concave lenses 2716 arranged as a matrix, and the remaining holograms 3102b fill the gaps between the concave lenses. The second substrate 3106 is provided relative to the first substrate 3104 such that the movable mirrors 2802 face the holograms 3102a and 3102b and the concave lenses 2716. This arrangement makes it possible to arrange the concave lenses 2716 with high density. The straight lines indicate light rays or paths that connect various elements. The optical signal from the optical fiber 2804 is reflected by the hologram 3102b to become parallel rays, which strike the movable mirror 2802. The light rays reflected by the movable mirror 2802 pass through the hologram 3102a and the concave lens 2716. The divergent rays past the concave lens 2716 leave from the hologram 3102a in the normal direction to the first substrate 3104.

Analysis by matrices of the sixth embodiment will be made with reference to FIGS. 32(A) and 32(B).

Figure 32A:
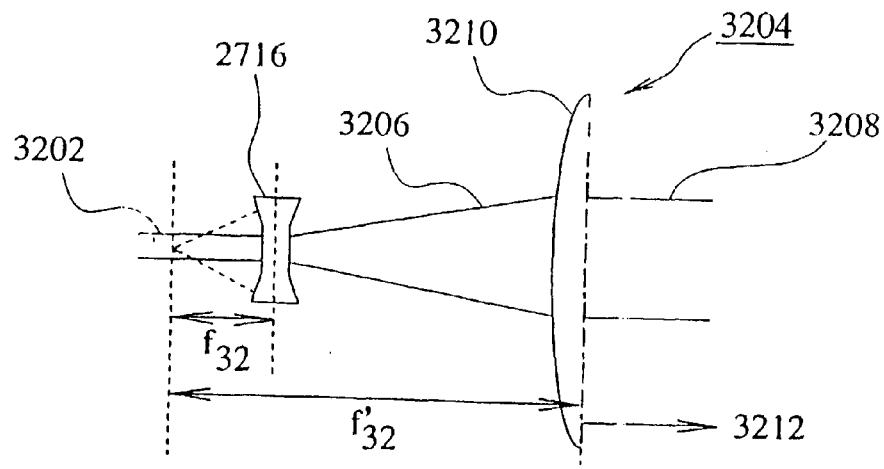
FIGS. 32(A) and (B) are schematic diagrams for use in describing light beams between a concave lens and an optical element and between a movable mirror and an optical element, respectively.

In FIG. 32(A), straight lines 3202, 3206, and 3208 represent light cones or beams passing through the concave lens 2716 and the optical element 3210 in the input switching element 3204.

Figure 32B:
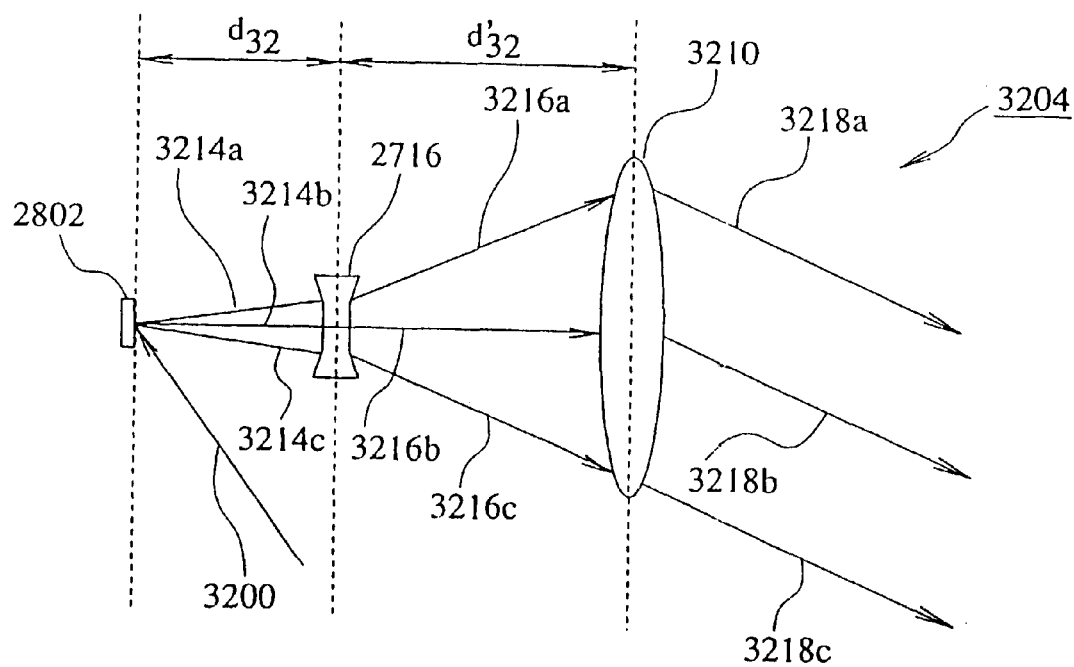

In FIG. 32(B), straight lines 3214a, 3214b, and 3214c and arrows 3216a, 3216b, 3216c, 3218a, 3218b, and 3218c represent central paths of beams passing through the concave lens 2716 and the optical element 3210 of the input lens system in the input switching element 3204. The input and output switching elements share the same structure.

In FIG. 32(A), the parallel rays 3202 strike the concave lens 2716. The convergent rays 3206 past the concave lens 2716 strike the optical element 3210, in the inside 3212 of which they become parallel rays.

In FIG. 32(B), by providing a movable mirror 2802 in the lens system, it is possible to provide light deflected at a desired angle relative to the movable mirror among beams having central light paths 3214a, 3214b, and 3214c.

Let f32 be the distance between the concave lens 2716 and the focal point, f'32 be the focal length of the optical element 3210 in FIG. 32(A) and let d32 be the distance between the movable mirror and the concave lens 2716 and d'32 be the distance between the concave lens 2716 and the optical element 3210 in FIG. 32(B). The elements of a matrix for the operation of FIG. 32(A) are $$m11 = 1 + d'_{32}/f_{32} \tag{29a}$$

$$m12 = d_{32} + d'_{32} + d'_{32}d_{32}/f_{32} \tag{29b}$$

$$m21 = -1/(2f_{32}) + 1/f_{32} - d'_{32}/(2f_{32}f_{32}) \tag{29c}$$

$$m22 = -d_{32}/(2f_{32}) + [1 - d'_{32}/2f_{32}](1 + d_{32}/f_{32}) \tag{29d}$$

In order for the parallel rays 3202 (incident angle=0) to the concave lens 2716 to become parallel rays 3208 at the middle point of the optical element 3210, the element m21 must be zero (m21=0). Accordingly, $$-1/(2f_{32}) + 1/f_{32} - d'_{32}/(2f_{32}f_{32}) = 0 \tag{30}$$

The light ray matrix corresponding to the operation of FIG. 32(B) is $$m11 = 1 + d'_{32}d_{32}/f_{32} \tag{31a}$$

$$m12 = d_{32} + d'_{32} + d'_{32}d_{32} \tag{31b}$$

$$m21 = -1/f_{32} + 1/f_{32} - d'_{32}/(f_{32}f_{32}) \tag{31c}$$

$$m22 = -d_{32}/(f_{32}) + [1 - d'_{32}/f_{32}](1 + d_{32}/f_{32}) \tag{31d}$$

In FIG. 32(A), in order that the parallel rays 3202 into the concave lens 2716 are emerged from the concave lens 2716 at respective deflecting angles as divergent rays 3206, which pass through the optical element 3210 to become parallel rays 3208, the emergent angle from the concave lens 2716 should be independent from the incident angle of the parallel rays 3202 to the concave lens 2716. From m22=0 in the equation (31)

$$0 = -d_{32}/(f_{32}) + [1 - d'_{32}/f_{32}](1 + d_{32}/f_{32}) \tag{32}$$

The conditions for simultaneously meeting both the equations (30) and (32) are $$f_{32}/f_{32} = 1 + d_{32}/f_{32} \tag{33a}$$

$$d'_{32} = 2f_{32} - f_{32} \tag{33b}$$

The limits to which designing is possible are d32=0 and d'32=0, at which f32=f'32 and d'32=f'32, and f32=2f'32 and d32=f32.

When the whole system including the input and output lens systems is considered, for the limit, d'32=0, the concave lens 2716 is combined with the optical element 3210 from the input side to offset the lens functions, which is equivalent to the condition that there is no lens in the system.

In FIG. 32(B), let θ be the deflecting angle by the movable mirror 2802, the beam central position behind the optical element 3210 is m12θ from the equations (31a)–(31d). From the equations (33a) and (33b), $$m12\theta = [2(f_{32} - f_{32}) + d'_{32}]\theta = f_{32}\theta \tag{34}$$

as a function of d'32 and f'32. For the limit of d32=0, the beam central position behind the optical element 3210 is m12θ=d'32θ.

Figure 33:
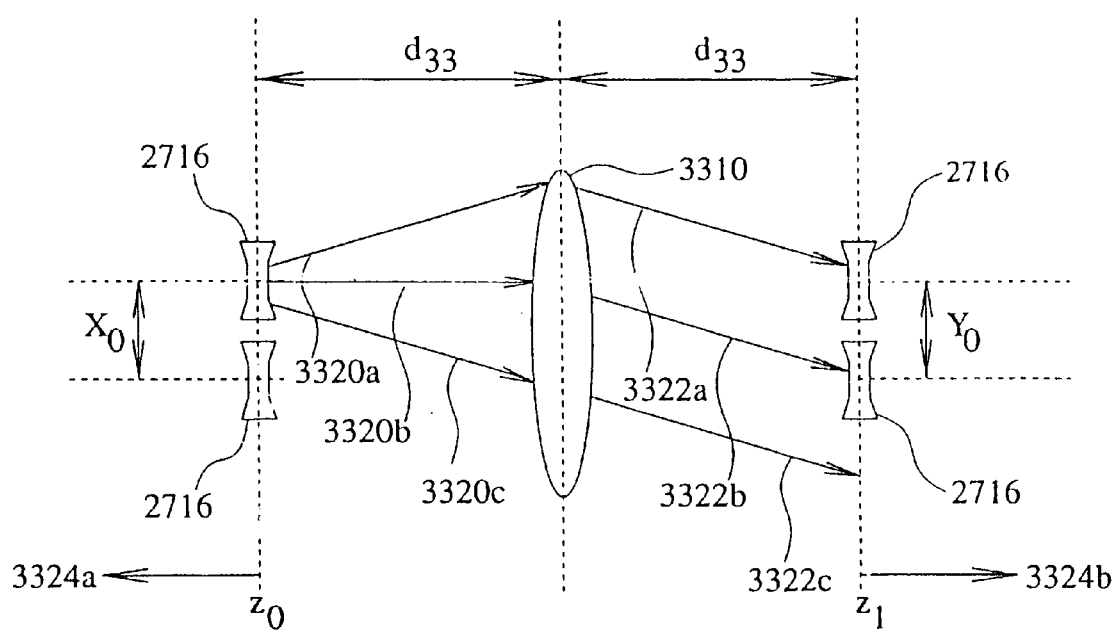
FIG. 33 is a schematic diagram for use in describing light beams between the input and output switching elements.

With reference to FIG. 33, the beams in the incident plane $Z_I$ in which the concave lenses 2716 are provided will be described. The basic structure is identical with that of FIG. 32. The relationship between the optical element 3310 and the respective concave lenses 2716 provided on the input and output switching elements 3324a and 3324b is shown.

The beam central paths at the respective parts are indicated by arrows 3320a, 3320b, 3320c, 3322a, 2233b, and 3322c.

The distance between the optical element 3310 and the light output plane $Z_O$ is equal to the distance between the optical element 3310 and the light input plane ZI and let it be d33. The light ray matrix between the output plane $Z_O$ from which beams of the input switching element are output and the input plane $Z_I$ into which beams of the output switching element input.

With the use of the focal length of the optical element, f'32, the virtual focal length of the concave lens, f32, and the distance between the concave lens and the optical element, d'32, $$m11 = 1 - d_{33}/f'_{32} = f_{32}/f'_{32} - 1 = d_{32}/f_{32} \tag{35a}$$

$$m12 = d_{33}(2 - d'_{32}/f'_{32}) = d'_{32}(f_{32}/f'_{32}) \tag{35b}$$

$$m21 = -1/f'_{32} \tag{35c}$$

$$m22 = 1 - d_{33}/f'_{32} = f_{32}/f'_{32} - 1 \tag{35d}$$

Under the condition, d32=0, m11=0, and the beam position in the input plane $Z_I$ from the output port is determined by only the deflection angle at the concave lens 2116 provided in the output plane $Z_O$ from which beams of the input port is output. The beam diameter, R, in the input plane $Z_I$ is $$R = m11r + m12r/f_{32} \tag{36}$$

wherein r is the beam diameter of the parallel light 3202 prior to the concave lens 2716. A calculation of the equation (36) with the use of the equations (33a) and (33b) reveals that the diameter R is equal to r, making an equimultiple system. For d32≠0, the output position at the concave lens 2716 provided in the output plane $Z_O$ varies with the deflecting angle θ of the movable mirror 2802 so that the beam enters at the corresponding position in the input plane $Z_I$.

Let Xo be the distance between two concave lenses 2716 provided in the output plane $Z_O$, the position in the input plane $Z_I$ of a beam from the input port is Xod32/f32 from m11 for the center-to-center distance Xo of the concave lenses 2716 at θ=0. It must be equal to the output position doθ at the concave lens 2716 provided in the output plane $Z_O$ from which the input port light is output.

Accordingly, it is necessary to set an angle θ=Xo/f32 on the output side in order to select the input lenses at Xo. The beam centers 3320a, 3320b, and 3320c immediately after the input concave lens 2716 have an angle θ(1+d32/f32). The beam position in the input plane $Z_I$ is $$Y_1 = m11(X_0 + d_{32}\theta) + m12\theta(1 + d_{32}/f_{32}) \tag{37}$$

$$= X_0 d_{32}/f_{32} + \theta d_{32}^2/f_{32} + \theta d_{33}(f_{32}/f'_{32})(1 + d_{32}/f_{32})$$

$$= X_0 d_{32}/f_{32} + \theta f_{32}$$

The last equation employs the equations (33a) and (33b). When the input and output are exchanged, it matches θ=Xo/f32 which is determined in the previous paragraph. The radius Ø/2 of the concave lens 2716 must be large for the beam position Xomd32/f32 in the input plane $Z_I$ at the maximum value Xom. The value of d32/f32 should be small.

The number of feasible lines by the optical switch according to the sixth embodiment will be determined. As shown in FIG. 27, the concave lenses 2716 are provided in the output plane ZO from which beams of the input lens system are output. As shown in FIG. 1, the respective sizes of the substrates 32, 36, 42, and 46 are determined by considering the number of concave lenses 2716. The same structure is used for both the input and output switching elements. For example, the size of the substrate 32 is $\phi N^{1/2}$.

From FIGS. 32(A) and 32(B), the deflection angle of a beam emerging from the concave lens 2716 is (1+d32/f32) times the deflection angle behind the movable mirror 2802. Thus, at d32÷0, the deflection angle is maintained. The maximum scan width is 3d'32 θm for the maximum deflection angle θm. Assuming that the maximum scan width be equal to the size of the substrates 32, 36, 42, and 46, $$N=(2d'_{32}\theta_m/\phi)^2 \tag{38}$$

In the ideal optical system, the focal point shift due to the angular shift at the optical fiber provided in the output optical switching element is σS=fσθ so that $$N=[2d'_{32}\delta S/(\epsilon f\theta)]^2 \tag{39}$$

wherein ε=σθ/θm. By increasing d'32/(fθ), it is possible to increase the number of channels. For example, if σS=1 μm, ε=0.01, f=0.5 mm, Ø=80μ, $d_f$=10 cm, then N=640,000 lines. Where θm=0.1 radian, N=160,000.

Seventh Embodiment

Figure 34:
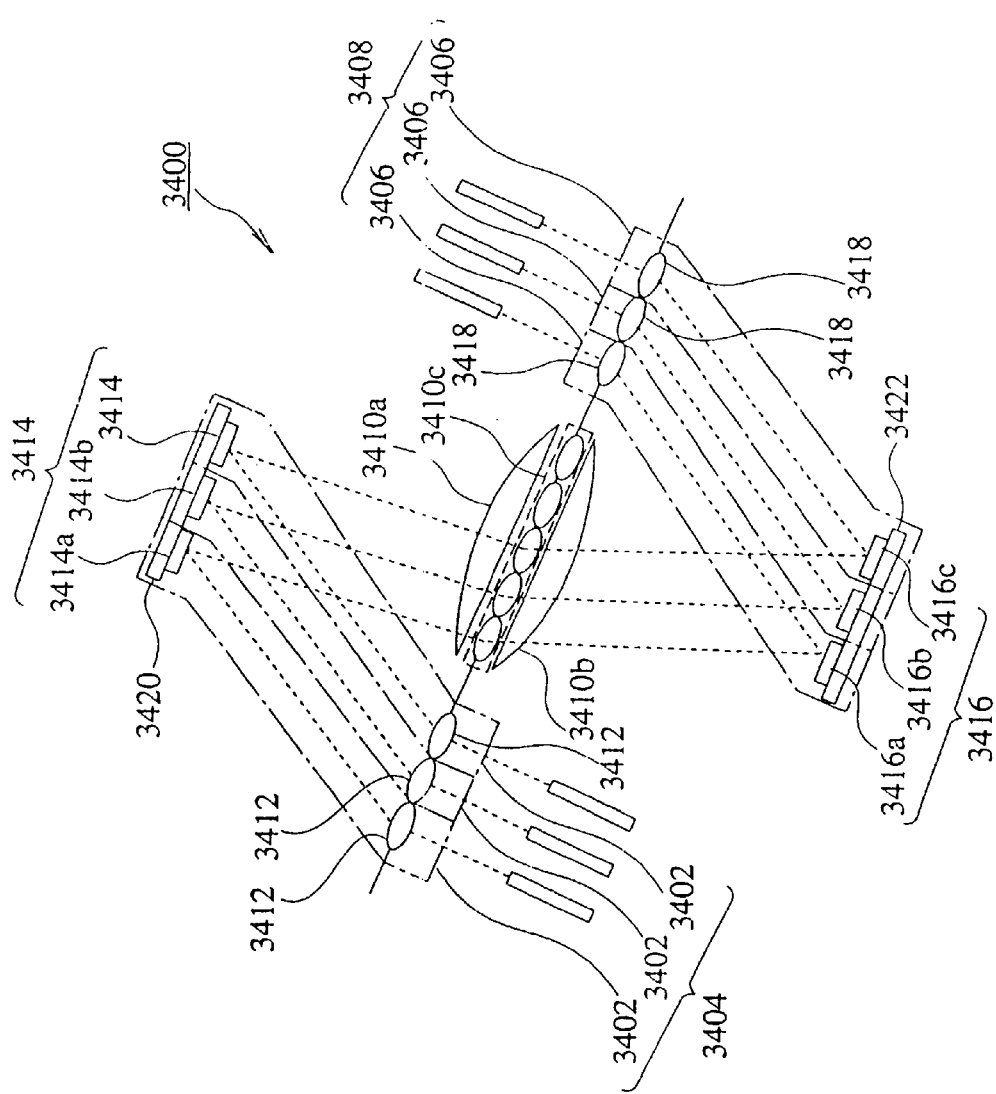
FIG. 34 is a side view of an optical switch according to the seventh embodiment of the invention.

In FIG. 34, the basic structure of an optical switch according to the seventh embodiment is identical with that of the sixth embodiment in FIG. 27 and, therefore, the overlapping description will be omitted. The optical switch 3400 comprises a convex lens as an optical element. A hologram may be used as an optical element. This convex lens is a compound lens composed of a plurality of first convex lenses 3410c provided one for each light path between the input and output switching elements 3404 and 3408 and a pair of second convex lenses 3410a and 3410b provided on either side of the first convex lens 3410c. The shapes and properties of the convex lenses 3410a and 3410b are the same.

Each input or output lens system 3402 or 3406 is composed of a fixed lens 3412 or 3416 and a movable mirror 3414 or 3416, respectively. The fixed lenses 3412 and 3418 may be replaced by movable lenses which are movable in a plane perpendicular to the incident direction to the optical fiber in the input lens system 3402 or the emergent direction in the output lens system 3406. The movable mirrors 3414 and 3416 have a rotary axis perpendicular to a plane which includes the central path of an incident beam in the input lens system 3402 and a central path of a reflected beam in the output lens system 3406.

Figure 35:
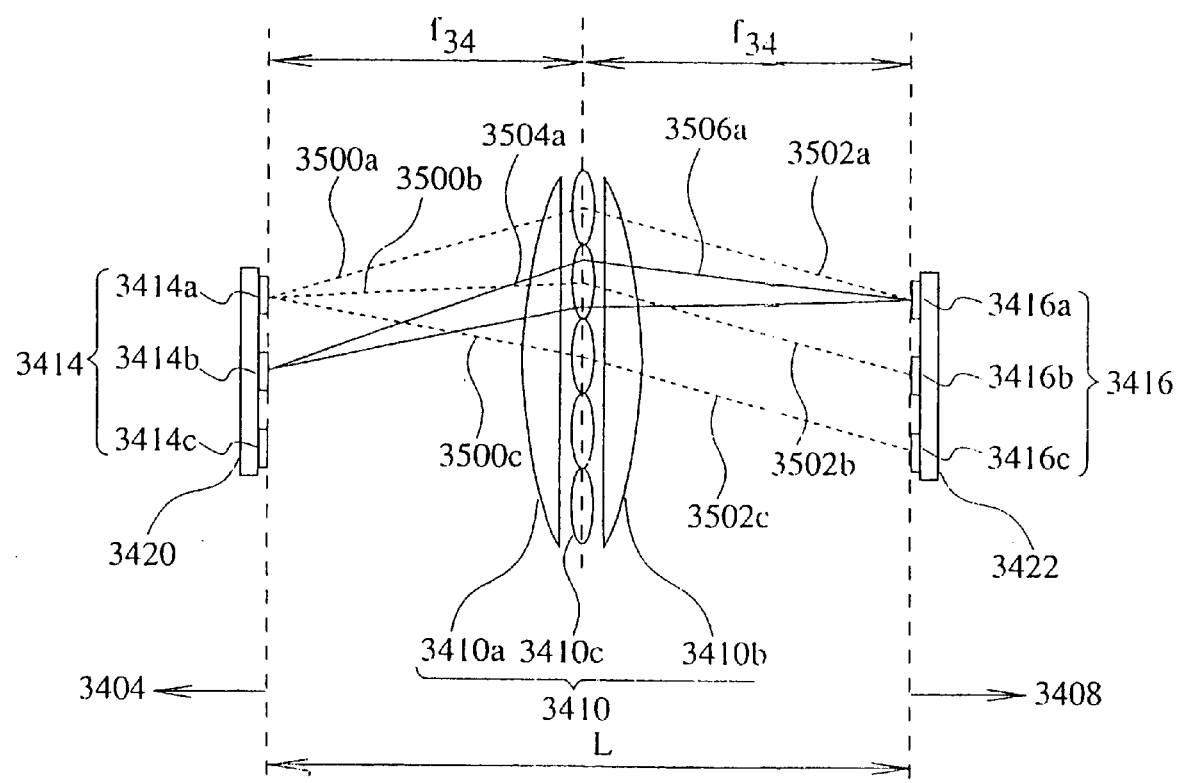
FIG. 35 is a side view of an optical element and a movable mirror in the seventh embodiment.

In FIG. 35, how to construct light paths between the input and output switching elements 3404 and 3408 of the optical switch 3400 is shown. Unlike the arrangement of the optical element and the movable mirror in the fifth embodiment of FIG. 20, the input and output movable mirrors 3414 and 3416 are arranged on a substrate with the same pitch as the first convex lenses 3410c. Where the first convex lenses 3410c are arranged continuously in contact with each other, the movable mirrors 3414 and 3416 are arranged continuously in contact. However, the number of the first convex lenses may not be equal to the number of the movable mirrors on either side but may be a given number according to design.

The respective input movable mirrors 3414 are arranged in the focal plane of a compound lens 3410 of the first and second convex lenses 3410c, 3410a, and 3410b. f34 is the focal length of the compound lens. The light paths connecting respective parts are indicated by dotted lines 3500a–3500c and 3502a–3502c, and solid lines 3504a and 3506a. Taking one movable mirror 3414a for example, the beams 3500a–3500c deflected by the movable mirror 3414a are transformed to parallel beams 3502a–3502c past the second convex lenses 3410a and 3410b. Arrangement is made such that all of the beams 3500a–3500c from the input movable mirrors 3414a strike the output movable mirrors 3416. The input and output movable mirrors 3414 and 3416 are disposed in planes perpendicular to the optical axis at symmetrical positions on either side of the compound lens 3410, with the symmetrical axes being axes that pass through the center of the compound lens 3410 and are perpendicular to the optical axis.

If the compound lens 3410 does not have the first convex lens 3410c, and a movable mirror 3414 in the input lens system 3402 of FIG. 34 is arranged in the focal plane of the compound lens of only the second convex lenses, then the beam emerging from the movable mirror 3414b, for example, becomes the parallel beam past the compound lens of only the second convex lenses. In order to reduce the focal point shift on the output movable mirror 3416 due to the angle of the input movable mirror 3414 and the resultant angular error, it is necessary to focus on the output movable mirror 3416 as well as the input side.

For this reason, the first convex lens 3410c for converging light is added to the second convex lenses 3410a and 3410b which determine the deflection direction. The first convex lens 3410c of a single element such as the second convex lenses 3410a and 3410b disturbs the deflecting function. Consequently, the first convex lens 3410c should be a lens array with one lens for each light path.

In order to focus the beam from the compound lens 3410 on the output movable mirror 3416, the focal length of the first convex lens 3410c should be equal to that of the second convex lenses 3410a and 3410b. When the second convex lenses 3410a and 3410b are combined with the first convex lens 3410c, the focal length of the compound lens is a half of the focal length of the second convex lenses 3410a and 3410b. The respective input and output movable mirrors 3414 and 3416 are arranged such that the distance between the one of the input movable mirrors 3414a and the output movable mirror 3416a which disposed at the corresponding position on the substrate 3422 is equal to twice the focal length of the compound lens of the first and second convex lenses.

The input and output movable mirrors 3414 and 3416 are arranged such that if attention is paid to the mirror 3414b, the light path or beam 3504a diverging from the movable mirror 3414b is focused on the output movable mirror 3416a as shown by the light path or beam 3506a.

The input movable mirror 3414 deflects light toward the desired first convex lens 3410c. The relative position of the input movable mirror 3414 to the first convex lens 3410c determines the output movable mirror 3416 that is struck by the light. Consequently, the selection of the first convex lens 3410c determines the output port that is selected.

Let L be the distance between the input movable mirror 3414 and the corresponding output movable mirror on the substrate 3422, L has the following relationship with the diameter Ø of the first convex lens 3410c.

$$L<\pi\theta^2/\lambda$$

The seventh embodiment of FIG. 34 is an improvement to the fifth embodiment of FIG. 20 by incorporating the second convex lenses 3410a and 3410b. Accordingly, a comparison between them will be made.

In the optical switch 3400 of FIG. 34, assume that a N matrix is made on a substrate 3420 or 3422 by arranging $N^{1/2}$ input or output movable mirrors in each row and column. The number of first convex lenses 3410c arranged in each row and column corresponding to the movable mirrors 3414 or 3416 becomes $(2N^{1/2}-1)$. Let AØ be the arranging pitch of the first convex lenses 3410c, the length or width of the substrate 3420 and 3422 is $s=AØN^{1/2}$. In the optical switch according to the fifth embodiment of FIG. 20, the length or width of the substrate 172 and 174 is $s=AØ(2N^{1/2}-1)$. Thus, in view of the arrangement of the optical switch of FIGS. 1 or 26, the area of the substrate for the optical switch according to the seventh embodiment is reduced to ¼.

Figure 26:
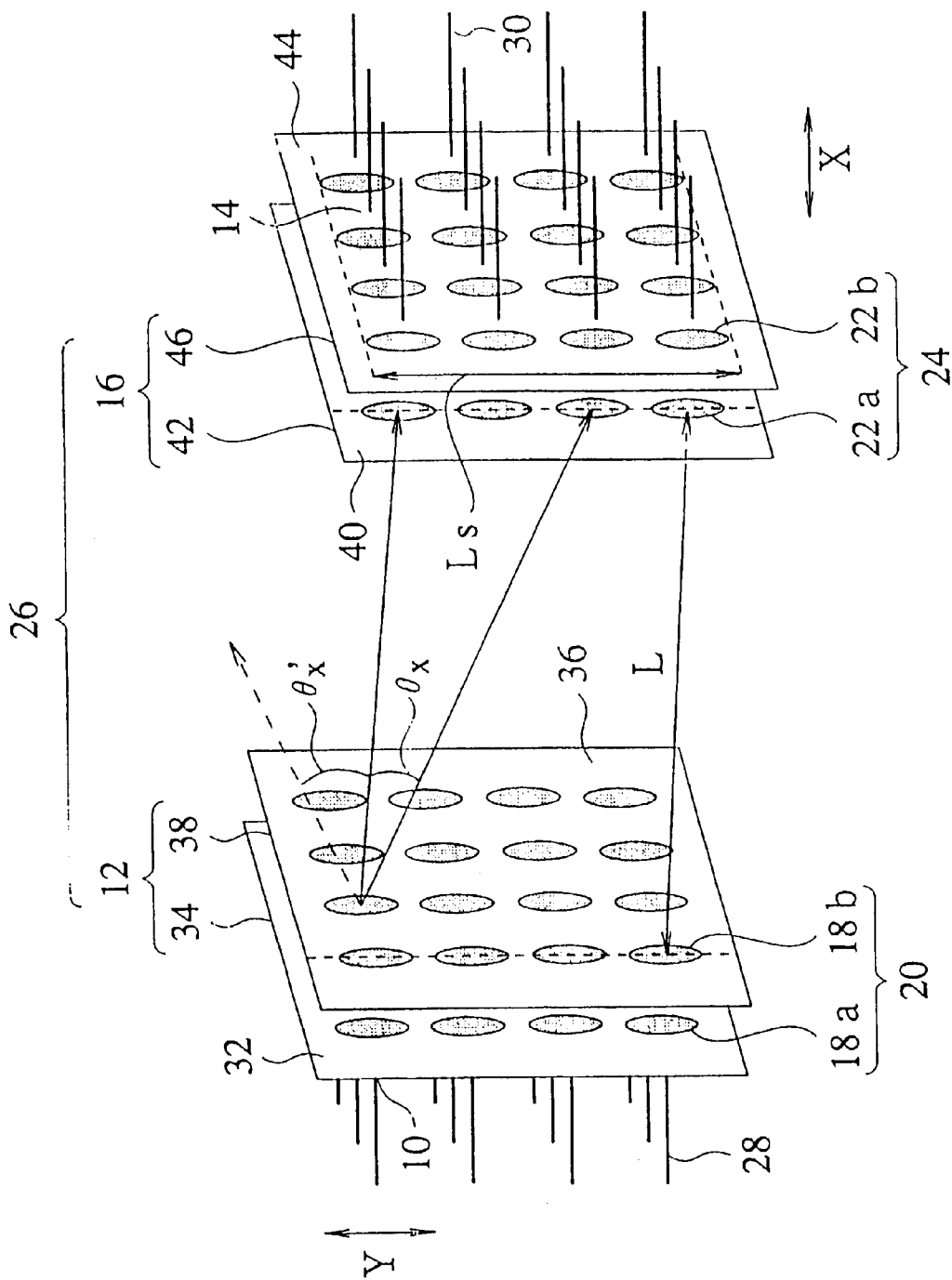
FIG. 26 is a perspective view of the optical switch for use in describing disadvantages of the embodiments.

Similarly, in view of the arrangement of FIG. 1 or 26, with θm being the maximum deflection angle on either side by the input movable mirror 166, the area of a substrate in the fifth embodiment of FIG. 20 will be considered. The deflection angle of the input movable mirror 166 provided for the input port at the edge of the input port matrix requires $θm=2AØN^{1/2}/L$.

In the seventh embodiment, it is possible to use the deflection angle twice the deflection angle of the input movable mirror 166 in the optical switch of FIG. 20 so that $θm=AØN^{1/2}/L$. Thus, θm of the seventh embodiment is a half of the fifth embodiment.

Accordingly, it is possible to increase the number of lines N by four times for the same maximum deflection angle θm. The maximum deflection angle is related to Ø and N as $N=[(πθmØ)/(λA)]^2$. This is similar to the technology disclosed in the reference No. 1. That is, the movable mirror in the optical switch of reference No. 1 has a diameter of 200–300 μm. This value is equal to the diameter of the relay lens as an optical element according to the fifth embodiment of FIG. 23. This holds true for the first convex lens in the seventh embodiment of FIG. 34 that has a structure similar to that of the fifth embodiment. Thus, it is possible to make the diameter of the movable mirror 3314 or 3316 in the optical switch according to the fifth or seventh embodiment smaller than that of reference No. 1.

Art Related to Eighth Embodiment

Figure 25A:
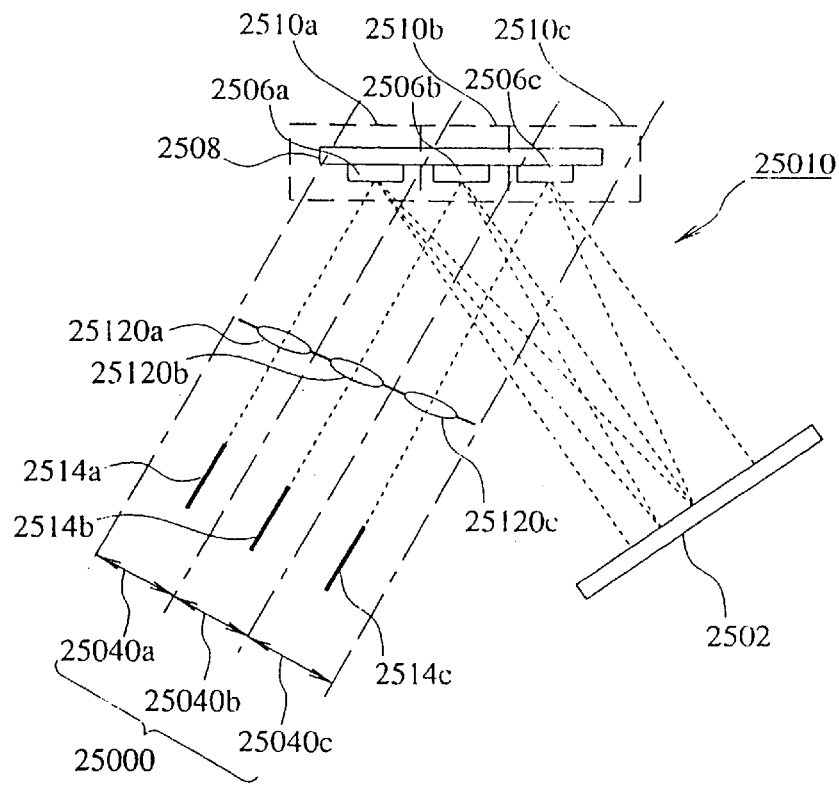
FIG. 25(A) is a sectional view of a conventional optical switch that uses a fixed reflector as an optical element.

A conventional optical switch relating to the eighth embodiment is shown in FIG. 25(A). This optical switch 25010 employs a fixed reflector 2502 as an optical element. This optical switch 25010, however, has the following disadvantage. It has an I/O switching element 25000 used as input and output switching elements. The dotted lines indicate various light paths connecting various parts.

In FIG. 25(A), the I/O switching element 25000 comprises optical deflectors 2510a–2510c which are composed of movable mirrors 2506a–2506c provided on a substrate 2508 corresponding to I/O ports 2540a–2540c. The (fixed) collimator lenses 25120a–25120c are provided between optical fibers 2514a–2514c and the movable mirrors 2506a–2506c corresponding to optical deflectors 2510a–2510c. That is, the lens systems consisting of the optical deflectors 2510a–2510c and the collimator lenses 25120a–25120c are provided at the respective I/O ports 25040a–25040c. A single-element fixed reflector 2502 is provided as an optical element between the input and output switching elements. The collimator lenses 25120a–25120c may be provided on the substrate 2508 in the same manner as movable mirrors 2506a–2506c.

The operation of the optical switch 25010 will be described. The beam from the optical fiber 2514a–02514c are deflected and condensed by the collimator lenses 25120a–25120c as parallel beams which strike the desired movable mirrors 2506a–2596c. The movable mirrors 2506a–2506c deflect them to the fixed reflector 2502 for reflection. By adjusting the incident angles with the movable mirrors 2506a–2506c, the beams are deflected so as to strike the specified optical fibers 2514a–2514c. That is, the beams emerging from the movable mirrors 2506a–2506c are reflected by the fixed reflector 2502 toward the movable mirrors 2506a–2506c which correspond to the desired I/O ports 25040a–25040c. Then, they are deflected by the movable mirrors 2506a–2506c to the desired optical fibers 2514a–1524c. Subsequently, the beams from the movable mirrors 2506a–2506c are condensed on the end faces of the optical fibers 2514a–2514c by the collimator lenses 25120a–25120c.

The beams from the end faces of the optical fibers 2514a–2514c are transformed by the collimator lenses 25129a–25120c to parallel beams (the central axes of beams are parallel to each other) which strike the movable mirrors 2506a–2506c. The substrate 2508 has a flat surface on which the movable mirrors 2506a–2506c and other optical parts are mounted. The mirror surfaces of the movable mirrors 2506a–2506c lie in a plane that is parallel to the surface of the substrate 2508 under no control condition. The central paths of the beams reflected by the movable mirrors 2506a–2506c are parallel to each other.

If the fixed reflector 2502 is a flat mirror, the central paths of the reflected beams are parallel to each other. Where the movable mirrors 2506a–2506c are under no control condition, the reflected beams travel in the same paths as the paths to the fixed reflector 2502 and strike the optical fibers 2514a–2514c.

Let consider the I/O port 25040a that corresponds to the movable mirror 2506a provided at the periphery of the substrate 2508. When the movable mirror 2506a is under no control condition, the beam reflected from the movable mirror strikes the fixed reflector 2502 in the normal direction. Also, let consider the case where the beam from the optical fiber 2514a is directed to the optical fibers 2514b and 2514c by adjusting the incident angle at the movable mirror 2506a. It is necessary to adjust the incident angle at the movable mirror 2506a such that the central path of the reflected beam is deflected toward the optical fibers 2514b and 2514c.

Similar consideration is made to the I/O port 2504b provided at the center of the substrate 2508. The movable mirror 2506b is under no control condition in this case, too. In order to direct the beam from the optical fiber 2514b to the optical fiber 2514a or 2514c by adjusting the movable mirror 2506b, it is necessary to deflect the central path of a beam reflected by the movable mirror 2506b to either side of the central path of the beam from the optical fiber 2514b. That is, in this optical switch 25010, the deflection angle for output at the same output port is different depending on the position of the optical deflector, making the driving complicated. Accordingly, the eighth embodiment is made so as to make it easy to drive the optical switch.

Eighth Embodiment

An optical switch according to the eighth embodiment comprises an input switching element having a matrix of a plurality of input ports and an output switching element having a matrix of a plurality of output ports. Each input port has an input lens system while each output port has an output lens system. The optical switch transmits an optical signal from the input port to the output port. An optical system is provided between the input and output switching elements. In this embodiment, the optical system is a fixed reflector.

Figure 25B:
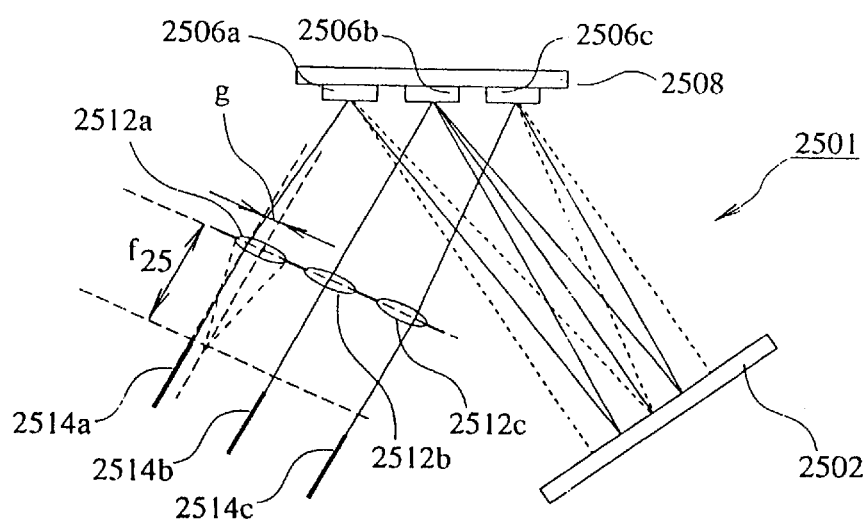
FIG. 25(B) is a sectional view of an optical switch that uses a fixed reflector as an optical element according to the eighth embodiment of the invention.

In FIG. 25(B), the optical switch 2501 is similar to the optical switch 25010 of FIG. 25(A) and, therefore, any description on identical parts will be omitted. The dotted and solid lines connecting various parts indicate light paths corresponding to the central paths of light beams in FIG. 25(A). The I/O ports and I/O switching elements are identical with the I/O ports 25040a–25040c and the I/O switching elements 25000 of FIG. 25(A).

The fixed lenses 2512a–2512c of the optical switch 2501 have deflecting functions at fixed angles. For example, assume that the optical axis extended lines (extended lines of the optical fiber central axes) from the I/O ports are different for each port with respect to the center of the fixed lens 2512a provided at the edge. That is, the central axis of each input light beam is displaced from the center of the fixed lens.

As shown in FIG. 25(B), the fixed lens 2512a deflects a light beam by an angle g/f25 wherein g is the distance between the center of the fixed lens 2512a and the central path of a light beam from the optical fiber 2514a and f25 is the focal length of the fixed lens 2512a. The movable mirrors 2506a–2506c are put under no control conditions. They are arranged on the substrate 2508 in the form of a matrix. When they are put in no control conditions, their reflection surfaces are parallel to the flat surfaces (fixed faces of the movable mirrors).

The light beams from the optical fibers 2514a–2514c are deflected by the fixed lenses 2514a–2514c, reflected by the movable mirrors 2506a–2506c in the no control state and the fixed reflector 2502 toward the movable mirrors 2506a–2506c. The deflection angles at the respective fixed lenses 2512a–2512c are adjusted such that the light beams reflected by the fixed reflector 2502 toward the movable mirrors 2506a–2506c is directed to the movable mirror 2596b that is located at the center of a mirror array on the substrate 2508.

On the other hand, suppose that the light beam from the optical fiber 2514b passes through the center of the central fixed lens 2512b toward the central mirror 2506b. In this case, it is not necessary to deflect the light beam at the fixed lens 2512b, and the light beam reflected by the fixed reflector 2502 returns to the central mirror 2506b.

In the above optical switch 2501, $N^{1/2}$ movable mirrors are arranged in each section to form a matrix of N mirrors on the substrate 2508. In view of the optical switch of FIG. 1 or 26, the deflection angle required for the i-th lens 2512 from the center is $$(2i/N^{1/2})L_s/(2L)=iA\phi/L \qquad (40)$$

wherein Ø is the diameter of the movable mirror 2506 and A is a constant. As shown in FIG. 25(B), the input and output switching elements is realized by a single switching element. Accordingly, the distance L is equal to the distance between the I/O switching element 2500 and the fixed reflector 2502. Thus, the deviation of the lens from the light beam is g=iAØf25/L. The maximum deviation is $N^{1/2}$AØf25/(2L). If θm is the maximum deflection angle, it is expressed as $N^{1/2}$AØ/(2L), and the maximum deviation g=f25θm.

For the lenses used in an optical switch, θm=approximately 6, f25=1 mm and, therefore, g=100 μm. This value is smaller than the commonly used value 0=300 μm, and a practical one.

In this optical switch 2501, all of the light beams from the I/O ports travel toward the movable mirror 2506b at the center of the matrix. Consequently, if the light beams are deflected to the movable mirrors 2506a or 2506c corresponding to the I/O ports arranged in the periphery of the matrix, the deflection angles at the movable mirror 2506a or 2506c are changed from the no control state.

Figure 36A:
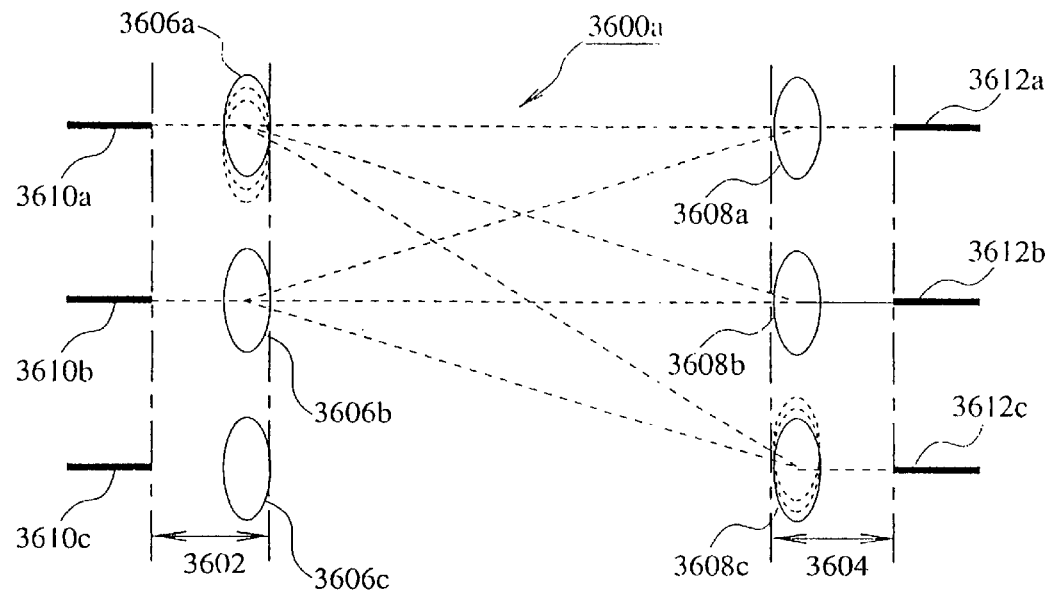
FIG. 36 (A) is a schematic diagram for use in describing operation of an optical switch prior to improvement by the eight embodiment.
FIGS. 36(B) and 37 are schematic diagrams for use in describing operations of the eight embodiment that uses a movable lens as an optical deflector and that uses a relay lens as an optical element.
Figure 36B:
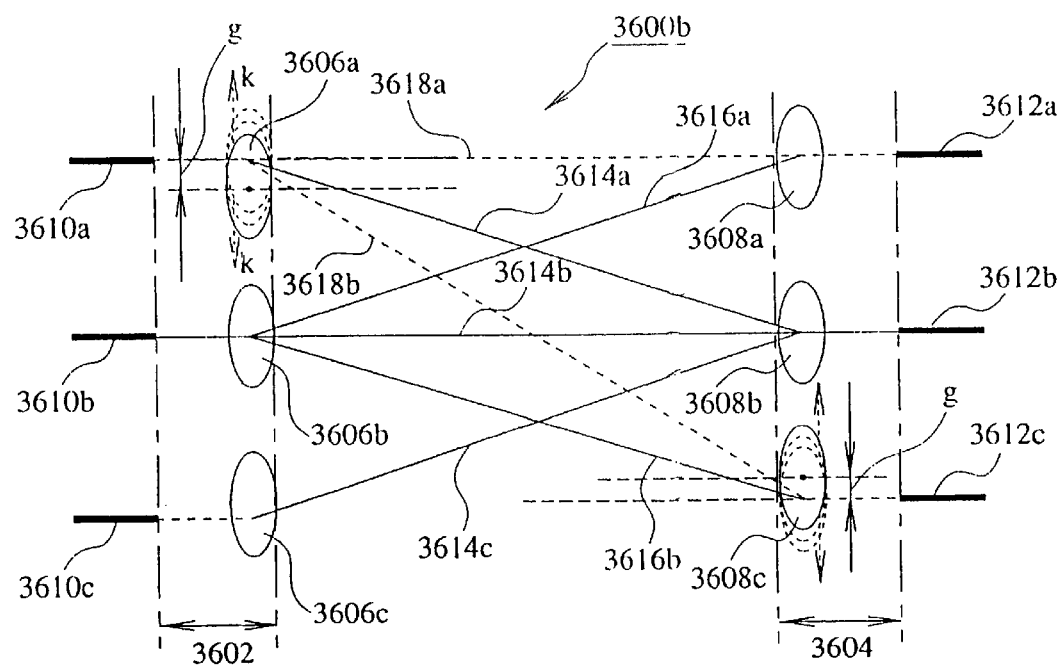

A variation to the eighth embodiment and the optical switch prior to the improvement are shown in FIGS. 36(B) and 36(A), respectively. The basic structure of these optical switches is identical with that of FIG. 25(B) and, therefore, any description on identical parts will be omitted. The dotted lines connecting various parts in FIG. 36(A) indicate light beams. Similarly, the solid lines 3614a–3614c and 3616a and 3616b, and the dotted lines 3618a and 3618b in FIG. 36(B) indicate the central paths of light beams.

In the optical switches 3600a and 3600b, the input and output lens systems are composed of at least one pair of movable lenses 3606a–3606c and 3608a–3608c having different focal lengths. The input movable lenses 3605a–3606c are movable in a plane perpendicular to the input direction of optical signals while the output movable lenses 3608a–3608c are movable in a plane perpendicular to the output direction of optical signals. The input and output switching elements 3602 and 3604 are identical in structure.

In the optical switch 3600a of FIG. 36(A), the central axes of the movable lenses 3606a and 3608b under no control conditions lie in the extended lines of the optical fibers corresponding to them. The movable lenses 3606a and 3608c under no control conditions are shown by the solid lines. They are located within the input or output ports arranged in the periphery of a substrate such as shown in FIG. 1. This is applicable to FIG. 36(B), too.

In the optical switch 3600b of FIG. 36(B), the movable lenses 3606a and 3608c are provided such that their central axes are displaced by g from the extended lines of the optical fibers 3610a and 3612c depending on the position of the input or output port. The amount of displacement is the same as the deviation described with respect to the optical switch in FIG. 25(B). The light beam leaving he input optical fiber 3610a travels toward the optical fiber 3612b provided at the central output port, with the movable lenses 3606a–3606c and 3608a–3608c being under no control conditions. This is also applicable to the light beam that leaves from the output optical fiber 3612c and passes through the movable lens 3608c corresponding to the optical fiber 3612c.

When the movable lens 3606a provided at the input port in the periphery of the matrix array is considered, it can be displaced vertically in the direction of an arrow k. Thus, the movement of the movable lens 3606a makes it possible to direct the central paths of the light beams 3618a and 3618b toward the desired movable lenses 3608a or 3608c. In this way, by moving the movable lens 3606a vertically from the position under no control conditions it is possible to deflect vertically the light beam past the movable lens 3606a.

Figure 37:
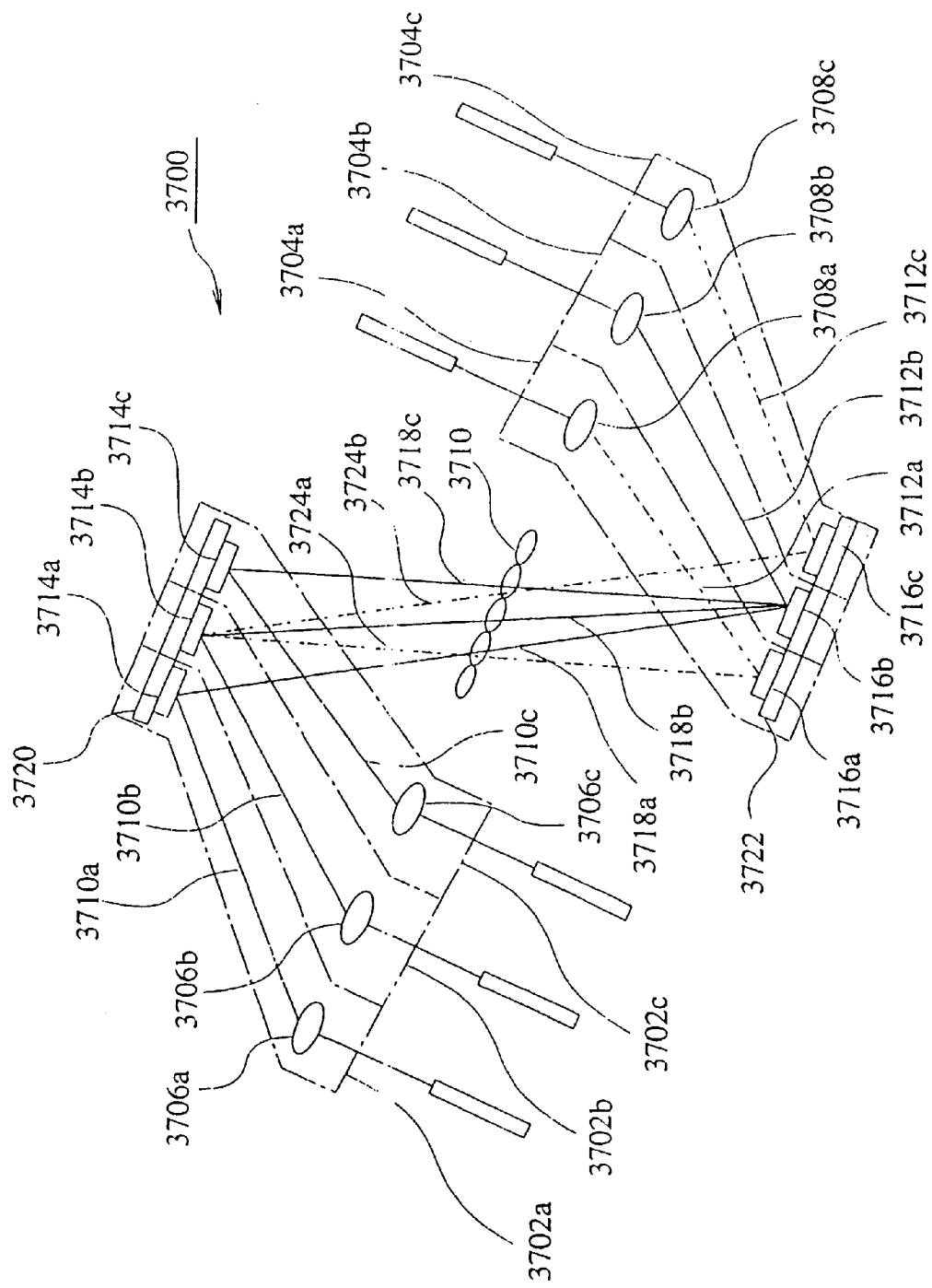

Another variation to the eighth embodiment is shown in FIG. 37. The basic structure of this optical switch 3700 is similar to that of the fifth embodiment and, therefore, any description on identical parts will be omitted. The solid lines 3710a–3710c, 3718a–3719c, and 3712b, and the dotted lines 3724a, 3724b, 3712a, and 3712c indicate the central paths of various light beams. The input and output ports 3702a–3702c and 3704a–3704c are arranged with port intervals greater than the usual ones and the deflection angles such that the deflection angles are different for each port at the fixed lenses 3706a–3706c and 3708a–3708c in the input and output lens systems. The lenses 3706a–3706c and 3708a–3708c may be composed of movable lenses, respectively.

The light beams 3710a–3710c past the input fixed lenses 3706a–3706c are deflected by the movable mirrors 3714a–3714c as the light beams 3718a–3718c. The respective movable mirrors 3714a–3714c are controlled so as to direct the deflected beams 3718a–3718c toward the movable mirror 3716b at the central position of the substrate 3722. The light beams reflected by the movable mirror 3714b at the central position strike one of the movable mirrors 3716a–3716c arranged on the substrate 3722. Then, they are deflected by the one of the movable mirrors 3716a–3716c to one of the output ports 3704a–3704c as one of the light beams 3712a–3712c. Thus, the range of deflection angles for outputting the light beams is the same for each of the input ports 3702a–3702c in the optical switch 3700.

Alternatively, the fixed lenses 3706a–3706c and 3708a–3708c may be replaced by holograms.

A modification to the lens systems will be described. According to the modification, a convex lens is provided in each of the input and output lens systems. According to the eighth embodiment, the center of the fixed (or movable) lens provided in each of the input and output switching elements is displaced relative to the light beam for making deflection while, in this modification, a convex lens is used for making such deflection.

Figure 38:
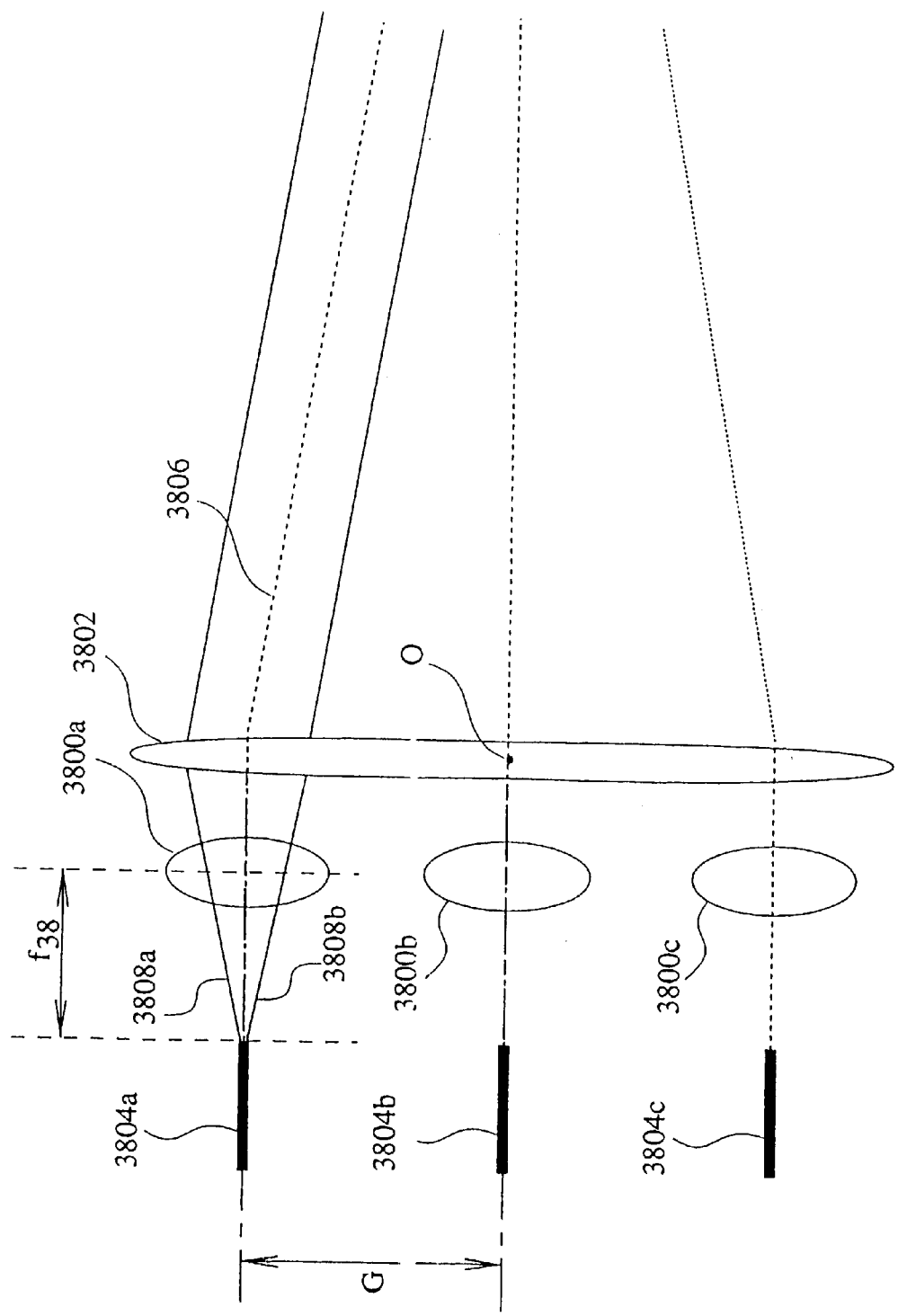
FIG. 38 is a schematic diagram for use in describing operation of lens systems where convex lenses are incorporated in the eighth embodiment.

In FIG. 38, movable lenses 3800a–3800c correspond to the optical fibers 3804a–3804c that are provided at respective ports. These lenses may be replaced by fixed lenses. A convex lens 3802 is provided behind the movable lenses 3800a–3800c such that the light beams from the movable lenses 3800a–3800c pass through the lens 3802. The solid and dotted lines connecting various parts indicate light beams. The central path 3806 of a light beam is bent at an angle by the convex lens 3802 toward the center as one of a beam group. The angle is expressed by G/F38 wherein G is he position of each optical fiber from the dotted line that includes the center O of the convex lens 3802 and F38 is the focal length of the convex lens 3802.

Specifically, the convex lens 3802 is provided as follows. For example, in view of the input switching element of FIG. 37, the convex lens 3802 is provided between the movable lenses 3706a–3706c and the movable mirrors 3714a–3714c such that the distance between the movable mirrors 3714a–3714c and the convex lens 3802 is equal to the focal length F38 of the convex lens 3802.

In FIG. 38, the light rays 3808a and 3808b from the optical fiber 3804a are condensed by both the movable lens 3800a and the convex lens 3802. The movable lenses 3800a–3800c have the same properties or characteristics, and their focal lengths are equal. If this focal length is f38, the composite focal length of the movable lenses 3800a–3800c and the convex lens 3802 is f38F38/(f38+F38). In order that the light beams passing through the movable lenses 3800a–3800c and the convex lens 3802 become parallel beams, the distance between the optical fibers 3804a–3804c and the optical center of a compound lens composed of the movable lenses 3800a–3800c and the convex lens 3802 is equal to the focal length of the compound lens. If F38>>f38, the compound focal length is approximately equal to f38.

Ninth Embodiment

Figure 39:
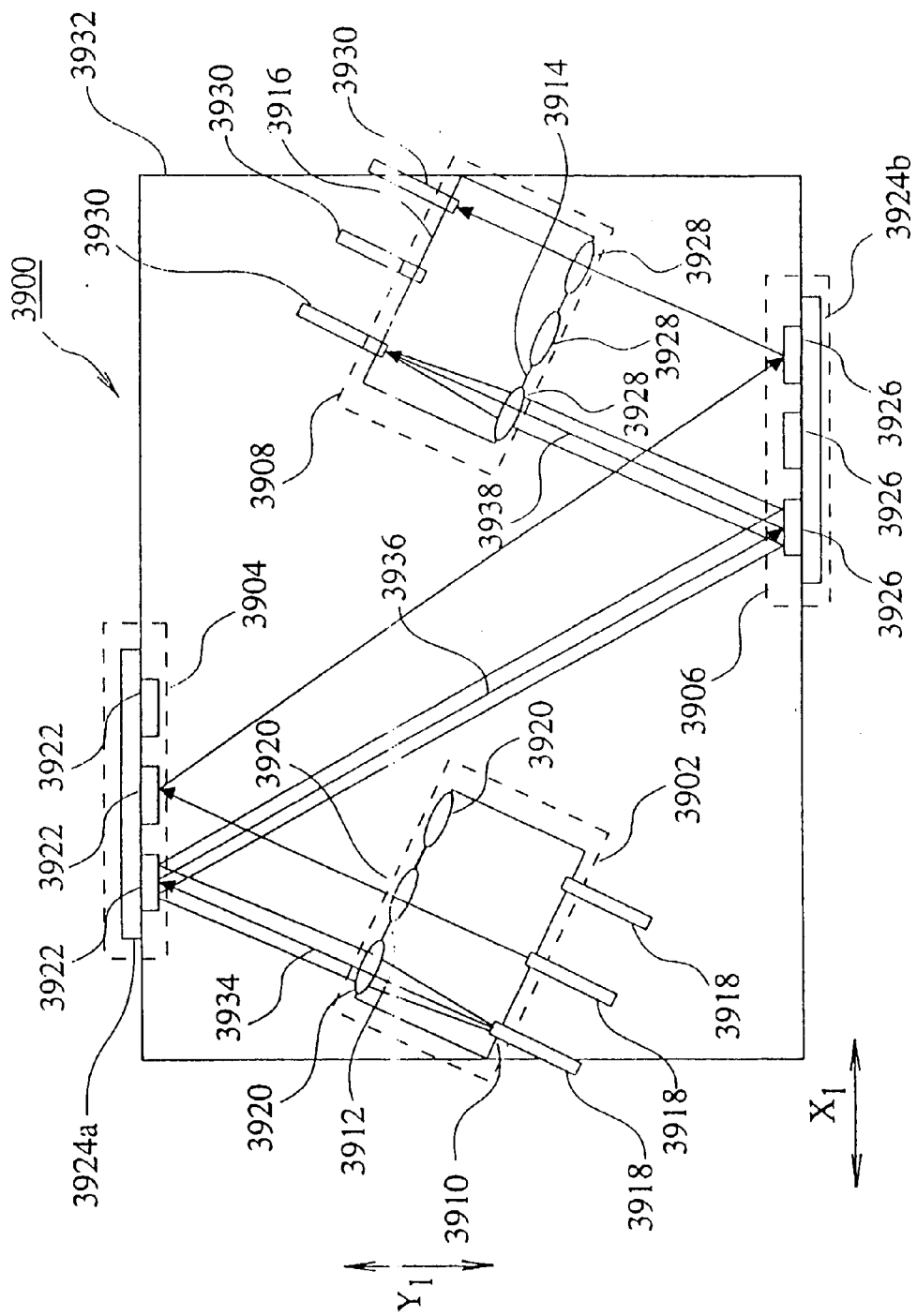
FIG. 39 is a side view of an optical switch according to ninth embodiment of the invention.

In FIG. 39, an optical switch 3900 according to the ninth embodiment comprises an input switching element having a plurality of light input ports and an output switching element having a plurality of light output ports so as to output from one of the output ports an optical signal that is input to one of the input ports. The input switching element comprises first and second optical units 3902 and 3904 while the output switching element comprises third and fourth optical units 3906 and 3908.

The first optical unit 3902 comprises a plurality of combinations of input light conduits 3918 and input lens systems 3920 for condensing light beams from the input light conduits 3918, one combination for each of the input ports. The second optical unit 3904 comprises a plurality of first movable mirrors 3922 corresponding to the respective lens systems. The third optical unit 3906 comprises a plurality of second movable mirrors 3926 for separately reflecting light beams reflected by the first movable mirrors 3922. The fourth optical unit 3908 comprises a plurality of combinations of output lens systems 3928 for condensing light beams from the second movable mirrors 3926 and output light conduits 3930 to which light beams are input from the lens systems, one combination for each of the output port. It is preferred that the first, second, third, and fourth optical units 3902–3908 are provided on a common substrate.

In the optical unit 3902, the input light conduits 3918 and the input lens systems 3920 are fixed to the first and second substrates 3910 and 3912, respectively. In the fourth optical unit 3908, the output lens systems 3928 and the output light conduits 3930 are fixed to the third and fourth substrates 3914 and 3916, respectively. It is preferred that the first through fourth substrates 3910–3916 have small thermal expansion coefficients or are the same substrate. The thermal expansion coefficient of the first through fourth substrates 3910–3916 is smaller or equal to that of the common substrate 3932. The preferred value of the thermal expansion coefficient is $10^{-7}$ or lower.

The operation of various parts of the optical switch 3900 will be described. The straight lines and arrows 3934–3938 connecting various parts indicate various light beams. $X_1$ and $Y_1$ indicate the widthwise and lengthwise directions of the common substrate 3932, respectively.

An optical signal is output from the end face of each optical fiber or input light conduit 3918. As shown by the arrow 3934, it is collimated by the movable lens 3920 and output to the first movable mirror 3922. The incident and reflected angles at the first movable mirror 3922 or the angle of the mirror surface relative to the substrate 3924a is controlled so as to direct the light beam to the desired movable mirror 3926 on the substrate 3924b as shown by the arrow 3938.

Figure 40:
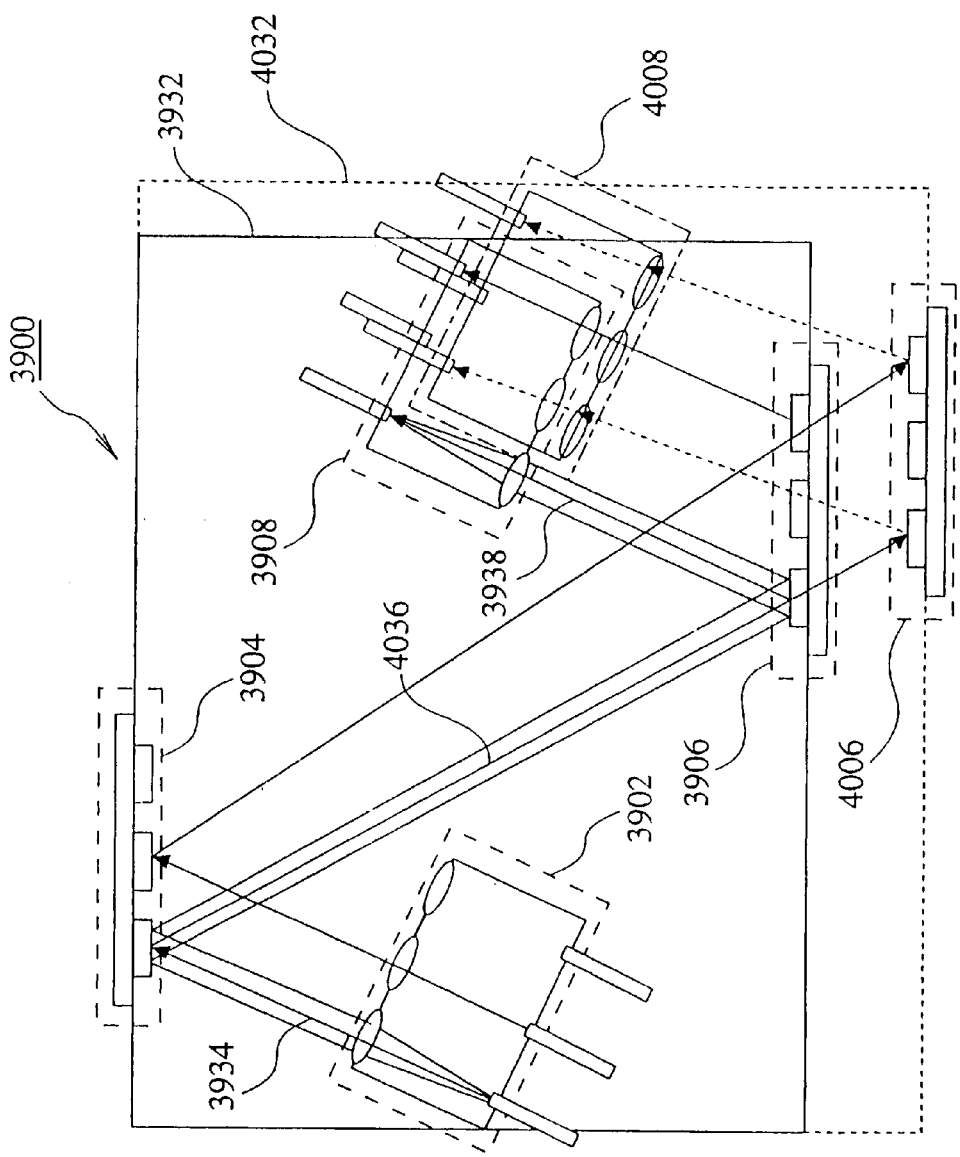
FIG. 40 is a schematic diagram for use in describing operation of the ninth embodiment.

The operation when the common substrate 3932 expands due to temperature changes will be described with reference to FIG. 40. Any description on parts identical with those of FIG. 39 will be omitted. The expanded common substrate is shown by the dotted frame 4032. Upon expansion, the third and fourth optical units 3906 and 3908 are moved to new positions 4006 and 4008, respectively, with the first and second optical units 3902 and 3904 kept as standards. In the structure of FIG. 39, the first and third optical units 3902 and 3906 expand in the same manner as the common substrate 3932. If the first and second substrates 3910 and 3912 have the same thermal expansion coefficients and the third and fourth substrates 3914 and 3916 have the same thermal expansion coefficient, the incident position on the first movable mirror 3922 provided on the second optical unit 3904 is shifted but the incident angle is not changed. The first movable mirror 3822 has a small thermal change at the angle between the mirror surface and the surface of the substrate 3924a so that the propagation angle of the light beam is not changed. Similarly, at the second movable mirror 3926 of the third optical unit 3906, the incident position is changed but the incident angle is not changed.

Figure 41A:
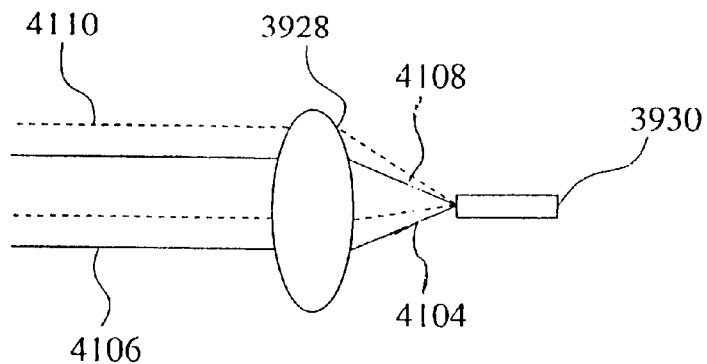
FIGS. 41(A) and (B) are schematic diagrams for use in describing operation of an output switching element in the ninth embodiment and operation of the first and second movable mirrors in the ninth embodiment.

The incident position to the movable lens 3928 provided on the output switching element as the output lens system in the optical switch 3900 of FIG. 39 will be described with reference to FIG. 41(A). The solid lines 4101 and 4106 and the dotted lines 4108 and 4110 indicate light beams. The parallel beam 4106 is condensed by the movable lens 3928 into the end face of an optical fiber provided on the substrate 3916 as the output light conduit 3930.

Suppose that the light beam 4106 to the movable lens 3928 is shifted to the light beam 4110 due to the thermal expansion of the common substrate 3932 as described with reference to FIG. 40 and input to the output light conduit or optical fiber 3930. The incident angle to the optical fiber 3930 is changed from the incident angle of the light beam 41 to that of the light beam 4108 due to the characteristics of the movable lens 3928.

In general, the incident angle is allowed to change up to 1.5 degrees at an optical power variation of 0.5 dB or less for a single mode optical fiber. The shift of the beam position is approximately tens microns in a range of temperature changes of 100 C. required under practical conditions so that the use of a movable lens having a focal length of 1–2 mm can keep the loss variations within the allowable range. This focal length corresponds to that of usual lenses. In order to minimize the incident angular changes due to temperature changes, it is desirable to use a lens having a large focal length. In order to minimize the positional shift of the focal point due to the angular error of the movable mirror, it is desirable to use a lens having a small focal length. Thus, the optimal focal length lies between them. Where all of the structural parts have the same thermal expansion coefficient, the incident angle does not vary with the temperature change. In this case, the smaller the focal length, the better the performance.

Figure 41B:
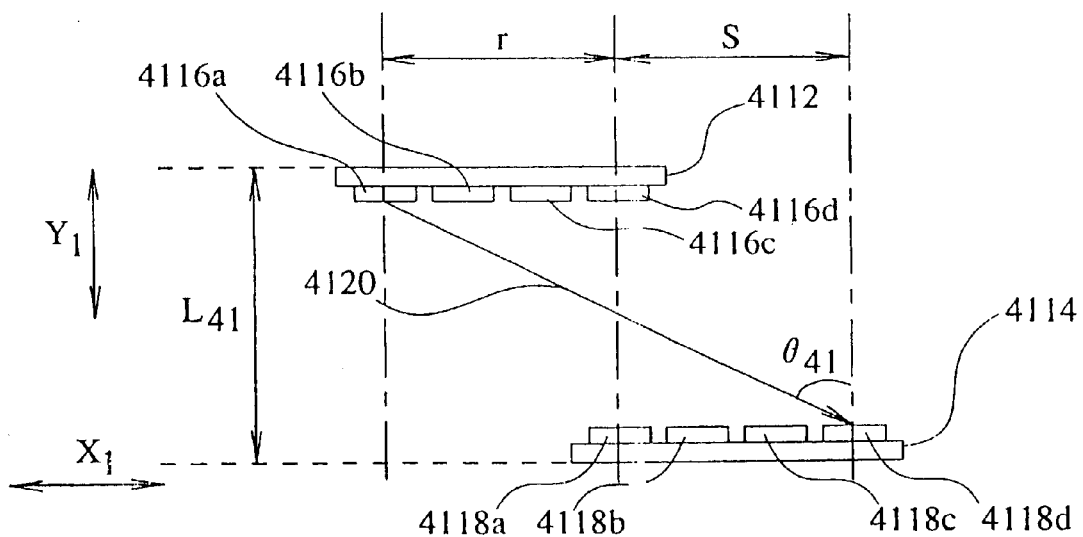

Referring to FIG. 41(B), the operation of the first and second movable mirrors 3922 and 3926 in the optical switch 3900 of FIG. 39 will be described. For purposes of detailed description, the first movable mirrors 4116a–4116d are provided on the substrate 4112 of the second optical unit 3904 while the second movable mirrors 4118a–4118d are provided on the substrate 4114 of the third optical unit 3906 in the optical switch of FIG. 39. The substrate 4114 is spaced from the substrate 4112 by a distance L41. One of the movable mirrors 4116a–4116d or movable mirror 4116a of the second optical unit is considered. The arrow 4120 connecting the movable mirrors 4116a and 4118d indicates the central path of a light beam reflected by the movable mirror 4116a to the output movable mirror 4118d.

The positional shift on the movable mirror 4118d of the central path 4120 due to the thermal expansion of the common substrate 3932 as described with reference to FIG. 40 will be calculated. It is assumed that the incident angle $\theta_{41}$ to the movable mirror 4118d of the light beam 4120 is constant and small. Also, it is assumed that the thermal expansion coefficients in $X_1$ and $Y_1$ directions of the common substrate 3932 are $\alpha_1$ and $\alpha'_1$ and the thermal expansion coefficient of the substrates 4112 and 4114 are $\beta$.

The relative position between the substrate 4114 and the movable mirror 4116a on the substrate 4112 will be considered. This relative position is expressed as the sum of the following two relative positions. That is, the position of the movable mirror 4118d on the substrate 4114 and the relative position of the substrate 4112 relative to the substrate 4114 will be considered. The relative position of the movable mirror 4116d relative to the movable mirror 4118a on the substrate 4114 is the distance S between the movable mirror 4118a and the movable mirror 4118d on the substrate 4114. The relative position of the movable mirror 4116a on the substrate 4112 relative to the substrate 4114 is the horizontal distance r in the X direction between the movable mirror 4116a and the movable mirror 4118a that is located at a position symmetrical to the movable mirror 4116a on the substrate 4114.

With the above values, the relative position of the movable mirror 4118d relative to the movable mirror 4116a is (4+S). With this value, the incident angle is expressed as $\theta=(r+S)/L41$. Prior to the thermal expansion as described with reference to FIG. 40, the incident position on the movable mirror 4118d of the central path 4120 is $\theta L41$.

Now, suppose that thermal expansion takes place in the optical switch 3900 of FIG. 39 or in FIG. 41(B). The incident position on the movable mirror 4118d of the central path 4120 is $\theta 41\alpha'_1 L$. That is, the theoretical incident position on the output movable mirror 4118d of the central path 4120 is $\alpha'_1$ (r+S). However, the thermal expansion coefficients of the common substrate 3932 in the $X_1$ and $Y_1$ directions, and the substrate 3924a (4112 of FIG. (B)) and the substrate 3924b (4114 of FIG. 41(B)) are different from each other. That is, the incident position of the movable mirror 4118d of the central path 4120 is $(\alpha_1 r+\beta S)$. The difference between them is $\{(\alpha_1-\alpha'_1) r+(\beta-\alpha_1)S\}$. This is called "relative beam shift".

In the optical switch 3900 of FIG. 39, the maximum values of r and S are set at a few cm, respectively. Where the substrate 3924a and 3924b are made of silicon ($\beta-1=3\times10^{-6}/°$ C.) and the common substrate 3932 is made of iron ($\alpha'-1=11\times10^{-6}/°$ C.), the relative beam shift is approximately tens $\mu$m in a temperature change of 100 degrees ° C. Where the common substrate 3932 is made of a nickel steel of 64% Fe and 36% Ni ($\alpha'-1=0.1\times10^{-6}/°$ C. or carbon or other material having a small thermal expansion no more than $(\alpha'-1)=10^{-7}$, the relative beam shift can be reduced by a half or more.

Tenth Embodiment

Figure 43:
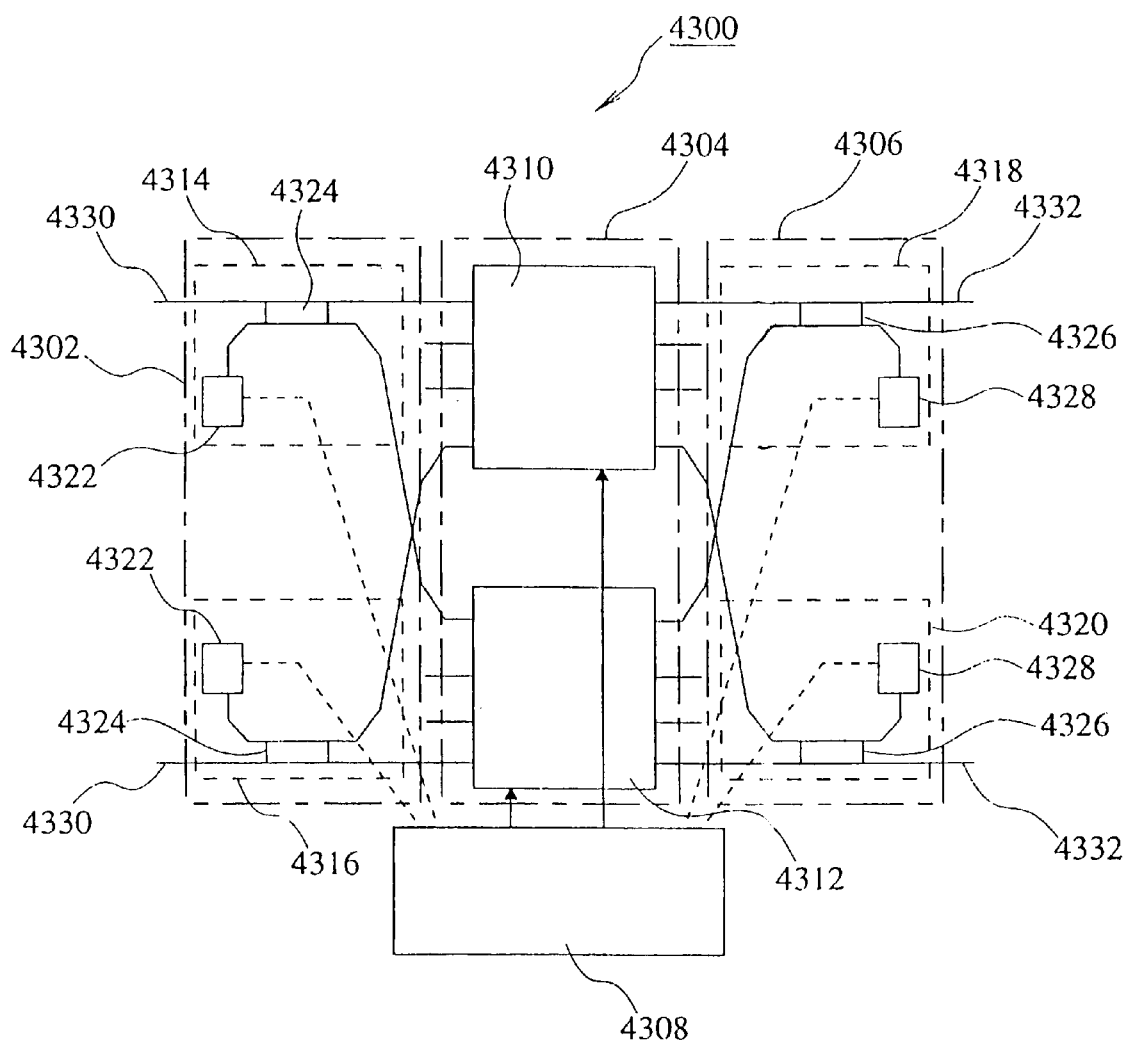
FIG. 43 is a schematic diagram of the optical switch of FIG. 42.

A light switching device for controlling the operation of an optical switch according to the invention will be described with reference to FIG. 43. The light switching device 4300 comprises an optical switch assembly 4304 having a switching movable unit 4302, a monitor unit 4306 for monitoring emergent beams from the optical switch assembly 4304, and an operation control unit 4308 responsive to monitor signals from the monitor unit 4306 to control the switching movable unit 4302 thereby adjusting the control of switching by the optical switch assembly 4304.

The optical switch assembly 4304 includes the first and second optical switches 4310 and 4312. The switching movable unit 4302 has the first and second optical signal conducting means 4314 and 4316 that have the same structure for inputting optical signals to the first and second optical switches 4310 and 4312, respectively. The monitor unit 4306 has the first and second optical signal output means 4318 and 4320 of the same structure.

Each of the first and second optical signal conducting means has a monitor signal source 4322 and a signal synthesizer 4324. The signal synthesizer 4324 synthesizes a monitor signal from the monitor signal source 4322 and an optical signal input to the light switching device 4300 into a composite signal and input it to the first and second optical switches 4310 and 4312. The signal synthesizer 4324 is an input coupler in this embodiment. A plurality of optical fibers are connected to the input coupler as a plurality of input light paths 4330.

Each of the first and second optical signal output means 4318 and 4320 has an optical signal distributor 4326 and a monitor 4328 so as to distribute and output the optical signal from the optical switch assembly 4304 at the monitor 4328 and output of the light switching device 4300. The optical signal distributor 4326 is an output coupler in this embodiment. A plurality of optical fibers are connected to the output coupler as a plurality of output light paths 4332 for outputting optical signals from the light switching device 4300.

A filter is provided in each of the first and second optical signal output means 4318 and 4320 to pick up only an optical signal among the composite signal from the optical signal distributor 4326 for output from the light switching device 4300. The operation control unit 4308 controls the operation of the monitor signal source 4322. It is preferred that the second optical switch 4312 is used for not only an auxiliary switch but also broadcast distribution of optical signals from the switching movable unit 4302 to the first and second optical signal output means 4318 and 4320.

The operation of this light switching device will be described. A plurality of optical signals from the respective input light paths 4330 are synthesized with a plurality of monitor signals from the monitor signal sources 4322 in the input couplers 4324 into a plurality of composite signals. The monitor signals are such signals as to be marks corresponding to the port numbers of the optical switch assembly 4304. By changing the sign, frequency, and/or wavelength of the monitor signal it is possible to make port recognition or identification.

The composite signals from the input couplers 4324 are distributed and input to the first and second optical switches 4310 and 4312, wherein line switching is made. The respective composite signals from the first and second optical switches 4310 and 4312 are synthesized in the output couplers 4326 and conducted to the output light paths 4332.

Each output coupler 4326 distributes the composite signal to the output light path 4332 and the monitor 4328. It is preferred that a filter is provided between the output coupler 4326 and the output light path 4332 to prevent output of the monitor signal from the light switching device 4300 and separate only the optical signal. The use of different wavelengths for the optical signal and the monitor signal facilitates the separation. The monitor signal is sent to the monitor 4328, wherein necessary information is abstracted from the monitor signal.

In the light switching device 4300, the input and output light paths 4330 and 4332 are called "input and output ports" respectively. The monitor 4328 monitors the input port 4330 that each optical signal enters by the port identification signal in the monitor signal. In addition, it monitors the control state of the optical switch such as the optical axis information of the light power. The information of a monitor signal is sent to the control circuit provided in the operation control unit 4308, by which the optical switch 4304 is kept in the optimal condition. The control circuit of the operation control unit 4308 also detects whether the right port is used for connection upon switching.

Alternatively, the monitor signal sources 4322 may be omitted from the light switching device 4300 so that only optical signals are input to the first and second optical switches. The monitors 4328 monitor only the optical signals. Consequently, it is not necessary to provide filters in the optical signal outputting means 4318 and 4320 to separate the optical signals. The light switching device according to the invention may be used for the conventional optical switch 4400 to control its operation.

How to detect the control state of the optical switch 4400 by means of the light switching device 4300 will be described with reference to FIGS. 42 and 43.

Figure 42:
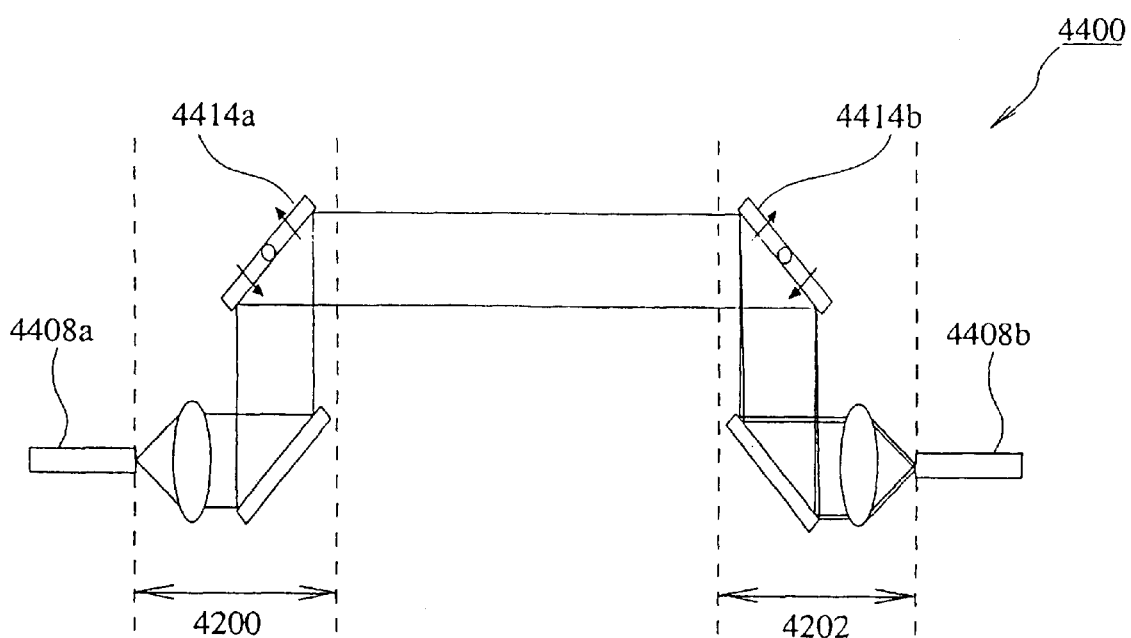
FIG. 42 is a schematic diagram for use in describing operation of an optical switch according to the tenth embodiment of the invention.
Figure 44A:
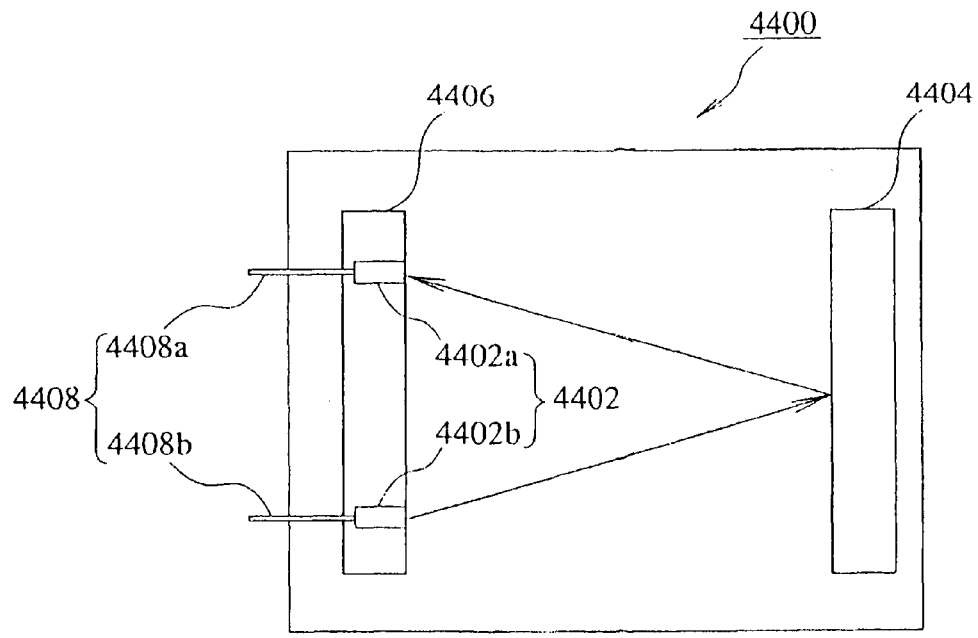
FIGS. 44(A) and (B) are schematic diagrams of a conventional optical switch and an optical deflector for use in the optical switch, respectively.
Figure 44:
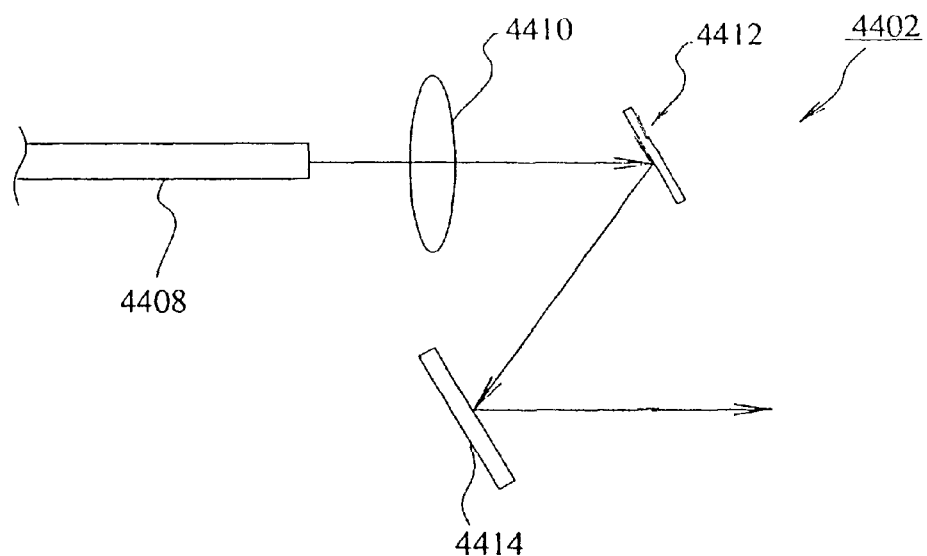

In FIG. 42, any description overlapping that of FIG. 44 will be omitted. A plurality of movable mirrors 4414a and 4414b are movable in directions shown by arrows. They are moved by changing the driving voltages in the same manner as in FIG. 12. First of all, the state where switching has been completed and lines are retained will be described. At this point, the information about input port identification is extracted by the identification signal contained in the monitor signal in the monitor 4328 as shown in FIG. 43.

The beam angle can be changed by changes of the movable mirror 4114a in the input switching element 4200 caused by driving voltage or temperature changes. This changes the focal position at the output fiber 4408b, which in turn changes the optical power of a signal. This change is detected by the monitor 4328 of FIG. 43. Based on the information from the monitor 4328, the operation control unit 4308 determines that the beam angle has been changed.

The operation control unit 4308 must feed back to the optical switch 4400 the information for making appropriate angles of the movable mirrors 4414a and 4414b. It must determine which mirror be rotated in which direction. For this reason, it sends to the optical switch 4400 the information for rotating the movable mirrors 4414a and 4414b by degrees too small to affect the data signal. Consequently, the driving voltages for driving the movable mirrors 4414a and 4414b are changed slightly in the optical switch 4400.

The monitor 4328 detects the resultant change in the optical power of a signal. Based on this information, the operation control unit 4308 sends to the optical switch 4400 the information for making adjustment toward increase of the power. Thus, the driving voltage for the movable mirrors 4414a and 4414b is controlled to bring the optical switch 4400 to the optimal condition.

By changing the driving voltages for the movable mirrors 4414a and 4414b to produce small rotary deviations having different periods, it is possible to monitor how much voltage be applied in which direction for making correction. Also, it is possible to detect changes with time such as in the rigidity of the movable mirrors. The 0-point change in the movable mirror angles may be detected by the change of the movable mirror controlling voltage during the retention. The information about mirror controls makes it possible to determine whether the movable mirror is able to move when it is necessary. These controls are made by the operation control unit 4308.

As has been described above, in the optical switch according to the first embodiment of the invention, there are a plurality of optical deflectors for deflecting light beams so that the precision of a defection angle is distributed to the individual optical deflectors. Accordingly, the precision required for each optical deflector is lowered.

In the optical switches according to the second and third embodiments, there is provided an optical system for increasing the incident or emergent angle of light or the diameter of a light beam so that the number of channels is increased while the required precision is maintained.

In the optical switch according to the fourth embodiment, there is provided an optical element for condensing a light beam reflected by the input movable mirror into the output movable mirror so that the precision for controlling the angle of the movable mirror is lowered, allowing high-speed switching of the mirror angle.

In the optical switches according to the fifth, sixth, and seventh embodiments, when light is output to the output port, the range of deflection angles of the optical deflector at each input port in the input light switching device is the same so that the number of channels is increased.

In the optical switches according to the sixth and seventh embodiments, the tilted angle of the movable mirror in the input convergent lens system corresponds one-to-one to the output port so that the driving is simplified.

In the optical switch according to the eighth embodiment, even if there is a temperature change, the influence upon the optical output is small by minimizing the focal deviation and producing only a deviation in the incident angle to the optical fiber so that it is possible to suppress the output power variations caused by the temperature change.

The use of a light switching device for the optical switch according to the invention makes it possible to monitor the state of the optical switch and realize a two-direction broadcast distribution including the auxiliary system with a small number of parts.

What is claimed is:

1. An optical switch including an input switching element having a plurality of light input ports and an output switching element having a plurality of light output ports so as to output from one of said light output ports an optical signal that is input to one of said light input ports, said input switching element having a plurality of input optical deflector sets, each set consisting of a plurality of optical deflectors arranged in an incident direction of optical signals at each of said light input ports;

said output switching element having a plurality of output optical deflector sets, each set consisting of a plurality of optical deflectors arranged in an emergent direction of optical signals at each of said light output ports, wherein each of said input optical deflector sets and each of said output optical deflector sets comprises, as said optical deflectors, at least two movable lenses that are movable in a plane perpendicular to said incident or emergent direction and have different focal lengths.

2. An optical switch including an input switching element having a plurality of light input ports and an output switching element having a plurality of light output ports so as to output from one of said light output ports an optical signal that is input to one of said light input ports, said input switching element having a plurality of input optical deflector sets, each set consisting of a plurality of optical deflectors arranged in an incident direction of optical signals at each of said light input ports;

said output switching element having a plurality of output optical deflector sets, each set consisting of a plurality of optical deflectors arranged in an emergent direction of optical signals at each of said light output ports, wherein each of said input optical deflector sets each of said output optical deflector sets comprises, as said optical deflectors, a movable lens movable in a plane perpendicular to said incident or emergent direction and a movable mirror having a rotary axis perpendicular to said incident or emergent direction.

3. An optical switch including a plurality of light input ports and a plurality of light output ports so as to output from one of said output ports an optical signal that is input to one of said light input ports, comprising:

a plurality of input optical deflectors provided one for each of said light input ports;

a plurality of output optical deflectors provided one for each of said light output ports;

a plurality of input optical fibers connected one to each of said light input ports;

a plurality of output optical fibers connected one to each of said light output ports;

a plurality of optical systems provided one for each of said light input or output ports to increase an incident or emergent angle of each of said input or output optical fibers.

4. The optical switch according to claim 3, wherein said each of said optical systems has a concave face provided at an end of each of said input or output optical fibers.

5. The optical switch according to claim 4, wherein said each of said optical systems has a convex face provided at an end of each of said input or output optical fibers.

6. An optical switch including a plurality of light input ports and a plurality of light output ports so as to output from one of said output ports an optical signal that is input to one of said light input ports, comprising:

a plurality of input optical deflectors provided one for each of said light input ports;

a plurality of output optical deflectors provided one for each of said light output ports;

a plurality of input optical fibers connected one to each of said light input ports;

a plurality of output optical fibers connected one to each of said light output ports; and a plurality of optical systems provided one for each of said light input or output ports to increase a diameter of a light beam.

7. The optical switch according to claim 6, wherein each of said optical systems comprises:

a coupler connected to an end of each of said input or output optical fibers and at least one lens provided in a plane parallel to an end face of said coupler so as to be opposed to said end face.

8. An optical switch including a plurality of light input ports and a plurality of light output ports so as to output from one of said light output ports an optical signal that is input to one of said light input ports, comprising:

at least one input movable mirror having a rotary axis perpendicular to an incident direction of optical signals at each of said light input ports;

at least one output movable mirror having a rotary axis perpendicular to an emergent direction of optical signals at each of said light output ports;

at least one optical element provided between said at least one input movable mirror and said at least one output moveable mirror for condensing onto said at least one output movable mirror at least one light beam reflected by said at least one input movable mirror.

9. The optical switch according to claim 8, wherein said optical element is provided for each light path between said input and output movable mirrors.

10. An optical switch including an input switching element having a plurality of light input ports and an output switching element having a plurality of light output ports so as to output from one of said light output ports an optical signal that is input to one of said light input ports, characterized by an optical element provided between said input and output switching elements so as to receive a plurality of incident beams from said input ports and output a plurality of emergent beams corresponding to said incident beams such that central paths of said emergent beams become parallel to each other.

11. The optical switch according to claim 10, wherein said optical element is a convex lens that has a focal plane in which said input switching element is provided and is flanked symmetrically by said input and output switching elements.

12. The optical switch according to claim 10, wherein said optical element is a hologram that has a focal plane in which said input switching element is provided and is flanked symmetrically by said input and output switching elements.

13. The optical switch according to claim 10, wherein said optical element is a concave mirror having a focal plane in which said input switching element is provided, and said input and output switching elements are realized by a single switching element.

14. The optical switch according to claim 11, 12, or 13, which further comprises:
   a plurality of input lens systems, each corresponding to each of said input ports;
   a plurality of output lens systems, each corresponding to each of said output ports;
   a plurality of input concave lenses provided in a plane in which light leaves from one of said input lens systems to said output switching element; and
   a plurality of output concave lenses provided in a plane in which said light from said input switching element strikes one of said output lens systems.

15. The optical switch according to claim 14, wherein each of said input and output lens systems comprises:
   a fixed lens or movable lens movable in a plane perpendicular to said incident or emergent direction and
   a movable mirror having a rotary axis perpendicular to said incident or emergent direction.

16. The optical switch according to claim 15, wherein each of said input and output lens systems further comprises a concave lens provided between said fixed or movable lens and said movable mirror.

17. The optical switch according to claim 11, wherein said convex lens comprises a plurality of first convex lenses provided one for each of light paths between said input and output switching elements and a pair of second convex lenses provided on opposite sides of said first convex lenses; said optical switch further comprises:
   a plurality of input lens systems, each corresponding to each of said input ports;
   a plurality of output lens systems, each corresponding to each of said output ports;
   each of said input and output lens systems comprising a fixed lens or a movable lens movable in a plane perpendicular to said incident or emergent direction and a movable mirror having a rotary axis perpendicular said incident or emergent direction.

18. The optical switch according to claim 12, which further comprises:
   a plurality of input lens systems, each corresponding to each of said input ports;
   a plurality of output lens systems, each corresponding to each of said output ports;
   each of said input and output lens systems comprising a fixed lens or a movable lens in a plane perpendicular to said incident or emergent direction and a movable mirror having a rotary axis perpendicular to said incident or emergent direction.

19. An optical switch comprising:
   an input switching element having a matrix of input ports;
   an output switching element having a matrix of output ports;
   a plurality of input lens systems, each corresponding to each of said input ports;
   a plurality of output lens systems, each corresponding to each of said output ports;
   a portion of said input and output lens systems located on at least a periphery of said matrix being fixed or movable lens systems capable of directing light beams from said portion of said input lens systems in said periphery to a portion of said output lens systems located at a center of said matrix, wherein each of said input and output lens systems comprises at least two movable lenses that are movable in a plane perpendicular to said incident or emergent direction and have different focal lengths.

20. The optical switch according to claim 19, wherein each of said input and output lens systems comprises:
   a fixed lens or a movable lens movable in a plane perpendicular to said incident or emergent direction and
   a movable mirror having a rotary axis perpendicular to said incident or emergent direction, said optical switch further comprising
   at least one optical element provided between said input and output switching elements so as to condense light beams from said input ports toward said output switching element.

21. The optical switch according to claim 20, wherein said at least one optical element is provided in a light path between said input and output lens systems.

22. The optical switch according to claim 20, wherein said optical element is a flat mirror and
   said input and output switching elements are realized by a single switching element.

23. An optical switch including an input switching element having at least one light input port and an output switching element having at least one light output port so as to output from one of said light output ports an optical signal that is input to one of said light input ports, wherein
   said input switching element comprises first and second optical units:
   said output switching element comprises third and fourth optical units;
   said first optical unit has, at said at least one light input port, at least one set of an input light conduit and an input lens system for condensing a light beam from said input light conduit;
   said second optical unit has at least one first movable mirror corresponding to said at least one input lens system so as to reflect a light beam from said at least one input lens system.
   said third optical unit has at least one second, movable mirror for reflecting a light beam from said first movable mirror;
   said fourth optical unit has, at said at least one light output port, a set of an output lens system for condensing a light beam from said second movable mirror and an output light conduit into which a light beam is put from said output lens system, wherein said first, second, third, and fourth light units are provided on a common substrate.

24. The optical switch according to claim 23, wherein said input light conduit and said input lens system of said first optical unit are fixed to first and second substrates, respectively, and
   said output lens system and said output light conduit of said fourth optical unit are fixed to third and fourth substrates, respectively.

25. The optical switch according to claim 24, wherein said first, second, third, and fourth substrates have a thermal expansion coefficient that is equal to that of said common substrate.

26. An optical switch including an input switching element having at least one light input port and an output switching element having at least one light output port so as to output from one of said light output ports an optical signal that is input to one of said light input ports, wherein said input switching element comprises first and second optical units;

said output switching element comprises third and fourth optical units;

said first optical unit has, at said at least one light input port, at least one set of an input light conduit and an input lens system for condensing a light beam from said input light conduit;

said second optical unit has at least one first movable mirror corresponding to said at least one input lens system so as to reflect a light beam from said at least one input lens system, said third optical unit has at least one second movable mirror for reflecting a light beam from said first movable mirror;

said fourth optical unit has, at said at least one light output port, a set of an output lens system for condensing a light beam from said second movable mirror and an output light conduit into which a light beam is put from said output lens system, wherein said input light conduit and said input lens system of said first optical unit are fixed to first and second substrates, respectively, and said output lens system and said output light conduit of said fourth optical unit are fixed to third and fourth substrates, respectively.

27. The optical switch according to claim 26, or 24, wherein said first, second, third, and fourth substrates have a same thermal expansion coefficient.

28. The optical switch according to claim 23 or 26, wherein said first, second, third, and fourth substrates and said common substrate have a thermal expansion coefficient of $10^{-7}$ or lower.

29. The optical switch according to claim 26, wherein said first, second, third, and fourth substrates have a thermal expansion coefficient of $10^{-7}$ or lower.

* * * * *